(12) United States Patent
Kadlec

(10) Patent No.: US 9,514,777 B2
(45) Date of Patent: Dec. 6, 2016

(54) SERVO PROCESSOR RECEIVING PHOTODETECTOR SIGNALS

(71) Applicant: Optical Devices, LLC, Peterborough, NH (US)

(72) Inventor: Ron J. Kadlec, Longmont, CO (US)

(73) Assignee: OPTICAL DEVICES, LLC, Peterborough, NH (US)

( * ) Notice: Subject to any disclaimer, the term of this patent is extended or adjusted under 35 U.S.C. 154(b) by 0 days.

(21) Appl. No.: 15/002,726

(22) Filed: Jan. 21, 2016

(65) Prior Publication Data

US 2016/0140995 A1 May 19, 2016

Related U.S. Application Data

(63) Continuation of application No. 14/819,796, filed on Aug. 6, 2015, now Pat. No. 9,245,569, which is a
(Continued)

(51) Int. Cl.
*G11B 21/08* (2006.01)
*G11B 7/09* (2006.01)
(Continued)

(52) U.S. Cl.
CPC ......... *G11B 7/0908* (2013.01); *G11B 7/08529* (2013.01); *G11B 7/0901* (2013.01);
(Continued)

(58) Field of Classification Search
None
See application file for complete search history.

(56) References Cited

U.S. PATENT DOCUMENTS

| 3,635,836 A | 1/1972 | Mullen |
| 3,758,239 A | 9/1973 | Hrdina |

(Continued)

FOREIGN PATENT DOCUMENTS

| EP | 0361222 | 4/1990 |
| EP | 0390977 | 10/1990 |

(Continued)

OTHER PUBLICATIONS

"A Brief History of Disk Drive Control", IEEE Control System Magazine, pp. 28-42 Jun. 2002 Abramovitch.
(Continued)

*Primary Examiner* — Tan X Dinh

(57) ABSTRACT

An optical disk drive and a digital servo method for the optical disk drive includes controlling functions of the optical disk drive with a microprocessor. Low-pass filtered and gain-adjusted versions of photodetector output signals resulting from an illumination of an optical disk are received. Versions of the photodetector signals are digitized to produce digital signals. A focus control signal is determined through at least one servo algorithm executed by a digital signal processor based on a focus error determined from the digital signals. Alternatively, a tracking control signal is determined through at least one servo algorithm executed by the digital signal processor based on a tracking error determined from the digital signals. The digital signal processor has a specialized structure and arrangement for processing digital signals at a higher speed than the microprocessor.

34 Claims, 37 Drawing Sheets

Related U.S. Application Data continuation of application No. 13/854,475, filed on Apr. 1, 2013, now Pat. No. 9,105,281, which is a continuation of application No. 12/952,135, filed on Nov. 22, 2010, now Pat. No. 8,416,651, which is a continuation of application No. 11/969,190, filed on Jan. 3, 2008, now Pat. No. 7,839,729, which is a continuation of application No. 09/950,378, filed on Sep. 10, 2001, now Pat. No. 7,522,480.

(60) Provisional application No. 60/264,351, filed on Jan. 25, 2001.

(51) Int. Cl.
  *G11B 20/10* (2006.01)
  *G11B 27/30* (2006.01)
  *G11B 27/10* (2006.01)
  *G11B 7/085* (2006.01)

(52) U.S. Cl.
  CPC ........ *G11B 7/094* (2013.01); *G11B 20/10046* (2013.01); *G11B 7/08505* (2013.01); *G11B 7/08541* (2013.01); *G11B 7/0941* (2013.01); *G11B 7/0945* (2013.01); *G11B 27/105* (2013.01); *G11B 27/3027* (2013.01)

(56) References Cited

U.S. PATENT DOCUMENTS

| | | |
|---|---|---|
| 3,860,968 A | 1/1975 | Shapiro |
| 3,876,842 A | 4/1975 | Bouwhuis |
| 3,955,557 A | 5/1976 | Takagi |
| 4,099,112 A | 7/1978 | Klinger |
| 4,180,309 A | 12/1979 | Miyata et al. |
| 4,189,745 A | 2/1980 | Ushio et al. |
| 4,220,850 A | 9/1980 | McEachern |
| 4,247,741 A | 1/1981 | Tatsuguchi |
| 4,268,905 A | 5/1981 | Johann et al. |
| 4,300,226 A | 11/1981 | Barnette |
| 4,322,748 A | 3/1982 | Tatsogochi |
| 4,337,532 A | 6/1982 | Oprandi et al. |
| 4,352,981 A | 10/1982 | Sugiyama et al. |
| 4,381,663 A | 5/1983 | Swanson |
| 4,387,591 A | 6/1983 | Corzine et al. |
| 4,419,699 A | 12/1983 | Christopher et al. |
| 4,450,710 A | 5/1984 | Nettekoven |
| 4,471,477 A | 9/1984 | Bierhoff |
| 4,482,989 A | 11/1984 | Bierhoff |
| 4,506,149 A | 3/1985 | Utsumi |
| 4,513,407 A | 4/1985 | Bricot |
| 4,546,642 A | 10/1985 | Swanson |
| 4,554,652 A | 11/1985 | Maeda et al. |
| 4,598,579 A | 7/1986 | Cummings et al. |
| 4,651,314 A | 3/1987 | Yoshikawa et al. |
| 4,660,191 A | 4/1987 | Maeda et al. |
| 4,677,602 A | 6/1987 | Okano et al. |
| 4,677,605 A | 6/1987 | Abed |
| 4,682,332 A | 7/1987 | Okamoto et al. |
| 4,682,491 A | 7/1987 | Pickard |
| 4,700,056 A | 10/1987 | Silvy et al. |
| 4,730,295 A | 3/1988 | Bressers |
| 4,744,042 A | 5/1988 | Hyatt |
| 4,750,059 A | 6/1988 | Syracuse |
| 4,758,082 A | 7/1988 | Kozuki et al. |
| 4,761,776 A | 8/1988 | Opheij |
| 4,774,698 A | 9/1988 | Henmi et al. |
| 4,775,967 A | 10/1988 | Shimada et al. |
| 4,785,442 A | 11/1988 | Ohtake et al. |
| 4,785,451 A | 11/1988 | Sako et al. |
| 4,789,975 A | 12/1988 | Taniyama |
| 4,791,627 A | 12/1988 | Yonezawa |
| 4,794,469 A | 12/1988 | Kaida et al. |
| 4,796,246 A | 1/1989 | Tsuyoshi et al. |
| 4,799,206 A | 1/1989 | Imanaka |
| 4,807,207 A | 2/1989 | Konno |
| 4,823,330 A | 4/1989 | Arter et al. |
| 4,827,202 A | 5/1989 | Kurz |
| 4,855,977 A | 8/1989 | Getreuer et al. |
| 4,856,108 A | 8/1989 | Tinet |
| 4,862,447 A | 8/1989 | Opheij |
| 4,864,118 A | 9/1989 | Opheij et al. |
| 4,866,692 A | 9/1989 | Saito et al. |
| 4,878,211 A | 10/1989 | Suzuki et al. |
| 4,890,172 A | 12/1989 | Watt et al. |
| 4,890,273 A | 12/1989 | Takeuchi et al. |
| 4,893,298 A | 1/1990 | Pasman et al. |
| 4,901,300 A | 2/1990 | Van Der Zande et al. |
| 4,933,922 A | 6/1990 | Yokogawa |
| 4,935,912 A | 6/1990 | Hirano et al. |
| 4,942,564 A | 7/1990 | Hofer et al. |
| 4,951,273 A | 8/1990 | Yoshida |
| 4,959,822 A | 9/1990 | Pasman et al. |
| 4,963,841 A | 10/1990 | Sparagna |
| 4,972,350 A | 11/1990 | Sander et al. |
| 4,972,398 A | 11/1990 | Wachi |
| 4,972,400 A | 11/1990 | Kuwabara et al. |
| 4,972,401 A | 11/1990 | Carasso et al. |
| 4,977,551 A | 12/1990 | Minami |
| 4,989,190 A | 1/1991 | Kuroe et al. |
| 4,998,234 A | 3/1991 | Rees et al. |
| 5,014,256 A | 5/1991 | Horie |
| 5,014,274 A | 5/1991 | Higurashi et al. |
| 5,023,854 A | 6/1991 | Satoh et al. |
| 5,023,856 A | 6/1991 | Raaymakers et al. |
| 5,038,333 A | 8/1991 | Chow et al. |
| 5,046,060 A | 9/1991 | Chow et al. |
| 5,050,146 A | 9/1991 | Richgels et al. |
| 5,050,151 A | 9/1991 | Kurz |
| 5,060,219 A | 10/1991 | Lokhoff et al. |
| 5,063,545 A | 11/1991 | Nishida |
| 5,063,550 A | 11/1991 | Watari et al. |
| 5,065,387 A | 11/1991 | Roth |
| 5,073,880 A | 12/1991 | Maeda et al. |
| 5,077,719 A | 12/1991 | Yanagi et al. |
| 5,084,849 A | 1/1992 | Ishii |
| 5,088,078 A | 2/1992 | Moriwaki et al. |
| 5,089,757 A | 2/1992 | Wilson |
| 5,097,455 A | 3/1992 | Marshall |
| 5,097,458 A | 3/1992 | Suzuki |
| 5,101,391 A | 3/1992 | Ishii et al. |
| 5,107,102 A | 4/1992 | Noda et al. |
| 5,109,366 A | 4/1992 | Moriya et al. |
| 5,113,384 A | 5/1992 | McDonald et al. |
| 5,113,387 A | 5/1992 | Goldsmith et al. |
| 5,115,421 A | 5/1992 | Rokutan |
| 5,115,513 A | 5/1992 | Nemirovsky et al. |
| 5,121,371 A | 6/1992 | Farnsworth |
| 5,121,374 A | 6/1992 | Barton et al. |
| 5,123,002 A | 6/1992 | Tateishi |
| 5,124,966 A | 6/1992 | Roth et al. |
| 5,136,566 A | 8/1992 | Iwazaki |
| 5,136,569 A | 8/1992 | Fennema et al. |
| 5,138,594 A | 8/1992 | Fennema et al. |
| 5,140,580 A | 8/1992 | Ohara et al. |
| 5,146,443 A | 9/1992 | Iwase et al. |
| 5,150,339 A | 9/1992 | Ueda et al. |
| 5,155,716 A | 10/1992 | Imanaka et al. |
| 5,161,140 A | 11/1992 | Terada |
| 5,164,932 A | 11/1992 | Fennema et al. |
| 5,175,716 A | 12/1992 | Min |
| 5,176,153 A | 1/1993 | Eberhardt |
| 5,179,545 A | 1/1993 | Tanaka et al. |
| 5,182,736 A | 1/1993 | Yanagi |
| 5,187,696 A | 2/1993 | Ishii et al. |
| 5,189,293 A | 2/1993 | Leenknegt |
| 5,191,568 A | 3/1993 | Muto et al. |
| 5,195,067 A | 3/1993 | Yanagi |
| 5,199,011 A | 3/1993 | McDonald et al. |
| 5,199,015 A | 3/1993 | Edahiro et al. |
| 5,204,793 A | 4/1993 | Plonczak |
| 5,206,567 A | 4/1993 | Sakurai et al. |
| 5,210,732 A | 5/1993 | Suenaga |
| 5,216,659 A | 6/1993 | Call et al. |

(56) References Cited

U.S. PATENT DOCUMENTS

| | | |
|---|---|---|
| 5,220,546 A | 6/1993 | Fennema |
| 5,220,547 A | 6/1993 | Yasukawa et al. |
| 5,226,027 A | 7/1993 | Bakx |
| 5,227,930 A | 7/1993 | Thanos et al. |
| 5,228,019 A | 7/1993 | Yanagi |
| 5,241,522 A | 8/1993 | Yanagi |
| 5,247,494 A | 9/1993 | Ohno et al. |
| 5,247,671 A | 9/1993 | Adkins et al. |
| 5,249,116 A | 9/1993 | Cloetens |
| RE34,399 E | 10/1993 | Gami et al. |
| 5,251,194 A | 10/1993 | Yoshimoto et al. |
| 5,258,695 A | 11/1993 | Utenick et al. |
| 5,263,009 A | 11/1993 | Sasaki et al. |
| 5,268,885 A | 12/1993 | Akkermans |
| 5,270,988 A | 12/1993 | Kobayashi |
| 5,289,444 A | 2/1994 | Tanaka |
| 5,289,447 A | 2/1994 | Kobayashi et al. |
| 5,291,466 A | 3/1994 | Kwak |
| 5,295,127 A | 3/1994 | Verboom et al. |
| 5,301,172 A | 4/1994 | Richards et al. |
| 5,304,907 A | 4/1994 | Abe et al. |
| 5,307,333 A | 4/1994 | Ikeda et al. |
| 5,313,814 A | 5/1994 | Yamamoto et al. |
| 5,317,143 A | 5/1994 | Yoshimoto |
| 5,325,247 A | 6/1994 | Ehrlich et al. |
| 5,332,955 A | 7/1994 | Hopper |
| 5,333,126 A | 7/1994 | Fukuda et al. |
| 5,339,301 A | 8/1994 | Raaymakers et al. |
| 5,341,356 A | 8/1994 | Dieleman et al. |
| 5,343,127 A | 8/1994 | Maiochi |
| 5,347,503 A | 9/1994 | Koyama et al. |
| 5,351,224 A | 9/1994 | Nagata et al. |
| 5,361,246 A | 11/1994 | Tominaga |
| 5,367,513 A | 11/1994 | Bates et al. |
| 5,369,345 A | 11/1994 | Phan |
| 5,377,178 A | 12/1994 | Saito et al. |
| 5,384,762 A | 1/1995 | Kagami et al. |
| 5,390,159 A | 2/1995 | Schylander |
| 5,396,476 A | 3/1995 | Asthana |
| 5,404,346 A | 4/1995 | Koyama et al. |
| 5,406,851 A | 4/1995 | Li |
| 5,408,454 A | 4/1995 | Hasegawa |
| 5,412,629 A | 5/1995 | Shirane |
| 5,414,683 A | 5/1995 | Tani |
| 5,414,686 A | 5/1995 | Iitsuka |
| 5,416,758 A | 5/1995 | Ito |
| 5,416,759 A | 5/1995 | Chun |
| 5,418,764 A | 5/1995 | Roth et al. |
| 5,425,013 A | 6/1995 | Fennema et al. |
| 5,428,590 A | 6/1995 | Ogino |
| 5,432,763 A | 7/1995 | Campbell |
| 5,434,834 A | 7/1995 | Shinoda et al. |
| 5,442,266 A | 8/1995 | Morehouse et al. |
| 5,442,609 A | 8/1995 | Yanagawa |
| 5,444,583 A | 8/1995 | Ehrlich |
| 5,446,716 A | 8/1995 | Eastman et al. |
| 5,459,712 A | 10/1995 | Sugaya et al. |
| 5,466,997 A | 11/1995 | Utenick et al. |
| 5,467,335 A | 11/1995 | Braat |
| 5,467,339 A | 11/1995 | Nakajima et al. |
| 5,469,113 A | 11/1995 | Steyaert et al. |
| 5,473,550 A | 12/1995 | Cameron |
| 5,475,662 A | 12/1995 | Miyagawa |
| 5,475,663 A | 12/1995 | Ogino |
| 5,479,388 A | 12/1995 | Gondou et al. |
| 5,483,510 A | 1/1996 | Ogino |
| 5,487,055 A | 1/1996 | Suzuki |
| 5,491,676 A | 2/1996 | Yamaguchi et al. |
| 5,491,677 A | 2/1996 | Sasaki |
| 5,502,701 A | 3/1996 | Kudo et al. |
| 5,504,725 A | 4/1996 | Katsumata |
| 5,504,726 A | 4/1996 | Semba |
| 5,504,727 A | 4/1996 | Wachi |
| 5,510,939 A | 4/1996 | Lewis |
| 5,517,474 A | 5/1996 | Takamine |
| 5,517,475 A | 5/1996 | Koyama |
| 5,519,623 A | 5/1996 | Pourboghrat |
| 5,521,892 A | 5/1996 | Suzuki |
| 5,526,329 A | 6/1996 | Bish et al. |
| 5,531,094 A | 7/1996 | More et al. |
| 5,532,990 A | 7/1996 | Koyama et al. |
| 5,543,697 A | 8/1996 | Carobolante et al. |
| 5,544,136 A | 8/1996 | Horie |
| 5,548,569 A | 8/1996 | Shimizume et al. |
| 5,550,685 A | 8/1996 | Drouin |
| 5,559,770 A | 9/1996 | Hiroki |
| 5,563,872 A | 10/1996 | Horimai |
| 5,566,570 A | 10/1996 | Hankel et al. |
| 5,568,467 A | 10/1996 | Inagaki et al. |
| 5,570,330 A | 10/1996 | Okawa |
| 5,572,508 A | 11/1996 | Satoh et al. |
| 5,583,837 A | 12/1996 | Ogino |
| 5,587,991 A | 12/1996 | Nabeshima et al. |
| 5,596,738 A | 1/1997 | Pope |
| 5,600,615 A | 2/1997 | Kiyoura et al. |
| 5,602,689 A | 2/1997 | Kadlec et al. |
| 5,602,814 A | 2/1997 | Jaquette et al. |
| 5,603,056 A | 2/1997 | Totani |
| 5,606,468 A | 2/1997 | Kodama |
| 5,606,536 A | 2/1997 | Watanabe et al. |
| 5,610,880 A | 3/1997 | Watanabe et al. |
| 5,617,389 A | 4/1997 | Satoh et al. |
| 5,623,465 A | 4/1997 | Sasaki et al. |
| 5,629,911 A | 5/1997 | Sasaki |
| 5,630,165 A | 5/1997 | Asghar et al. |
| 5,638,273 A | 6/1997 | Coiner et al. |
| 5,646,915 A | 7/1997 | Ogino |
| 5,654,841 A | 8/1997 | Hobson et al. |
| 5,654,947 A | 8/1997 | Roth et al. |
| 5,661,705 A | 8/1997 | Kunikata et al. |
| 5,663,942 A | 9/1997 | Ishibashi et al. |
| 5,673,242 A | 9/1997 | Lin |
| 5,675,562 A | 10/1997 | Yanagi |
| 5,677,809 A | 10/1997 | Kadlec |
| 5,689,482 A | 11/1997 | Iida et al. |
| 5,703,848 A | 12/1997 | Hofer |
| 5,710,748 A | 1/1998 | Hofer |
| 5,715,225 A | 2/1998 | Victora et al. |
| 5,726,958 A | 3/1998 | Min |
| 5,729,511 A | 3/1998 | Schell et al. |
| 5,732,052 A | 3/1998 | Ando |
| 5,737,284 A | 4/1998 | Yamada |
| 5,740,143 A | 4/1998 | Suetomi |
| 5,742,568 A | 4/1998 | Nakano et al. |
| 5,745,449 A | 4/1998 | Koyama |
| 5,745,458 A | 4/1998 | Oliver et al. |
| 5,751,674 A | 5/1998 | Bradshaw et al. |
| 5,757,748 A | 5/1998 | Kiyoura |
| 5,760,990 A | 6/1998 | Ukani |
| 5,768,227 A | 6/1998 | Baba |
| 5,768,228 A | 6/1998 | Bates et al. |
| 5,768,229 A | 6/1998 | Ikeda |
| 5,777,960 A | 7/1998 | Ohno |
| 5,777,961 A | 7/1998 | Matsui |
| 5,790,491 A | 8/1998 | Jaquette et al. |
| 5,793,737 A | 8/1998 | Den Boef |
| 5,796,704 A | 8/1998 | Nanba |
| 5,808,982 A | 9/1998 | Yun |
| 5,808,990 A | 9/1998 | Summers |
| 5,809,757 A | 9/1998 | McLean |
| 5,828,054 A | 10/1998 | Schell |
| 5,828,515 A | 10/1998 | Kim |
| 5,831,946 A | 11/1998 | De Bie |
| 5,831,949 A | 11/1998 | Kim |
| 5,835,462 A | 11/1998 | Mimnagh |
| 5,838,968 A | 11/1998 | Culbert |
| 5,841,739 A | 11/1998 | Iida et al. |
| 5,848,048 A | 12/1998 | Tachibana |
| 5,850,382 A | 12/1998 | Koishi et al. |
| 5,854,722 A | 12/1998 | Cunningham et al. |
| 5,856,960 A | 1/1999 | Hwangbo |
| 5,862,111 A | 1/1999 | Arai |
| 5,870,363 A | 2/1999 | Sun et al. |
| 5,875,157 A | 2/1999 | Sasaki |

(56) References Cited

U.S. PATENT DOCUMENTS

| | | | |
|---|---|---|---|
| 5,875,158 A | 2/1999 | Schell |
| 5,877,605 A | 3/1999 | Arai |
| 5,878,005 A | 3/1999 | Tonegawa et al. |
| 5,880,953 A | 3/1999 | Takeuchi |
| 5,881,044 A | 3/1999 | Park et al. |
| 5,881,376 A | 3/1999 | Lundberg |
| 5,886,963 A | 3/1999 | Abe |
| 5,886,985 A | 3/1999 | Kobayashi et al. |
| 5,892,741 A | 4/1999 | Kadowaki |
| 5,894,463 A | 4/1999 | Okawa et al. |
| 5,896,353 A | 4/1999 | Naohara |
| 5,899,937 A | 5/1999 | Goldstein et al. |
| 5,901,121 A | 5/1999 | Yamashita et al. |
| 5,902,937 A | 5/1999 | Amrani et al. |
| 5,903,530 A | 5/1999 | Tateishi et al. |
| 5,905,703 A | 5/1999 | Osada |
| 5,914,924 A | 6/1999 | Takagi et al. |
| 5,917,791 A | 6/1999 | Tsuchiya et al. |
| 5,920,441 A | 7/1999 | Cunningham et al. |
| 5,927,134 A | 7/1999 | Kutschker |
| 5,933,397 A | 8/1999 | Yamashita et al. |
| 5,953,296 A | 9/1999 | Baba |
| 5,956,196 A | 9/1999 | Hull |
| 5,959,952 A | 9/1999 | Wakuda |
| 5,966,355 A | 10/1999 | Kamiyama |
| 5,978,172 A | 11/1999 | Nayak et al. |
| 5,978,328 A | 11/1999 | Tanaka |
| 5,978,335 A | 11/1999 | Clark et al. |
| 5,982,721 A | 11/1999 | Supino et al. |
| 5,986,989 A | 11/1999 | Takagi et al. |
| 5,995,462 A | 11/1999 | Harold-Barry |
| 6,011,762 A | 1/2000 | Watanabe et al. |
| RE36,590 E | 2/2000 | Yanagi |
| 6,025,907 A | 2/2000 | Nakayama et al. |
| 6,034,493 A | 3/2000 | Boyd et al. |
| 6,052,344 A | 4/2000 | Ueki |
| 6,055,218 A | 4/2000 | Takeda et al. |
| 6,058,958 A | 5/2000 | Benkowski et al. |
| 6,061,200 A | 5/2000 | Shepherd et al. |
| 6,072,654 A | 6/2000 | Eddy |
| 6,075,670 A | 6/2000 | Stan |
| 6,078,455 A | 6/2000 | Enarson |
| 6,084,740 A | 7/2000 | Leonhardt et al. |
| 6,087,644 A | 7/2000 | Schell |
| 6,091,684 A | 7/2000 | Schell |
| 6,100,724 A | 8/2000 | Yoshimura et al. |
| 6,101,453 A | 8/2000 | Suwa et al. |
| 6,104,565 A | 8/2000 | Bruner et al. |
| 6,111,843 A | 8/2000 | Ma |
| RE36,864 E | 9/2000 | Kagami et al. |
| 6,115,333 A | 9/2000 | Igarashi |
| 6,128,220 A | 10/2000 | Banyai |
| 6,134,199 A | 10/2000 | Ceshkovsky |
| 6,137,758 A | 10/2000 | Nemoto |
| 6,141,303 A | 10/2000 | Supino et al. |
| 6,141,307 A | 10/2000 | Yoshioka |
| 6,147,941 A | 11/2000 | Kumagai |
| 6,147,943 A | 11/2000 | Ogasawara et al. |
| 6,154,424 A | 11/2000 | Kao et al. |
| 6,154,425 A | 11/2000 | Iida et al. |
| 6,157,599 A | 12/2000 | Yamashita et al. |
| 6,157,601 A | 12/2000 | Kao |
| 6,172,953 B1 | 1/2001 | Kamiyama |
| 6,178,060 B1 | 1/2001 | Liu |
| 6,178,145 B1 | 1/2001 | Hayashi |
| 6,188,191 B1 | 2/2001 | Frees et al. |
| 6,192,009 B1 | 2/2001 | Kim |
| 6,195,319 B1 | 2/2001 | Ohshita et al. |
| 6,204,787 B1 | 3/2001 | Baird |
| 6,204,988 B1 | 3/2001 | Codilian |
| 6,211,640 B1 | 4/2001 | Fujisaki et al. |
| 6,219,196 B1 | 4/2001 | Semba et al. |
| 6,226,246 B1 | 5/2001 | Nakayama et al. |
| 6,236,529 B1 | 5/2001 | Leonhardt et al. |
| 6,236,628 B1 | 5/2001 | Kim |
| 6,240,055 B1 | 5/2001 | Takamine et al. |
| 6,246,536 B1 | 6/2001 | Galloway |
| 6,246,646 B1 | 6/2001 | Abe et al. |
| 6,252,835 B1 | 6/2001 | Choi |
| 6,263,251 B1 | 7/2001 | Rutschmann |
| 6,272,909 B1 | 8/2001 | Yao et al. |
| 6,275,458 B1 | 8/2001 | Wong et al. |
| 6,275,781 B1 | 8/2001 | Maness et al. |
| 6,278,784 B1 | 8/2001 | Ledermann |
| 6,285,521 B1 | 9/2001 | Hussein |
| 6,285,634 B1 | 9/2001 | Abe et al. |
| 6,285,635 B1 | 9/2001 | Watanabe et al. |
| 6,298,019 B1 | 10/2001 | Watanabe et al. |
| 6,298,033 B1 | 10/2001 | Tanoue et al. |
| 6,304,535 B1 | 10/2001 | Magome et al. |
| 6,314,069 B1 | 11/2001 | Ceshkovsky |
| 6,317,394 B2 | 11/2001 | Ohshita et al. |
| 6,327,229 B1 | 12/2001 | Kawabe |
| 6,333,909 B1 | 12/2001 | Zaima |
| 6,339,303 B1 | 1/2002 | Heeren |
| 6,339,566 B1 | 1/2002 | Kishimoto et al. |
| 6,341,106 B1 | 1/2002 | Nakanishi |
| 6,347,018 B1 | 2/2002 | Kadlec et al. |
| 6,363,039 B2 | 3/2002 | Hayashi et al. |
| 6,385,144 B1 | 5/2002 | Kuriuzawa et al. |
| 6,388,963 B1 * | 5/2002 | Tanaka ............... G11B 7/00718 369/44.26 |
| 6,404,711 B1 | 6/2002 | Kato |
| 6,414,815 B1 | 7/2002 | Lee |
| 6,429,999 B1 | 8/2002 | Dague et al. |
| 6,442,111 B1 | 8/2002 | Takahashi et al. |
| 6,442,112 B1 | 8/2002 | Tateishi |
| 6,466,528 B1 | 10/2002 | Pietruszynski |
| 6,469,965 B1 | 10/2002 | Horita |
| 6,473,373 B1 | 10/2002 | Soma et al. |
| 6,480,349 B1 | 11/2002 | Kim et al. |
| 6,483,787 B1 | 11/2002 | Sugasawa et al. |
| 6,490,234 B1 | 12/2002 | Okamoto et al. |
| 6,493,169 B1 | 12/2002 | Ferris et al. |
| 6,529,455 B1 | 3/2003 | Okajima et al. |
| 6,534,936 B2 | 3/2003 | Messenger et al. |
| 6,535,463 B2 | 3/2003 | Nishino et al. |
| 6,538,837 B1 | 3/2003 | McKenzie |
| 6,546,296 B1 | 4/2003 | Hara |
| 6,549,363 B2 | 4/2003 | Leonhardt et al. |
| 6,552,979 B1 | 4/2003 | Mokry |
| 6,563,666 B1 | 5/2003 | LaPanse |
| 6,567,358 B1 | 5/2003 | Komma et al. |
| 6,587,300 B1 | 7/2003 | Dobbek |
| 6,590,843 B1 | 7/2003 | Zhuang |
| 6,597,642 B1 | 7/2003 | Ijima |
| 6,597,644 B1 | 7/2003 | Kang |
| 6,603,719 B1 | 8/2003 | Wu |
| 6,628,576 B1 | 9/2003 | Watanabe et al. |
| 6,628,580 B1 | 9/2003 | Kishimoto et al. |
| 6,658,201 B1 | 12/2003 | Rebalski |
| 6,687,081 B1 | 2/2004 | O'Hara et al. |
| 6,687,199 B1 | 2/2004 | Tran et al. |
| 6,697,310 B1 | 2/2004 | Kuriuzawa et al. |
| 6,707,772 B1 | 3/2004 | Marrec et al. |
| 6,711,103 B2 | 3/2004 | Ueki |
| 6,714,493 B1 | 3/2004 | Kishimoto et al. |
| 6,728,182 B2 | 4/2004 | Kadlec et al. |
| 6,741,529 B1 | 5/2004 | Getreuer |
| 6,741,914 B1 | 5/2004 | Tze Ming Pang |
| 6,751,171 B2 | 6/2004 | Ohta |
| 6,760,289 B1 | 7/2004 | Ide |
| 6,765,848 B2 | 7/2004 | Faucett |
| 6,781,929 B2 | 8/2004 | Kadlec |
| 6,799,242 B1 | 9/2004 | Tsuda et al. |
| 6,809,995 B2 | 10/2004 | Kadlec et al. |
| 6,813,226 B2 | 11/2004 | Kadlec et al. |
| 6,885,619 B2 | 4/2005 | Watt |
| 6,904,007 B2 | 6/2005 | Kadlec et al. |
| 6,906,985 B2 | 6/2005 | Kadlec et al. |
| 6,937,543 B2 | 8/2005 | Kadlec et al. |
| 6,950,380 B2 | 9/2005 | Watt et al. |
| 6,958,957 B2 | 10/2005 | Kadlec et al. |
| 6,965,547 B2 | 11/2005 | Kadlec et al. |

(56) References Cited

U.S. PATENT DOCUMENTS

| | | | |
|---|---|---|---|
| 6,970,403 B2 | 11/2005 | Kadlec et al. | |
| 6,970,410 B2 | 11/2005 | Kadlec et al. | |
| 6,975,565 B1 | 12/2005 | Okajima | |
| 7,023,776 B2 | 4/2006 | Kadlec et al. | |
| 7,054,094 B2 | 5/2006 | Zhang | |
| 7,092,322 B2 | 8/2006 | Kadlec et al. | |
| 7,116,621 B2 | 10/2006 | Turner et al. | |
| 7,196,979 B2 | 3/2007 | Kadlec et al. | |
| 7,414,940 B2 | 8/2008 | Kadlec et al. | |
| 7,492,675 B2 | 2/2009 | Kadlec et al. | |
| RE40,946 E * | 10/2009 | Watanabe | G11B 7/08511 369/44.27 |
| 7,680,004 B2 * | 3/2010 | Kadlec | G11B 7/094 369/44.35 |
| 7,782,721 B2 * | 8/2010 | Kadlec | G11B 7/0945 369/44.29 |
| 2005/0180272 A1 * | 8/2005 | Bell | G11B 7/08 369/44.14 |
| 2016/0027463 A1 * | 1/2016 | Kadlec | G11B 7/08529 369/44.32 |

FOREIGN PATENT DOCUMENTS

| | | |
|---|---|---|
| EP | 0392561 | 10/1990 |
| EP | 0453223 | 10/1991 |
| EP | 0264837 | 12/1991 |
| EP | 0462561 | 12/1991 |
| EP | 0203816 | 4/1992 |
| EP | 0501570 | 9/1992 |
| EP | 0517473 | 12/1992 |
| EP | 526113 | 2/1993 |
| EP | 0626687 | 11/1994 |
| EP | 0649131 | 4/1995 |
| EP | 0881626 | 12/1998 |
| EP | 0926575 | 6/1999 |
| EP | 0938084 | 8/1999 |
| EP | 0942413 | 9/1999 |
| EP | 0961270 | 12/1999 |
| GB | 1300755 | 12/1972 |
| GB | 2275795 | 9/1994 |
| JP | 55025121 | 2/1980 |
| JP | 62114147 | 1/1981 |
| JP | 57052901 | 3/1982 |
| JP | 59033503 | 2/1984 |
| JP | 62256235 | 11/1987 |
| JP | 62264452 | 11/1987 |
| JP | 63052333 | 3/1988 |
| JP | 01-099866 | 4/1989 |
| JP | 01-107880 | 4/1989 |
| JP | 01-220231 | 9/1989 |
| JP | 02-091826 | 3/1990 |
| JP | 02091826 | 3/1990 |
| JP | 02162531 | 6/1990 |
| JP | 03-049043 | 3/1991 |
| JP | 03-086932 | 4/1991 |
| JP | 04-049530 | 2/1992 |
| JP | 04-151966 | 5/1992 |
| JP | 04-345929 | 12/1992 |
| JP | 05-047125 | 2/1993 |
| JP | 05-073102 | 3/1993 |
| JP | 05089492 | 4/1993 |
| JP | 05-144025 | 6/1993 |
| JP | 06-052558 | 2/1994 |
| JP | 06-096456 | 4/1994 |
| JP | 06-111346 | 4/1994 |
| JP | 06-187655 | 7/1994 |
| JP | 06-282863 | 10/1994 |
| JP | 06-314436 | 11/1994 |
| JP | 07-129971 | 5/1995 |
| JP | 08-083448 | 3/1996 |
| JP | 09-081948 | 3/1997 |
| JP | 09251646 | 9/1997 |
| JP | 9251646 | 9/1997 |
| JP | 09-259455 | 10/1997 |
| JP | 09-265649 | 10/1997 |
| JP | 10-154757 | 6/1998 |
| JP | 11-045446 | 2/1999 |
| JP | 11-086470 | 3/1999 |
| JP | 11-195228 | 7/1999 |
| JP | 11191225 | 7/1999 |
| JP | 00-020973 | 1/2000 |
| JP | 2000-251280 | 9/2000 |
| WO | WO 92/16936 | 10/1992 |
| WO | WO 99/31956 | 7/1999 |

OTHER PUBLICATIONS

"A CMOS 4x Speed DVD Read Channel IC," IEEE Journal of Solid-State Circuits, vol. 33, No. 8, pp. 1168-1178 Aug. 1998 Kim et al.

"A Compact-Disc Analog-to-Digital Front-End in BiCMOS Technology," 46 IEEE Transactions on Consumer Electronics, pp. 343-352 May 2000 Baschirotto, (May 2000).

"A Continuous-Time Area Detector Servo Demodulator for Hard Disk Drives," IEEE, pp. 127-130 Sep. 1, 1998 Garrido and Franca.

"A digital servo signal processing LSI for compact disc players," IEEE—1991, pp. 176-177 1991 Sasaki et al.

"A Fully Integrated 0.13-um CMOS Mixed-Signal Soc for DVD Player Applications," IEEE Journal of Solid-State Circuits, vol. 38, No. 11, pp. 1981-1991 Nov. 2003 Okamoto et al.

"A low power digital servo architecture for optical disc," IEEE (8 pages) 2001 Huh et al.

"A Mixed-Signal 120MSample/s PRML Solution for DVD Systems," IEEE International Solid-State Circuits Conference, pp. 38-39, 442 1999 Baird.

"A Survey of Control Issues in Optical Data Storage System," 18th IFAC World Congress, pp. 854-868 Aug. 28-Sep. 2, 2011 Kim et al.

"A Tutorial on Controls for Disk Drives," Proceedings of the American Control Conference, pp. 408-420 Jun. 25-27, 2001 Messner.

"Adaptive Control of the Radial Servo System of a Compact Disc Player," Automatica, vol. 28, No. 3, pp. 455-462 1992 Draijer et al.

"Advanced Motion Control: An Industrial Perspective," European Journal of Control, pp. 278-293 1998 Steinbuch, M. and Norg, M.L.

Amended Petition for Inter Partes Review of U.S. Pat. No. 8,416,651 (Inter Partes Review No. IPR2014-01447) Filed Sep. 12, 2014, 73 pages.

"An Experimental Model of Sled System in an Optical Disk Drive," Jpn. J. Appl. Phys., vol. 39, pp. 843-845 Feb. 2000 Han et al.

"An Introduction to the Insite 325 Floptical Disk Drive", Presented at SPIE Optical Data Storage Topical Meeting, Reprinted from SPIE, vol. 1078, pp. 71-79 Jun. 11, 1989 Godwin, Jim.

"An Introduction to the Sampling Theorem," National Semiconductor Application Note 236, AN-236, Jan. 1980. National Semiconductor Corporation, 12 pages.

"Analog Front End," STMicroelectronics Datasheet, TDA7521 (All 11 pages) May 1998 STMicroelectronics.

"CD Player Chipset," Machine Design, vol. 71, No. 4, p. 117 Feb. 25, 1999.

Cirrus Logic Datasheet CR3700, Mar. 1998 Cirrus Logic, 4 pages.

Cirrus Logic Datasheet CR3710 (All 4 pages) Nov. 2000 Cirrus Logic.

"CMOS Analog Front-End Processor for 4x Speed CD-ROM," IEEE Transactions on Consumer Electronics, vol. 42, No. 3, pp. 826-831 Aug. 1996 Kim et al.

"Compact Disc Players in the Laboratory: Experiments in Optical Storage, Error Correction, and Optical Fiber Communication," IEEE Transactions on Education, vol. 44, No. 1, pp. 47-60 Feb. 2001 Lane et al.

"Compact Disc Technology," Compact Disc Technology, pp. 149-177 1992 Nakajima.

"Compact Disk Player Front End Chipset Includes CD Text and Shockproof Memory Functions," STMicroelectronics Press Release, May 18, 1998, 2 pages.

"Comparison of Four Discrete-Time Repetitive Control Algorithms," IEEE Control Systems, pp. 48-54 Dec. 1993 Kempf.

(56) References Cited

OTHER PUBLICATIONS

Computer-Controlled Systems: Theory and Design, Third Edition, Prentice Hall, Upper Saddle River, New Jersey, pp. 83-87 1997 Åström, Karl J. and Wittenmark, Bjorn.
"Coupling-Enhanced Control for Optical Disk Drives," Jpn. J. Appl. Phys. vol. 37, pp. 2203-2205 1998 Yang et al.
Data Amplifier and Laser Supply Circuit for CD Player and Read Only Optical Systems, Philips Data Sheet, TDA1302T (Sep. 1994) Philips, 19 pages.
Gerry Grenier, "Videotape Deposition of Gerry Grenier," in ITC Investigation No. 337-TA-897, Taken Mar. 25, 2014, 37 pages.
"Design of a DSP-Based Servo Speed Controller," A thesis submitted to Dublin City University for the degree of Master of Engineering, pp. 1-5 Jul. 1992 Lu, Jiabing.
"Diffractive optical system for tracking on Floptical disks," SPIE, vol. 1690, pp. 72-79 Jun. 11, 1992 Cohn, Brian.
"Digital Control in Optical Disc Drives," IEEE, pp. 246-247 2001 Akkermans, Ton H.M.
"Digital Control of Dynamic Systems," Addison-Wesley Third Addition, pp. 479-489 1998 Franklin.
"Digital Servo and Decoder TDA7522 Product Preview," STMicroelectronics, May 1998, 23 pages.
Akkermans, et al., "Digital servo IC for optical disc drives," in Digital Control: Past, Present and Future of PID Control 125 (J. Quevedo & T. Escobet, eds., Elsevier Science), pp. 125-132, 2000.
"Digital Servo Integrated Circuit Silent OQ8868 Data Sheet," Philips Semiconductors, Feb. 12, 1997, 20 pages.
"Digital Servo Processor," Philips Semiconductors, Mar. 1994, Document ID TDA1301T, 14 pages.
"Digital Servo Processor and Compact Disc Decoder," Philips Semiconductors, Feb. 28, 1998, Document ID SAA7370, 60 pages.
"Digital Servo Processor and Compact Disc Decoder SAA7376 Data Sheet," Phillips Semiconductors, Feb. 26, 1998, Document ID SAA7376.
"Digital Servo Processor and Compact Disc Decoder With Integrated DAC," Philips Semiconductors, Jun. 26, 2000, Document ID SAA7326, 68 pages.
"Digital Servo Processor and Compact Disc Decoder With Integrated DAC (CD10 II)," Philips Semiconductors, Jun. 26, 2000, Document ID SAA7324, 69 pages.
"Discussion on: 'Advanced Motion Control: An Industrial Perspective'", pp. 294-297 1998 Steinbuch, M. and Norg, M.L.
"Disk Drive Control: The Early Years," Pergamon, Annual Review in Control, pp. 229-242 2002 Abramovitch.
"Disk Drive Pivot Nonlinearity Modeling Part I: Frequency Domain," Proceedings of the American Control Conference, pp. 2600-2603 Jun. 1994 Abramovitch.
"Disk Drive Pivot Nonlinearity Modeling Part II: Frequency Domain," Proceedings of the American Control Conference, pp. 2604-2607 Jun. 1994 Abramovitch.
"DVD Products and Technologies", Toshiba Review No. 12, vol. 51 (1996) M. Igarashi et al.
"Dynamics and Robust Control of a High Speed Optical Pickup," Journal of Sound and Vibration, 221(4), pp. 607-621 1999 Lim, S. and Jung, T.-Y.
"Effects of MR Head Track Profile Characteristics on Servo Performance," IEEE Transactions on Magnetics, vol. 30, No. 6, pp. 4203-4205 Nov. 1994 Cahalan.
Electrical Design News, vol. 43, Issues 17-20, Rogers Publishing Co. (All pages) 1998.
"Enhancing Robustness by Feedback Loop Gain Adjustment," International Conference on Control, Automation and Systems 2007, pp. 2876-2879 Oct. 17-20, 2007 Kim et al.
"Experimental Frequency-Domain Analysis of Nonlinear Controlled Optical Storage Devices," IEEE Transactions on Control Systems Technology, vol. 14, No. 3, pp. 389-397 May 2006 Heertjes et al.
"Flash memories: the best of two worlds," IEEE Spectrum, Dec. 1989, at 30 (pp. 30-33) Dec. 1989 Richard D. Pashley & Stefan K. Lai.

Floptical (One page) 1991-1993.
"High Integration Simplifies Signal Processing for CCDs," Electronics Design Feb. 23, 1998 Electronics Design.
"High Performance Ultra-Low Speed Servo System Based on Doubly Coprime Factorization and Instantaneous Speed Observer," IEEE/ASME Transactions on Mechatronics, vol. 1, No. 1, pp. 89-98 Mar. 1996 Ohishi et al.
"Identification and Control of Compact Disc Mechanism Using Fractional Representations," In: Proceedings 10th IFAC Symposium SYSID '94, pp. 121-126 1994 De Callafon, et al.
Identification for Control Design with Application to a Compact Disk Mechanism (Delft University Press), Chapters 3, 5, 9, and 10 1998 Dotsch.
"Improvement of Performance of a Tracking Servo System for an Optical Disc Drive," Jpn. J. Appl. Phys. vol. 39, pp. 855-861 2000 Arai et al.
"Improving Sensor to ADC Anolog Interface Design, Part One," Texas Instruments, EE Times Sep. 7, 2000 Ron Mancini.
"Respondents Lenovo Response to Complaint of Optical Devices LLC," ITC Investigation No. 337-TA-897, filed Nov. 18, 2013, 67 pages.
"Respondents LG Response to Complaint of Optical Devices LLC," ITC Investigation No. 337-TA-897, filed Nov. 25, 2013, 67 pages.
"Respondents MediaTek Response to Complaint of Optical Devices LLC," ITC Investigation No. 337-TA-897, filed Nov. 25, 2013, 75 pages.
"Respondents Nintendo Response to Complaint of Optical Devices LLC," ITC Investigation No. 337-TA-897, filed Nov. 25, 2013, 75 pages.
"Respondents' and Intervenor's Joint Notice of Prior Art," ITC Investigation No. 337-TA-897, filed Jan. 10, 2014, 47 pages.
"Respondents Samsung Response to Complaint of Optical Devices LLC," ITC Investigation No. 337-TA-897, filed Nov. 25, 2013, 77 pages.
"Respondents Toshiba Response to Complaint of Optical Devices LLC," ITC Investigation No. 337-TA-897, filed Nov. 25, 2013, 75 pages.
LabVIEW Signal Processing Course Manual, Course Software Version 1.0, Partn No. 321569A-01, Chapters 1 and 3 Sep. 1997 National Instruments Corporation.
"Lens Shift Correction in Tracking Servo System for Digital Versatile Rewritable Disc," Jpn. J. Appl. Phys., vol. 39, pp. 840-842 Feb. 2000 Shihara et al.
"Look-Ahead Seek Correction in High Performance CD-ROM Drives," IEEE Transactions on Consumer Electronics, Vo. 44, No. 1, pp. 178-186 Feb. 1998 Stan et al.
LS-120 diagram [LKM-F433-1 Released for MP] (All 14 pages) Aug. 20, 1998 Matsushita-Kotobuki Electronics Ind., Ltd.
LS-120 diagram [LKM-F733-1. LKM-F734-1 Released for MP] (All 11 pages) Nov. 26, 1997 Matsushita-Kotobuki Electronics Ind., Ltd.
"LSI Technologies for DVD System", Toshiba Review No. 12, vol. 51 (1996) T. Ohno et al.
"Magnetic and Optical Disk Control: Parallels and Contrasts," Agilent Laboratories, Communications and Optics Research Lab Mar. 6, 2001 Abramovitch.
References for: "Magnetic and Optical Disk Control: Parallels and Contrasts," Agilent Laboratories, Communications and Optics Research Lab Mar. 5, 2001 Abramovitch.
"Major HDD TMR sources and projected scaling with TPI," IEEE Transactions on Magnetics, vol. 35, No. 2, pp. 885-891 1999 Ehrlich, R. & Curran, D.
Marantz Service Manual, 74 CD17 and CD17Da Fn Kgl, Cd-17mkll Kbl Kgl Ubl Compact Disc Player (All 20 pages) 1998 Marantz.
Marantz Service Manual, 74 CD43, 74 CD53, 74 CD63 Compact Disc Player (All 31 pages) 1993/8 Marantz.
Marantz Service Manual, 74 CD7, CD-7 FnKgl Compact Disc Player (All 34 pages) 1999 Marantz.
Marantz Service Manual, 74CD36, 74CD46 Compact Disc Player (All 39 pages) 1993 Marantz.
Marantz Service Manual, CC3000, CC4000, CC4000F 5CD Disc Changer (21 pages) 1998 Marantz.

(56) References Cited

OTHER PUBLICATIONS

Marantz Service Manual, CD4000 CD Player (All 32 pages) 1999 Marantz.
Marantz Service Manual, CD6000, CD6000F CD Player (All 28 pages) 1999 Marantz.
Marantz Service Manual, DR4050 Compact Disc Recorder (All 64 pages) 2000 Marantz.
Marantz Service Manual, DR6050 Compact Disc Recorder (All 45 pages) 2000 Marantz.
Hock, K. M., et al., "Mathematical Modeling of Optical Disc Servo System," IEEE 2000, 3 pages.
"Method for Smartly Controlling the Optical Disk Drive", Publication No. 342,492, Taiwan Patent Gazette, Nov. 11, 1998, pp. 1067-1078, X06 (2 pp.) and Abstract in English (1 p.).
Modeling and Simulation of a Digital Focusing Servo Control System for an Optical Disk Tester (1997) (113 pages) 1997 Bates.
"Modeling, Identification and Performance Analysis of a DVD Player," Proceedings of the 2002 IEEE International Conference on Control Applications, pp. 623-628 Sep. 18-20, 2002 Filardi, et al.
Naus, et al., "Multi-Bit Oversampled A/D Converters As Front End for CD Players," Philips Research Labs, Solid-State Circuits Conference (1990) pp. 85-88.
Naus, et al., "Multi-Bit Oversampled A/D Converters As Front End for CD Players," Philips Research Labs, 26 IEEE Journal of Solid-State Circuits, pp. 905-909 (1991).
"Multirate Sampling Digital Servo of an Optical Disk Drive," IEEE, pp. 99-100 1993 Semba.
"Multivariable Control of a Compact Disc Player using DSPs," Proceedings of the American Control Conference, pp. 2434-2438 Jun. 1994 Steinbuch et al.
"New Fine Seek Control for Optical Disk Drives," Proceedings of the American Control Conference, pp. 3635-3639 Jun. 1999 Ryoo et al.
Nikkei Personal Computing (All two pages) Nov. 27, 2000.
"Open and Closed Loop Parametric System Identification in Compact Disk Players," Proceedings of the American Control Conference, pp. 3294-3298 Jun. 25-27, 2001 Vidal et al.
"Optimal-tuning PID control for industrial systems," Control Engineering Practice 9, pp. 1185-1194 2001 Liu, G.P. and Daley, S.
"Optimization of the CD-ROM System Towards Higher Data Throughputs," Philips Optical Storage, The Netherlands, Chapters 1, 2, and 7 1999 Stan, Sorin G.
Petition for Inter Partes Review of U.S. Pat. No. 7,196,979 (Inter Partes Review No. IPR2014-01446) Filed Sep. 3, 2014, 69 pages.
Petition for Inter Partes Review of U.S. Pat. No. 7,839,729 (Inter Partes Review No. IPR2014-01445) Filed Sep. 3, 2014, 60 pages.
Petition for Inter Partes Review of U.S. Pat. No. 8,416,651 (Inter Partes Review No. IPR2014-01447) Filed Sep. 3, 2014, 73 pages.
Philips Data Sheet, OQ8868 (All 20 pages) Apr. 11, 1996 Philips.
Digital Servo Processor and Compact Disc Decoder With Ingetrated DAC (CD10) Philips Data Sheet, SAA7325 (Jun. 17, 1999) Philips, 69 pages.
Philips Data Sheet, SAA7325 (All 69 pages) 2000 Philips.
"Digital Servo Processor and Compact Disc Decoder with Integrated DAC (CD10)," Philips Data Sheet, SAA7326 (All 69 pages) Jun. 17, 1999 Philips.
Philips Data Sheet, SAA7370 (All 60 pages) Nov. 29, 1995 Philips.
Digital Servo Processor and Compact Disc Decoder (CD7) Philips Data Sheet, SAA7370A (All 60 pages) Nov. 29, 1995, Philips.
Philips Data Sheet, SAA7372 (All 49 pages) Dec. 6, 1995 Philips.
Philips Data Sheet, SAA7372 (All 61 pages) 1998 Philips.
"Digital Servo Processor and Compact Disc Decoder (CD7)," Philips Data Sheet, SAA7373 (61 pages) Jul. 6, 1998, Philips.
Philips Data Sheet, SAA7374 (All 60 pages) Dec. 6, 1995 Philips.
Philips Data Sheet, SAA7374 (All 60 pages) 1998 Philips.
Philips Data Sheet, SAA7376 (All 56 pages) Nov. 24, 1995 Philips.
Philips Data Sheet, SAA7377 (All 56 pages) 1998 Philips.
"Single Chip Digital Servo Processor and Compact Disc Decoder," Philips Data Sheet, SAA7378GP (All 45 pages) 1995 Philips.
Philips Data Sheet, TDA1300T (All 16 pages) Nov. 16, 1995 Philips.
Philips Data Sheet, TDA1301T (All 14 pages) 1994 Philips.
Philips Data Sheet, TDA1301T (All 16 pages) Jan. 1996 Philips.
Philips Data Sheet, TZA1022 (All 14 pages) 1998 Philips.
"Data Amplifier and Laser Supply Circuit for CD Audio and Video Optical systems (ADALASAuto)," Philips Data Sheet, TZA1026 (21 pages) Oct. 30, 1998, Philips.
Philips Data Sheet, SAA7324 (1999) Philips.
Philips Service Manual, AZ7381, AZ7382, AZ7383, AZ7481, AZ7482, AZ7483 Portable Compact Disc Player (All 31 pages) 1997 Philips.
Philips Service Manual, AZ7381, AZ7382, AZ7383, AZ7384, AZ7385, AZ7386, AZ7387, AZ7481, AZ7482, AZ7483 Portable Compact Disc Player (All 28 pages) 1997 Philips.
Philips Service Manual, AZ7562, AZ7565, AZ7566 Portable Compact Disc Player (All 28 pages) 1997 Philips.
Philips Service Manual, AZ7582, AZ7583 Portable Compact Disc Player (All 30 pages) 1997 Philips.
Philips Service Manual, AZ7780, AZ7781, AZ7783, AZ7784, AZ7880, AZ7881, AZ7882, AZ7883, AZ7884 Portable Compact Disc Player (All 24 pages) 1997 Philips.
Philips Service Manual, FW-V55 and FW-M55 (All 94 pages) 2000 Philips.
Philips Service Manual, AJ3950 Clock Radio (All 27 pages) 1995 Philips.
Philips Service Manual, AX1000, AX1001 Portable Compact Disc Player (All 21 pages) 1995 Philips.
Philips Service Manual, AZ1018 CD Stereo Radio Recorder (All 34 pages) 1995 Philips.
Philips Service Manual, AZ1040, AZ1045 CD Stereo Radio Recorder (All 47 pages) 1995 Philips.
Philips Service Manual, AZ1060, AZ1065 CD Stereo Radio Recorder (All 53 pages) 1995 Philips.
Philips Service Manual, AZ2030, AZ2035 CD Stereo Radio Recorder (All 34 pages) 1995 Philips.
Philips Service Manual, AZ7900 and AZ7901 (All 20 pages) 1999 Philips.
Philips Service Manual, AZ7902, AZ9001, AZ9002, AZ9003, AZ9011, AZ9101, AZ9102, AZ9103, AZ9104, AZ9106, AZ9111, AZ9113, AZ9141, AZ9142, AZ9143, AZ9201, AZ9202, AZ9203, AZ9211, AZ9213, AZ9214, AZ9218 Compact Disc Player (All 28 pages) 2000 Philips.
Philips Service Manual, AZ9003 (All 22 pages) 2000 Philips.
Philips Service Manual, AZ9015, AZ9225, and AZT9230 (All 32 pages) 2000 Philips.
Philips Service Manual, CD753 Compact Disc Player (All 34 pages) 1997 Philips.
Philips Service Manual, CDC775 (All 37 pages) 1999 Philips.
Philips Service Manual, CDR765 Compact Disc Recorder (All 78 pages) 1998 Philips.
Philips Service Manual, CDR775 (All 73 pages) 1999 Philips.
Philips Service Manual, CDR779 (All 78 pages) 2000 Philips.
Philips Service Manual, EXP101, EXP103 Portable MP3-CD Player (All 36 pages) 1999 Philips.
Philips Service Manual, FW316C, FW318C Mini System (All 88 pages) 1998 Philips.
Philips Service Manual, FW320C, FW45C Mini System (All 84 pages) 1998 Philips.
Philips Service Manual, FW339C, FW338C Mini System (All 90 pages) 1998 Philips.
Philips Service Manual, FW340C3701 Modular Audio System (All 69 pages) 1997 Philips.
Philips Service Manual, FW355C Mini System (All 86 pages) 1998 Philips.
Philips Service Manual, FW375P Mini System (All 114 pages) 1998 Philips.
Philips Service Manual, FW390C, FW398C Mini System (All 116 pages) 1999 Philips.
Philips Service Manual, FW520C, FW510C Mini System (All 93 pages) 1998 Philips.
Philips Service Manual, FW538, FW72C Mini System (All 124 pages) 1998 Philips.

(56) References Cited

OTHER PUBLICATIONS

Philips Service Manual, FW545C Mini System (All 116 pages) 1999 Philips.
Philips Service Manual, FW754P3701 Modular Audio System (All 96 pages) 1998 Philips.
Philips Service Manual, FW765P, FW795W Mini System (All 130 pages) 1998 Philips.
Philips Service Manual, FW768P Mini System (All 105 pages) 1999 Philips.
Philips Service Manual, FW775P Mini System (All 122 pages) 1998 Philips.
Philips Service Manual, FW-C100 Mini System (All 80 pages) 2000 Philips.
Philips Service Manual, FW-C280 Mini System (All 82 pages) 2000 Philips.
Philips Service Manual, FW-C380 Mini System (All 104 pages) 2000 Philips.
Philips Service Manual, FW-C700 Mini System (All 122 pages) 2000 Philips.
Philips Service Manual, FW-C780 Mini System (All 130 pages) 2000 Philips.
Philips Service Manual, FW-P900 Mini System (All 102 pages) 2000 Philips.
Philips Service Manual, FW-R7 (All 23 pages) 2000 Philips.
Philips Service Manual, MC118 Micro System (All 54 pages) 1995 Philips.
Philips Service Manual, MC148 Micro System (All 67 pages) 1995 Philips.
Philips Service Manual, MC-20 Micro System (All 44 pages) 1995 Philips.
Philips Service Manual, MC-30 Micro System (63 pages) 1995 Philips.
Philips User Manual, Premium 10501 (All 20 pages) May 7, 2000 Philips.
Philips User Manual, Premium 10502 (All 20 pages) May 7, 2000 Philips.
"Photodetector Amplifiers and Laser Supplies," Philips Preliminary Specification, TDA1300T; TDA1300TT, 20 pages.
"Position tracking control of an optical pick-up device using piezoceramic actuator," Mechatronics 11, pp. 691-705 2001 Choi, et al.
Preface, PID Control, Control Engineering Practice 9, pp. 1159-1161 2001 Astrom et al.
"Principles of Optical Disc Systems," Philips Research Laboratories, Eindhoven, pp. 7-188 1985 Bouwhuis.
"Repetitive control for the track-following servo system of an optical disc drive," 6 IEEE Transactions on Control System Technology, pp. 663-670 1998 Moon, J. et al.
"Robust Direct Seek Control for High-Speed Rotational Optical Disk Drives," IEEE, pp. 1273-1283 1998 Jin et al.
Philips Semiconductors, "Semiconductors for Multimedia PC: Designer's Guide," Philips Semiconductors, Oct. 1996.
"Semiconductors for Radio and Audio Systems: Data Handbook IC01," Philips Semiconductors (Part 1 of 2, 201 pages of 409 pages total) 1997.
"Semiconductors for Radio and Audio Systems: Data Handbook IC01," Philips Semiconductors (Part 2 of 2, 209 pages of 409 pages total) 1997.
"Sensing and Control in Optical Drives, How to Read Data from a Clear Disc," IEEE Control Systems Magazine, pp. 23-29 Jun. 2008 Chaghajerdi, Amir H.
"Servo Loop Gain Identification and Compensation in Hard Disk Head-Positioning Servo," Kang et al.; Samsung Elec. Co.; IEEE Transactions on Magnetics, vol. 34, No. 4, pp. 1889-1891 Jul. 1988 Kang.
Signal Processing Method for SuperDisk using PRML and System LSI Design, pp. 33-41 Dec. 14, 2000 Hiratsuka et al.
"Single Chip Processor for CDP and CDROM," IEEE, pp. 364-365 1995 Lee et al.
SSI 34H300, 5V Servo and Spindle Driver, Prototype (All two pages) Feb. 1997 Silicon Systems.
"Stability and performance of a variable gain controller with application a dvd storage drive," Automatica 40, pp. 591-602 2004 Heertjes, Marcel and Steinbuch, Maarten, Dec. 5, 2003.
"The CD-ROM Drive, a Brief System Description," Springer-Science+Business Media, B.V., Dordrecht, Chapters 1-3, 7 1998 Stan, Sorin G.
"The Compact Disc Story," J. Audio Eng. Soc., vol. 46, No. 5, pp. 458-465 May 1998 Schouhamer Immink, Kees A.
"The Development of Digital Servo Algorithms for Optical Players," IEEE, pp. 567-571 Jun. 8, 1990 Uekawa, et al.
"The Future of CD Technology, Part I, Next-Generation Compact Discs," Scientific American, pp. 42-46 Jul. 1996 Bell, Alan E.
"The Future of CD Technology, Part II, Blue-Laser CD Technology," Scientific American, pp. 48-51 Jul. 1996 Gunshor, Robert L. and Numikko, Arto V.
"The future of PID Control," Control Engineering Practice 9, pp. 1163-1175 2001 Astrom, K.J. and Hagglund, T.
Texas Instruments, "TMS320 DSP Development Support Reference Guide," Sections 3.6 and 3.11 (Cover Page and pp. 3-8, 3-9, 6-16, and 6-17, 5 pages total) May 1998 Texas Instruments.
Texas Instruments, "TMS320F20x/F24x DSP Embedded Flash Memory Technical Reference" (All 105 pages) Sep. 1998 Texas Instruments.
Declaration of Richard Zech, Ph.D., with regard to U.S. Pat. No. 7,196,979, Sep. 3, 2014, (Inter Partes Review No. IPR2014-0. 1446), 62 pages.
Declaration of Richard Zech, Ph.D., with regard to U.S. Pat. No. 7,839,729, Sep. 3, 2014, (Inter Partes Review No. IPR2014-01445), 60 pages.
Declaration of Richard Zech, Ph.D., with regard to U.S. Pat. No. 8,416,651, Sep. 3, 2014, (Inter Partes Review No. IPR2014-01447), 60 pages.

* cited by examiner

IN FOCUS

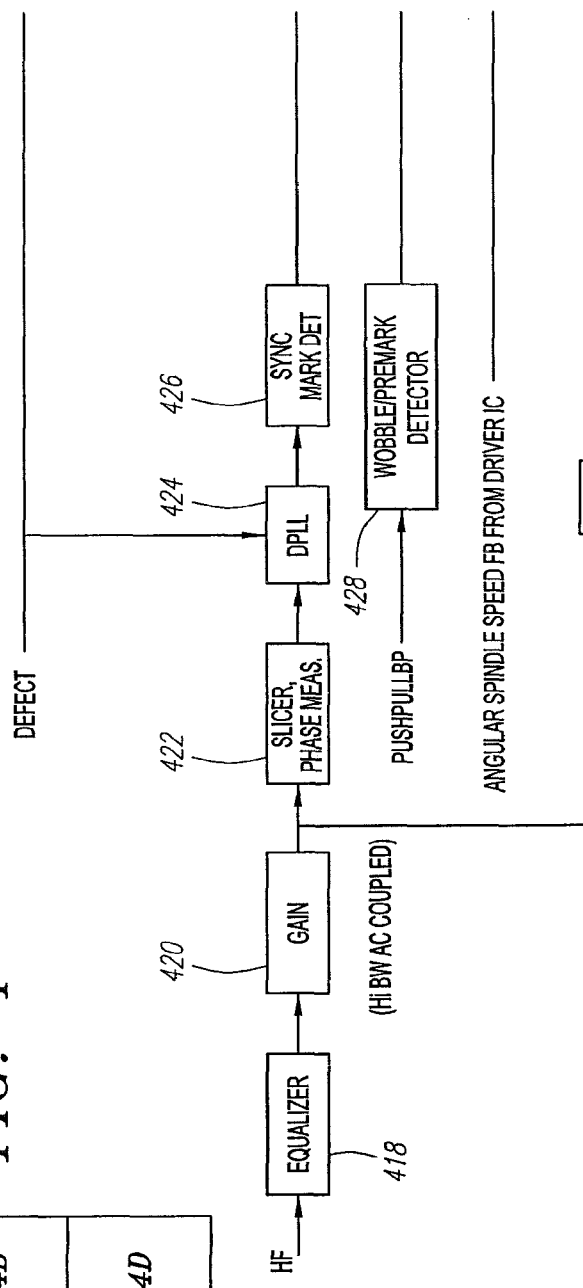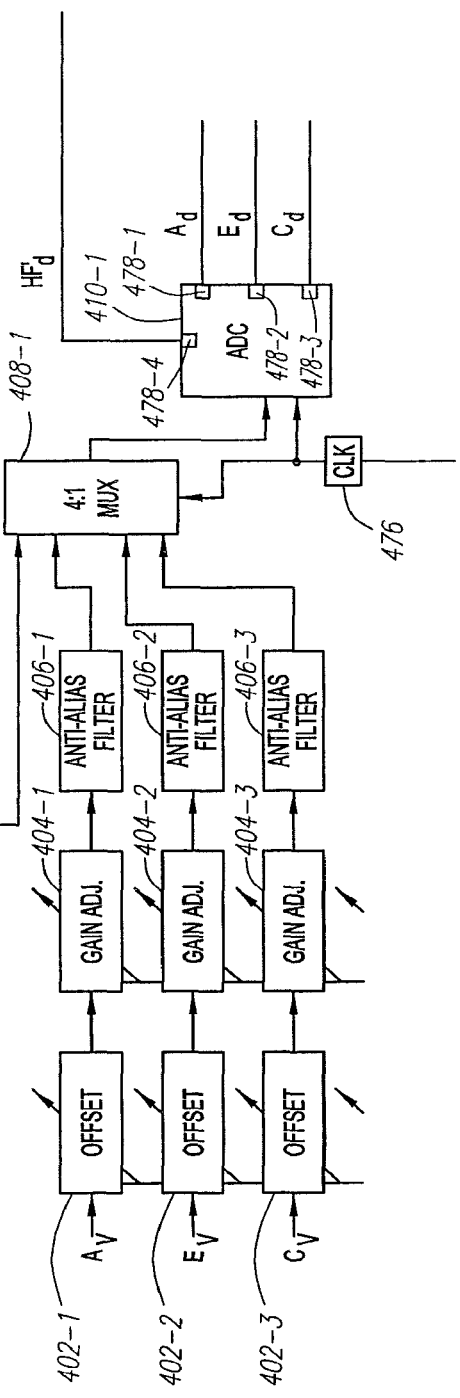
FIG. 4
FIG. 4A

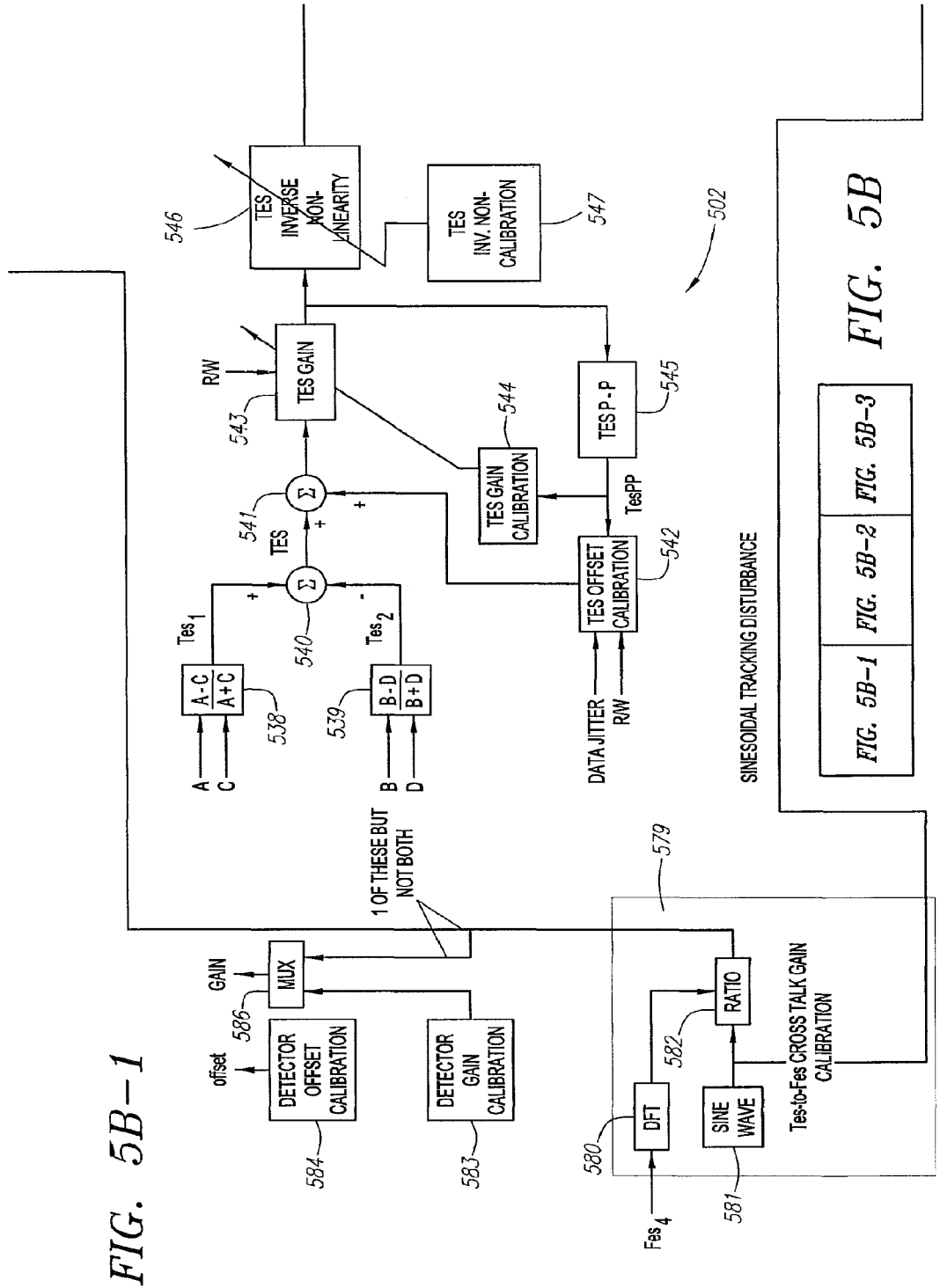

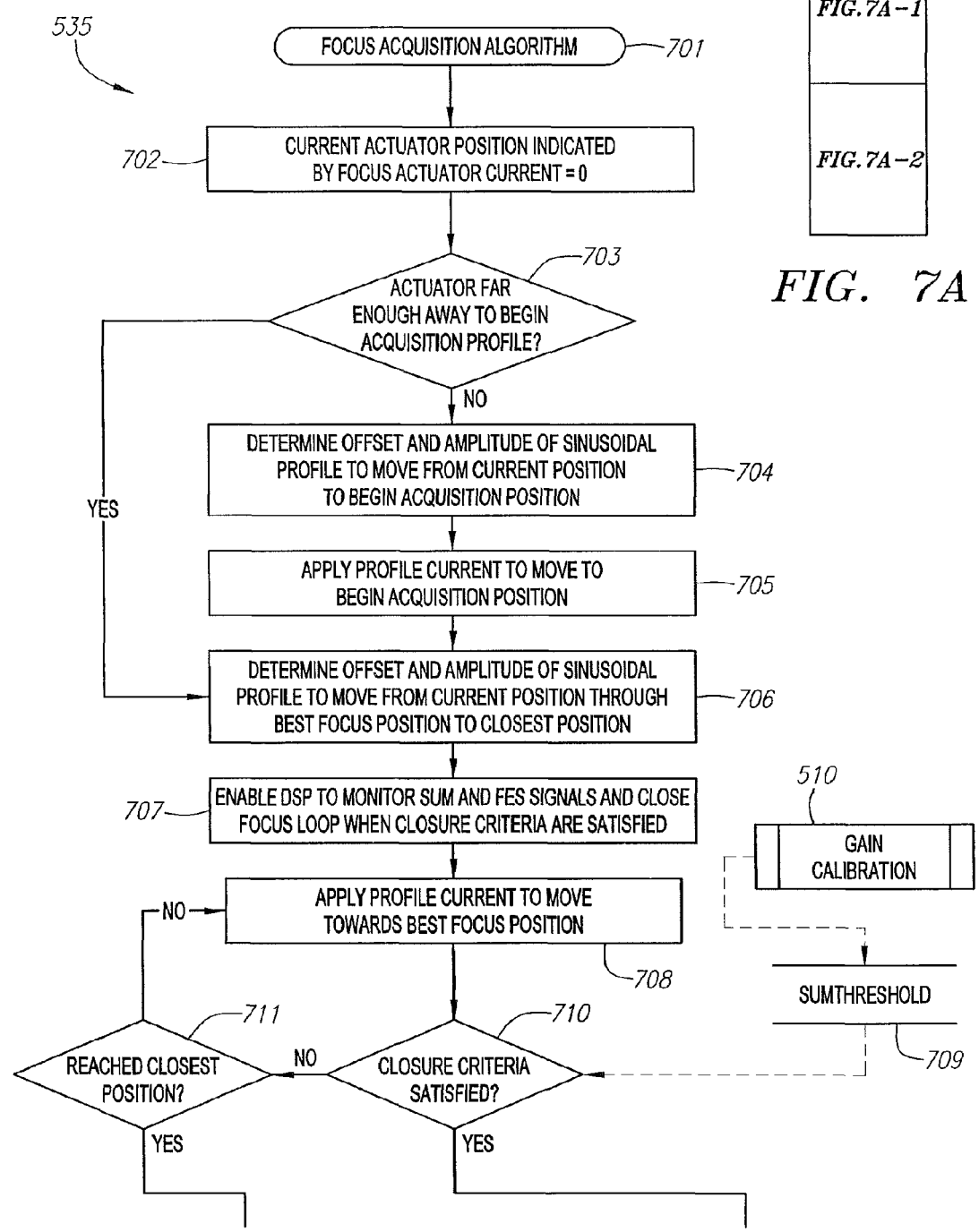

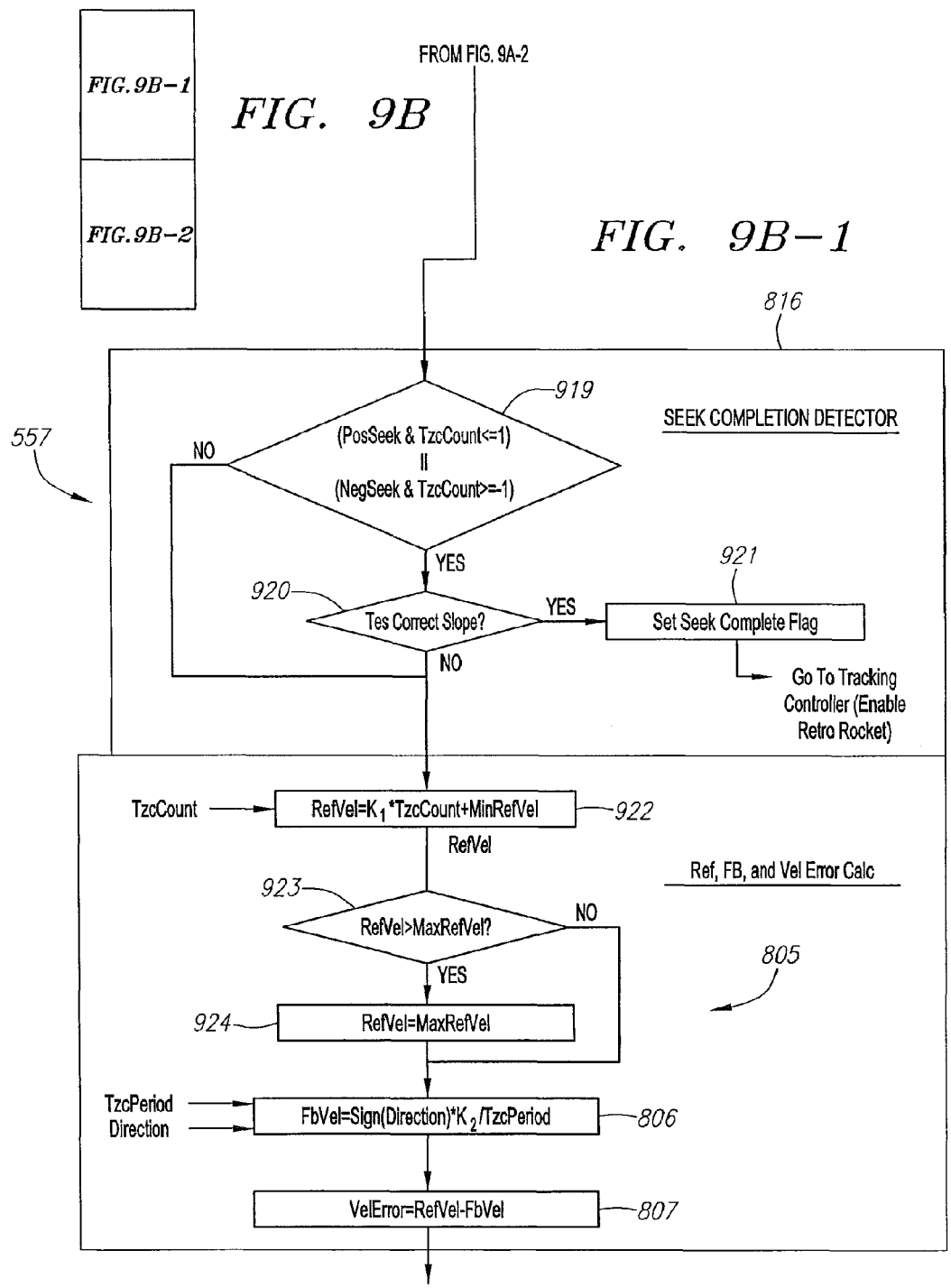

SERVO PROCESSOR RECEIVING PHOTODETECTOR SIGNALS

RELATED APPLICATIONS

This application is a continuation of U.S. application Ser. No. 14/819,796 (now U.S. Pat. No. 9,245,569), filed Aug. 6, 2015, which is a continuation of U.S. application Ser. No. 13/854,475 (now U.S. Pat. No. 9,105,281), filed Apr. 1, 2013, which is a continuation of U.S. application Ser. No. 12/952,135 (now U.S. Pat. No. 8,416,651), filed Nov. 22, 2010, which is a continuation of U.S. application Ser. No. 11/969,190 (now U.S. Pat. No. 7,839,729), filed Jan. 3, 2008, which is a continuation of U.S. application Ser. No. 09/950,378 (now U.S. Pat. No. 7,522,480), filed Sep. 10, 2001, which claims the benefit of U.S. Provisional Application No. 60/264,351, filed Jan. 25, 2001, each of which are herein incorporated by reference in its entirety. In addition, this application is related to U.S. application Ser. No. 14/037,482 (now U.S. Pat. No. 8,937,854), filed Sep. 26, 2013, which is herein incorporated by reference in its entirety.

BACKGROUND

1. Field of the Invention

The present invention relates to an optical disk drive and, in particular, to a digital servo system for an optical disk drive.

2. Discussion of Related Art

The need for compact data storage is explosively increasing. The explosive increase in demand is fueled by the growth of multimedia systems utilizing text, video, and audio information. Furthermore, there is a large demand for highly portable, rugged, and robust systems for use as multimedia entertainment, storage systems for PDA's, cell phones, electronic books, and other systems. One of the more promising technologies for rugged, removable, and portable data storage is WORM (write once read many) optical disk drives.

One of the important factors affecting design of an optical system (such as that utilized in a WORM drive) is the optical components utilized in the system and the control of actuators utilized to control the optical system on the disk. The optical system typically includes a laser or other optical source, focusing lenses, reflectors, optical detectors, and other components. Although a wide variety of systems have been used or proposed, typical previous systems have used optical components that were sufficiently large and/or massive that functions such as focus and/or tracking were performed by moving components of the optical system. For example, some systems move the objective lens (e.g. for focus) relative to the laser or other light source. It was generally believed that the relatively large size of the optical components was related to the spot size, which in turn was substantially dictated by designs in which the data layer of a disk was significantly spaced from the physical surface of the disk. A typical optical path, then, passed through a disk substrate, or some other portion of the disk, typically passing through a substantial distance of the disk thickness, such as about 0.6 mm or more, before reaching a data layer.

Regardless of the cause being provided for relative movement between optical components, such an approach, while perhaps useful for accommodating relatively large or massive components, presents certain disadvantages for more compact usage. These disadvantages include a requirement for large form factors, the cost associated with establishing and maintaining optical alignment between components which must be made moveable with respect to one another, and the power required to perform operations on more massive drive components. Such alignment often involves manual and/or individual alignment or adjustment procedures which can undesirably increase manufacturing or fabrication costs for a reader/writer, as well as contributing to costs of design, maintenance, repair, and the like.

Many early optical disks and other optical storage systems provided relatively large format read/write devices including, for example, devices for use in connection with 12 inch (or larger) diameter disks. As optical storage technologies have developed, however, there has been increasing attention toward providing feasible and practical systems which are of relatively smaller size. Generally, a practical read/write device must accommodate numerous items within its form factor, including the media, media cartridge (if any), media spin motor, power supply and/or conditioning, signal processing, focus, tracking or other servo electronics, and components associated or affecting the laser or light beam optics. Accordingly, in order to facilitate a relatively small form-factor, an optical head occupying small volume is desirable. In particular, it is desirable that the optical head have a small dimension in the direction perpendicular to the surface of the spinning media. Additionally, a smaller, more compact, optical head provides numerous specific problems for electronics designed to control the position and focus of the optical head.

Additionally, although larger home systems have little concern regarding power usage, portable personal systems should be low power devices. Therefore, it is also important to have a system that conserves power (e.g., by optically overfilling lenses) in both the optical system and the electronic controlling system.

Therefore, there is a need for an optical head and optical media drive system with a small form factor and, in addition, a servo system for controlling the optical head and optical drive system so that data can be reliably read from and written to the optical media.

SUMMARY

In accordance with an aspect of the invention, a digital servo for an optical disk drive is provided that includes: an analog-to-digital converter for converting low-pass filtered and gain-adjusted versions of photodetector output signals into digital signals; and a digital signal processor configured to receive the digital signals, the digital signal processor being further configured to determine a focus error signal (FES) and a tracking error signal (TES) from the digital signals, the digital signal processor being further configured to process TES and FES through servo algorithms to produce tracking and focus control signals.

In accordance with another aspect of the invention, a digital servo method for an optical disk drive is provided that includes: receiving at an integrated circuit photodetector output signals resulting from an illumination of an optical disk; within the integrated circuit, digitizing versions of the photodetector signals to produce digital signals; in a digital signal processor, processing the digital signals into either a tracking error signal (TES) or a focus error signal (FES); and in the digital signal processor, processing TES or FES through a servo algorithm to produce a control signal, the control signal being adapted to drive an actuator such that either TES or FES is minimized.

The optical media can be a relatively small-sized disk with readable data present on the surface of the disk.

Furthermore, the optical disk may have a pre-mastered portion and a writeable portion. The pre-mastered portion is formed when the disk is manufactured and contains readable data such as, for example, audio, video, text or any other data that a content provider may wish to include on the disk. The writeable portion is left blank and can be written by the disk drive to contain user information (e.g., user notes, interactive status (for example in video games), or other information that the drive or user may write to the disk). Because there may be optical differences, for example in reflectivity, and in the data storage and addressing protocols between the pre-mastered portion of the disk and the writable portion of the disk, a control system according to the present invention may have different operating parameters in the different areas of the disk.

The optical pick-up unit can includes a light source, reflectors, lenses, and detectors for directing light onto the optical media. The detectors can include laser power feedback detectors as well as data detectors for reading data from the optical media. The optical pick-up unit can be mechanically mounted on the actuator arm. The actuator arm includes a tracking actuator for controlling lateral movement across the optical media and a focus actuator for controlling the position of the optical pick-up unit above the optical medium. The tracking and focus actuators of the optical pick-up unit are controlled by the controller.

The servo system includes various servo loops for controlling the operation of aspects of the optical disk drive, for example the spin motor, the optical pick-up unit, and the controller. The servo loops, for example, can include combinations of a tracking servo loop and a focus servo loop.

These and other embodiments of the invention are further described below with respect to the following figures.

SHORT DESCRIPTION OF THE FIGURES

FIGS. 2M, 2N, 2O, 2P, 2Q, and 2R illustrate development of a tracking error signal (TES) as a function of position of the optical pick-up unit over the surface of the optical media in some embodiments of the present invention.

Figure 3A:
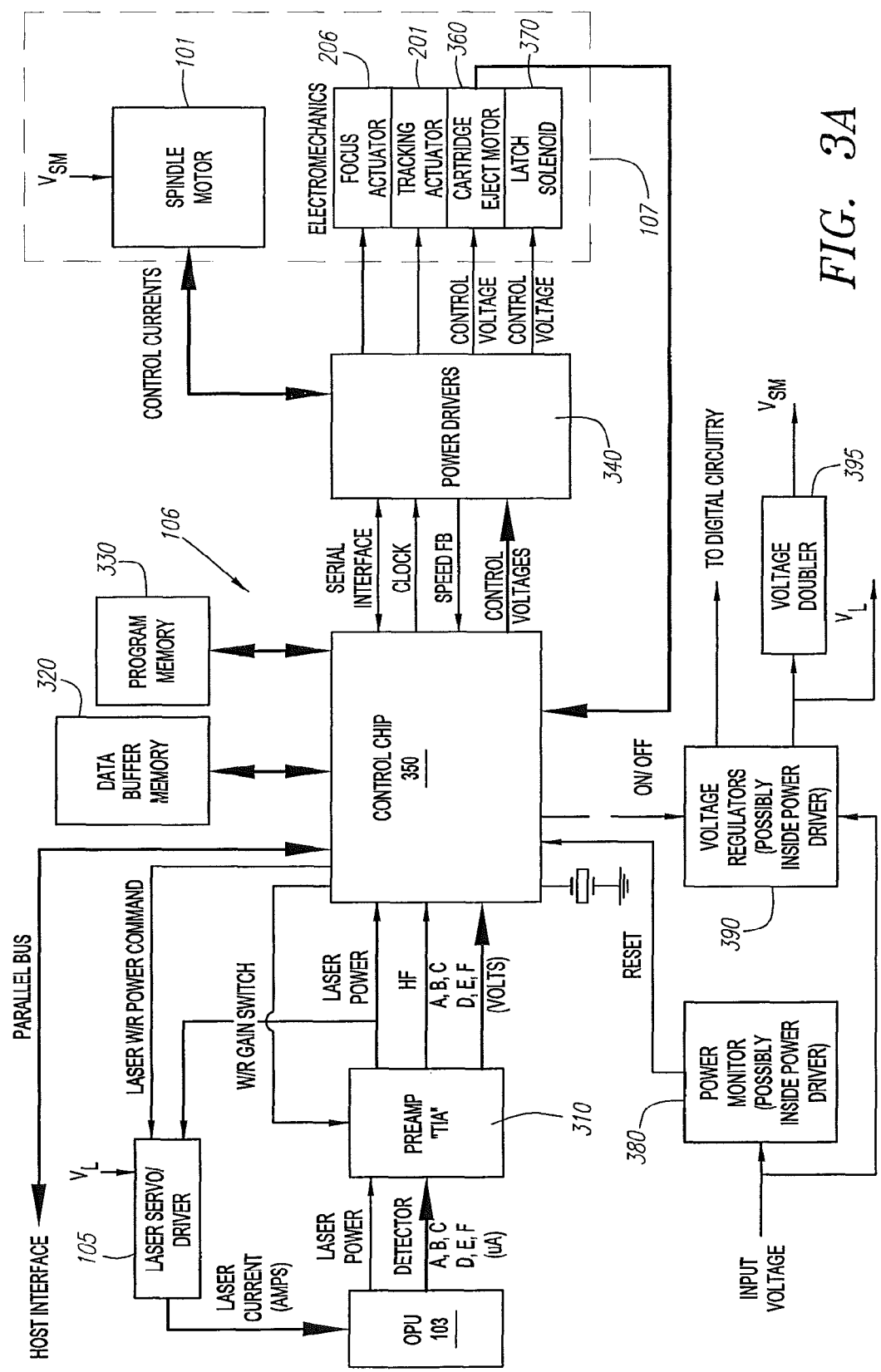

FIG. 3A shows a block diagram of a servo system control system of an optical drive according to some embodiments of the present invention.

Figure 3B:
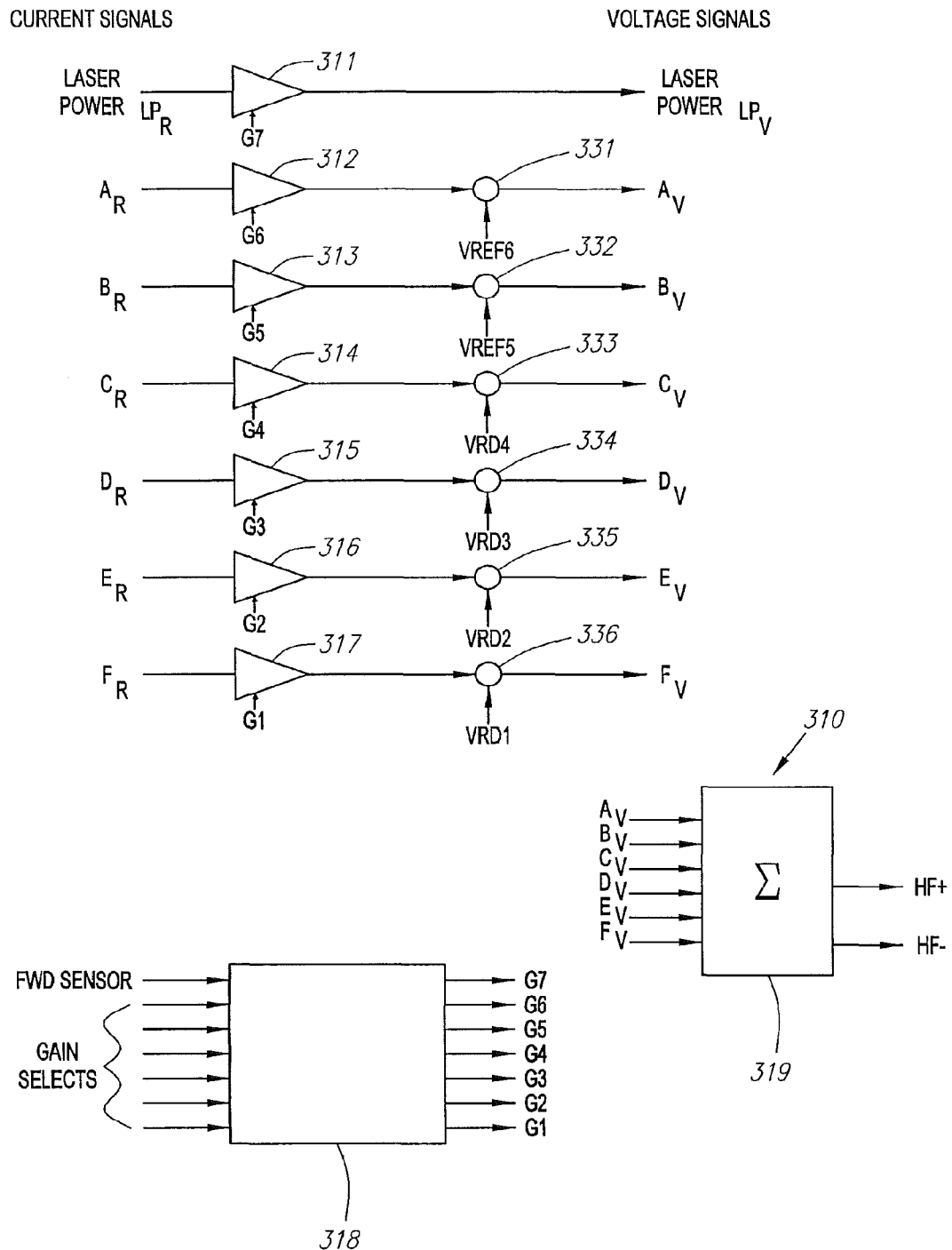

FIG. 3B shows a block diagram of a preamp of FIG. 3A.

Figure 4B:
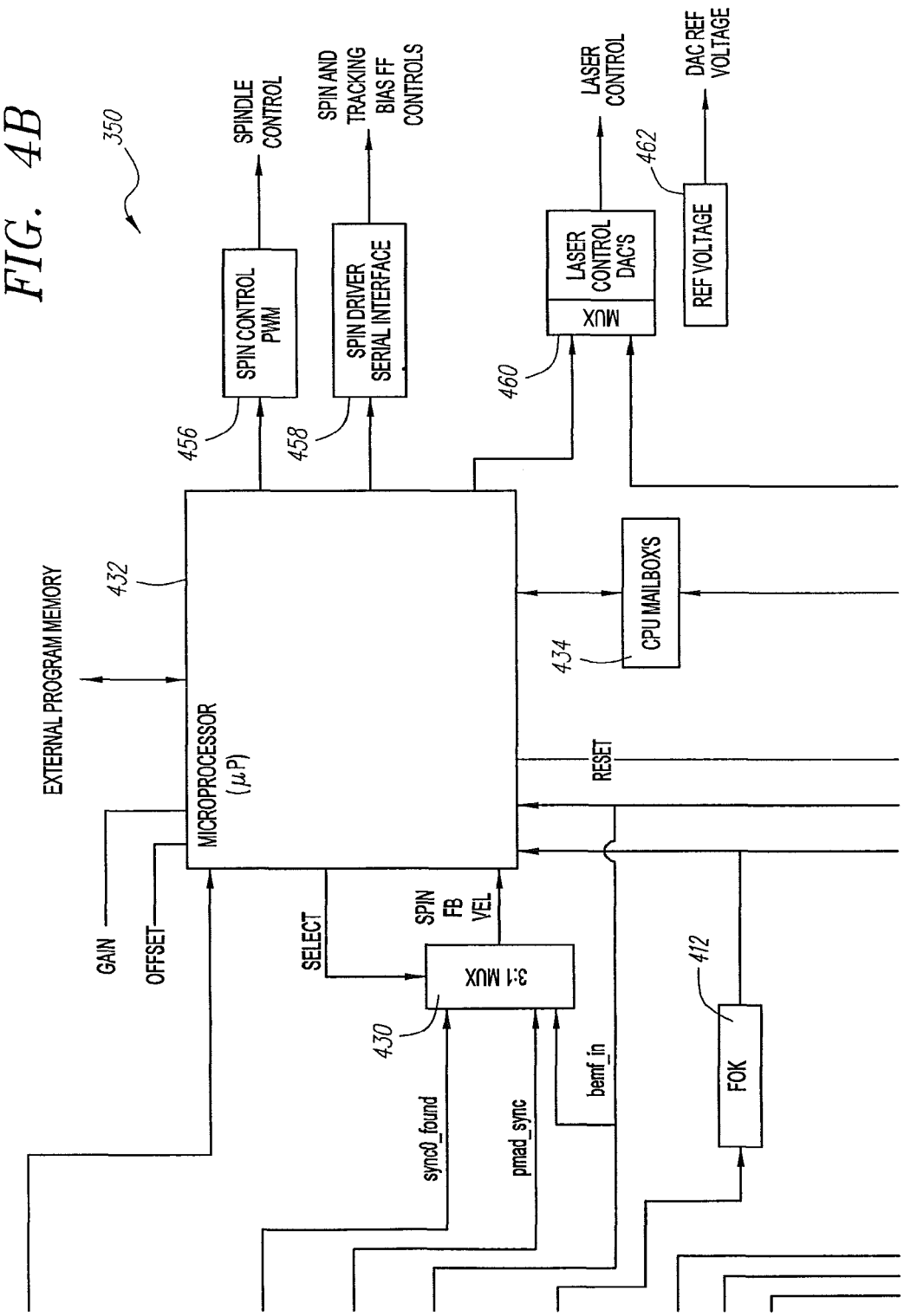
Figure 4C:
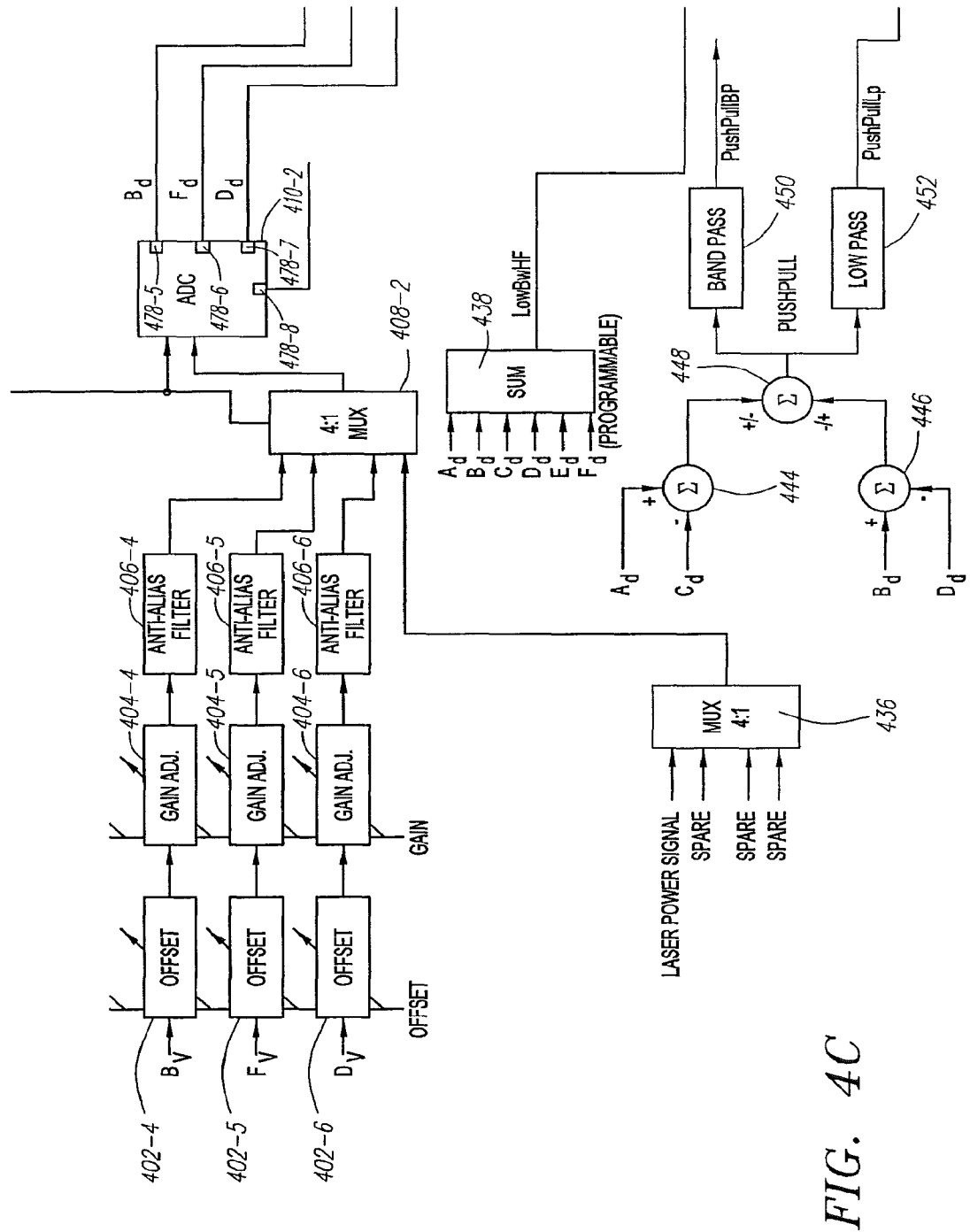
Figure 4D:
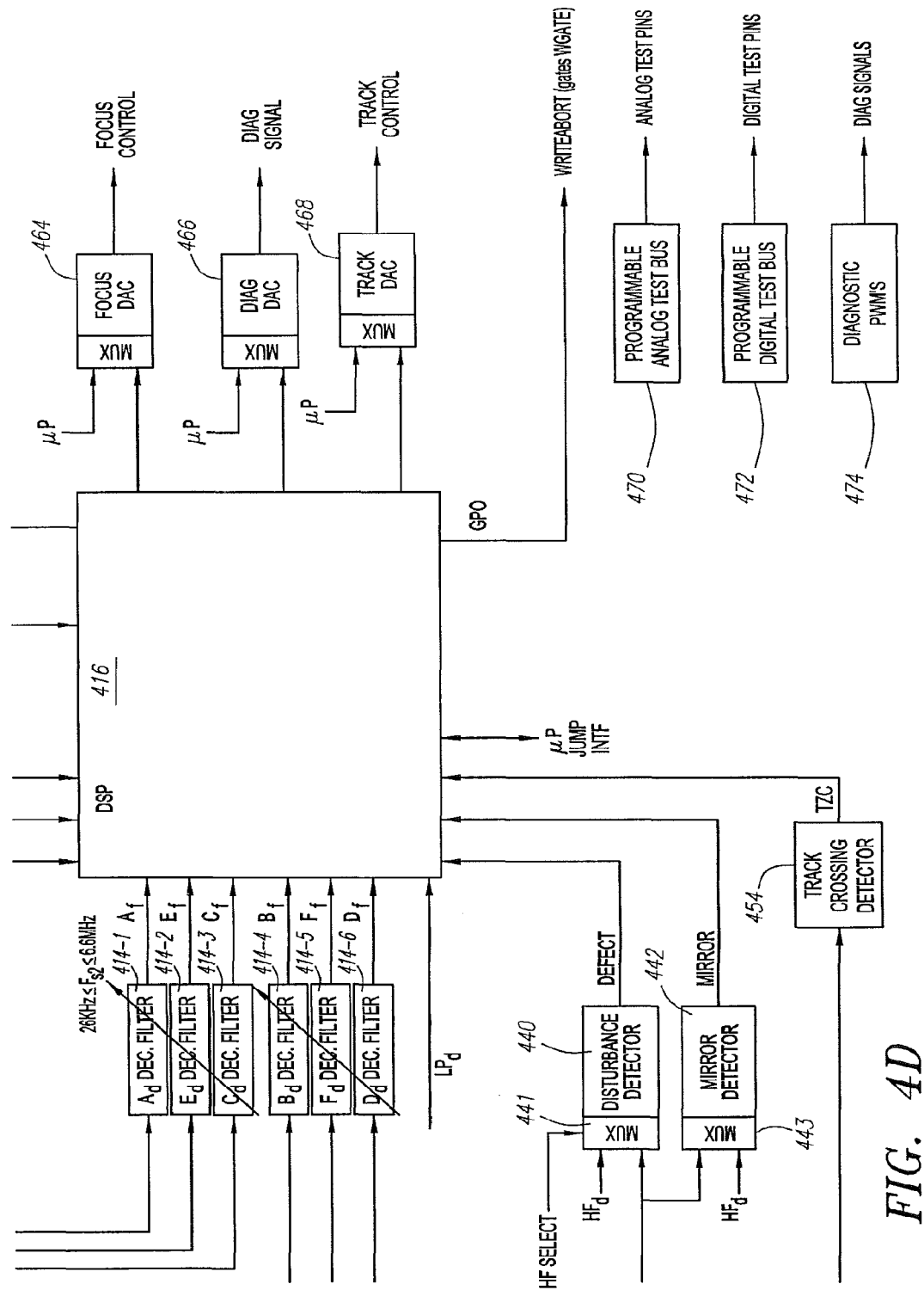

FIG. 4, including FIGS. 4A-4D, shows a block diagram of an embodiment of the controller chip shown in the block diagram of FIG. 3A according to some embodiments of the present invention.

Figures 1, 5A:
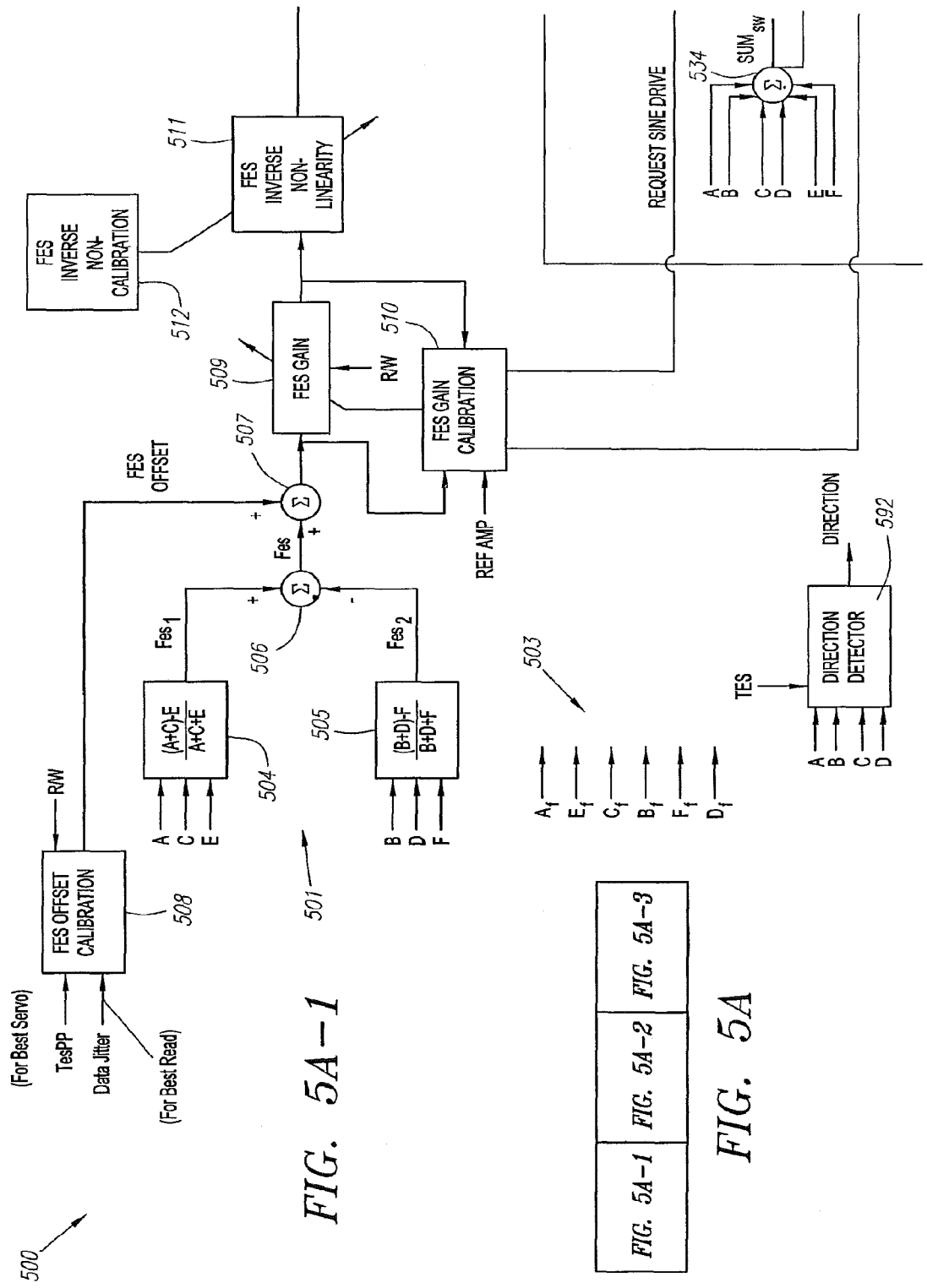
Figures 2, 5A:
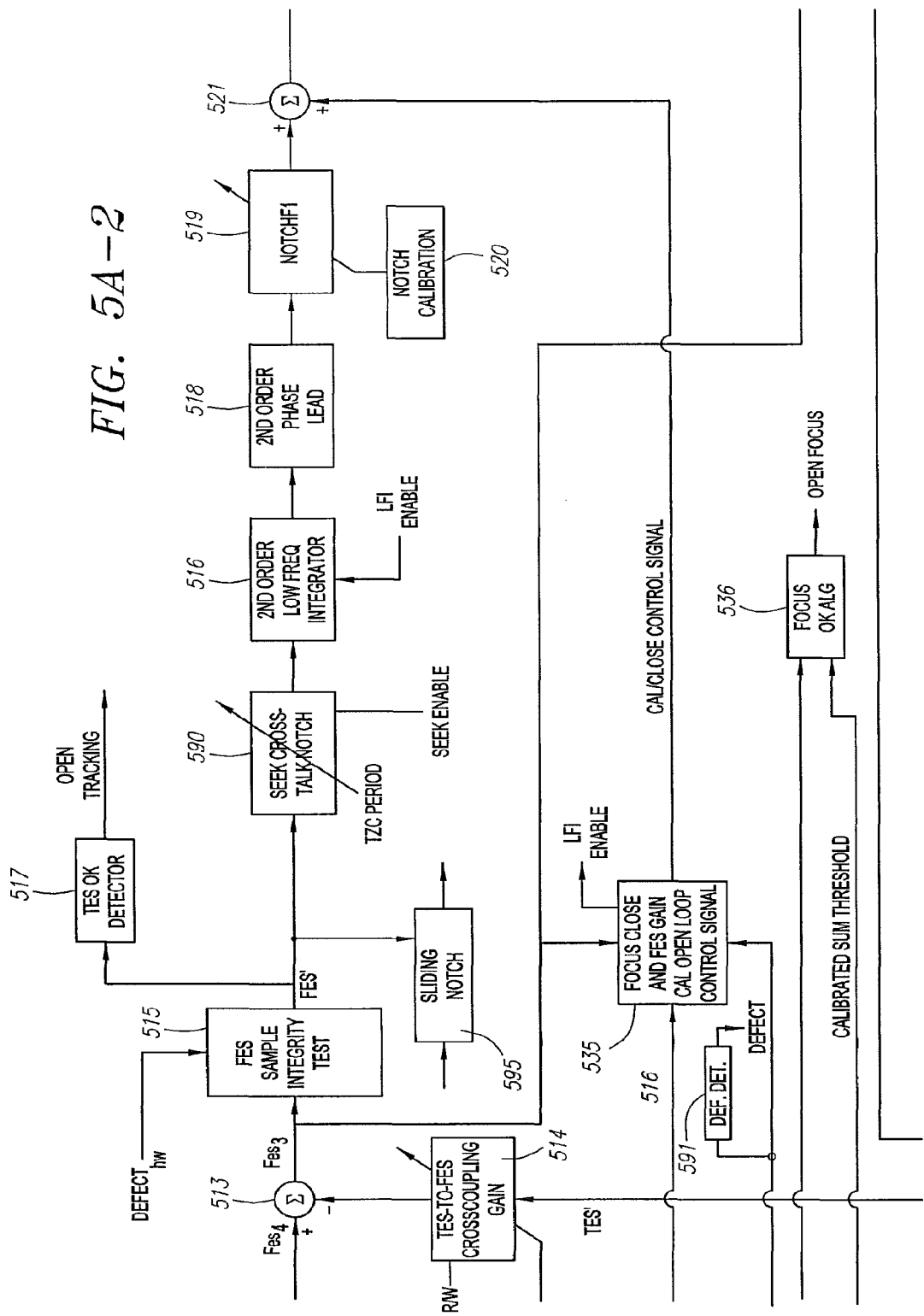
Figures 3, 5A:
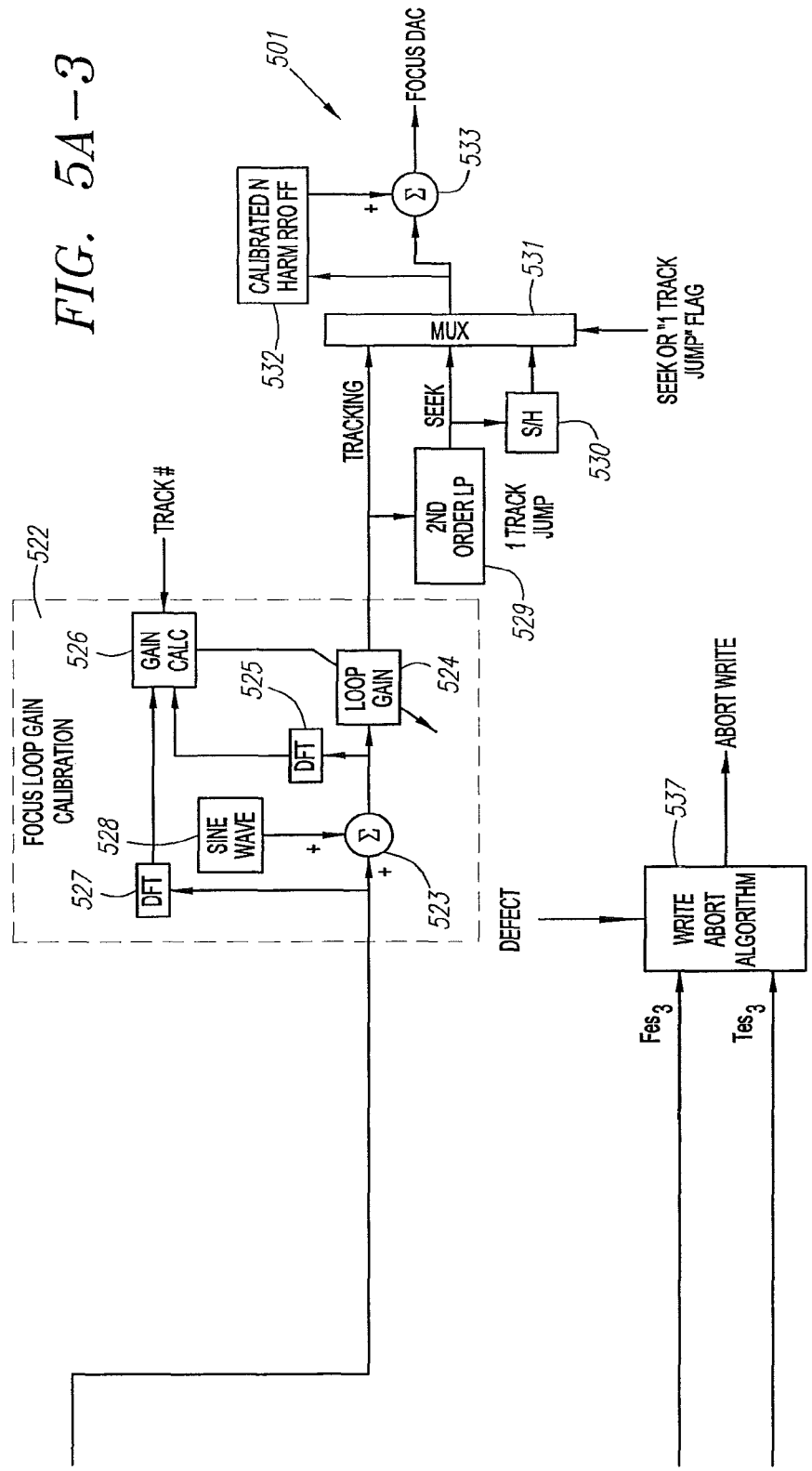
Figures 2, 5B:
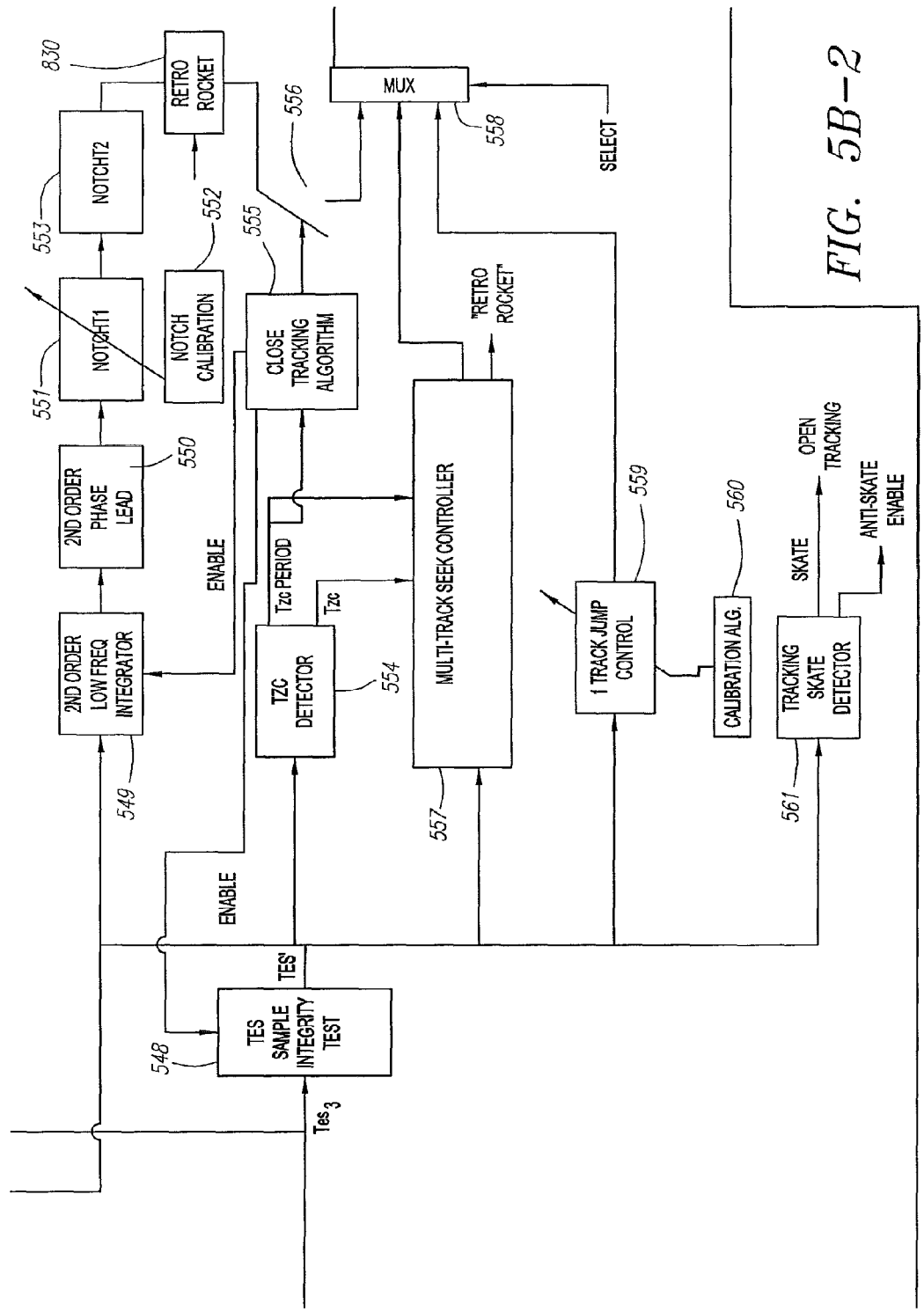
Figures 3, 5B:
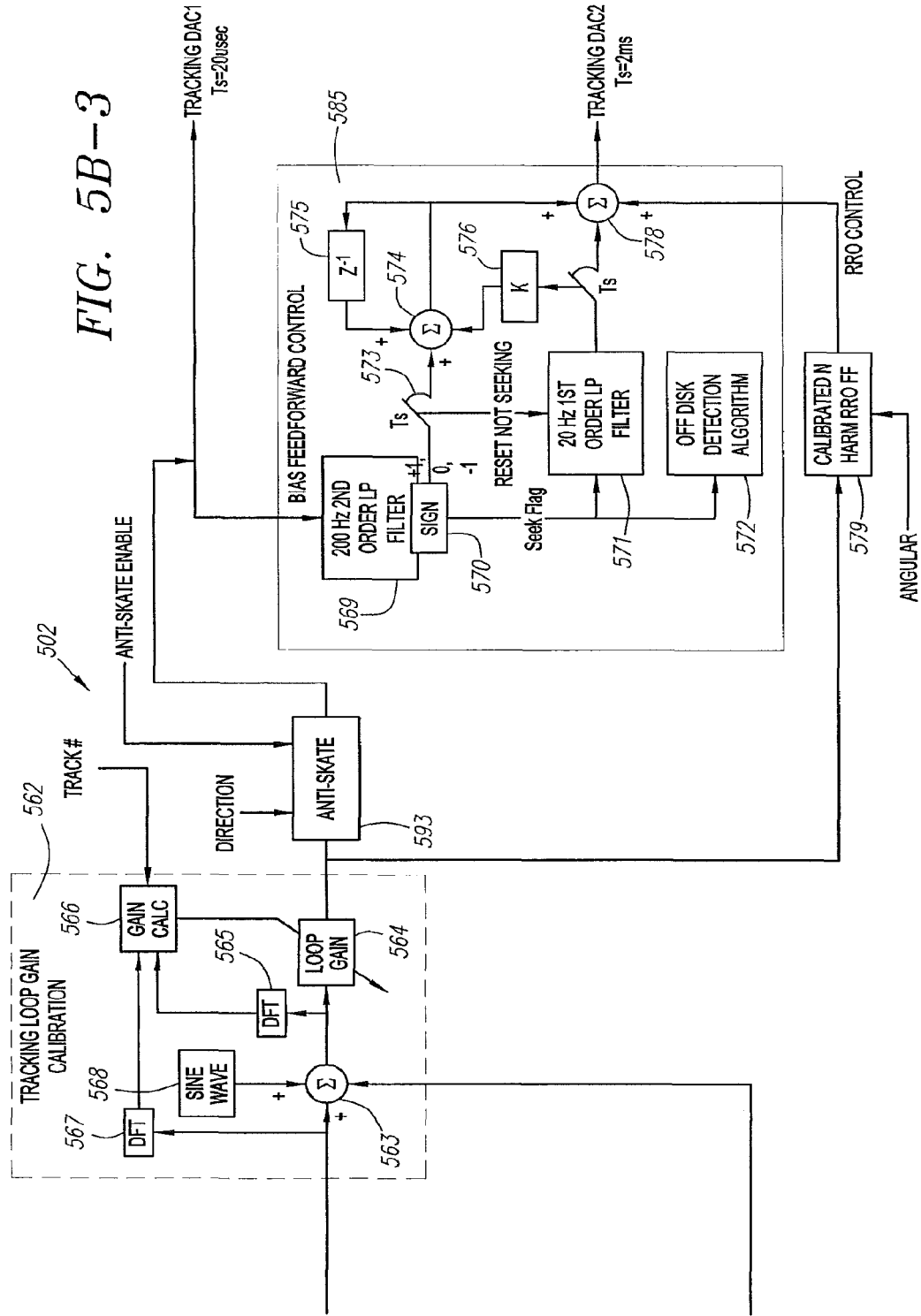

FIGS. 5A and 5B, including FIGS. 5A-1, 5A-2, 5A-3 and 5B-1, 5B-2, and 5B-3, show a function block diagram of embodiments of a focus and tracking servo algorithms according to some embodiments of the present invention.

Figure 5C:
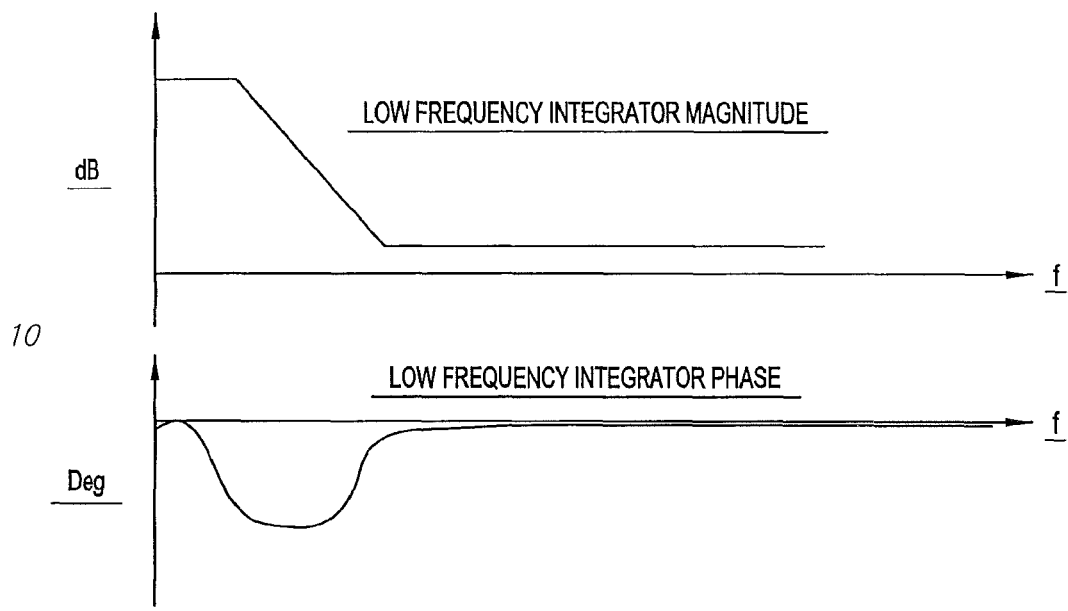

FIG. 5C shows an example transfer function for a low frequency integrator as shown in FIGS. 5A and 5B.

Figure 5D:
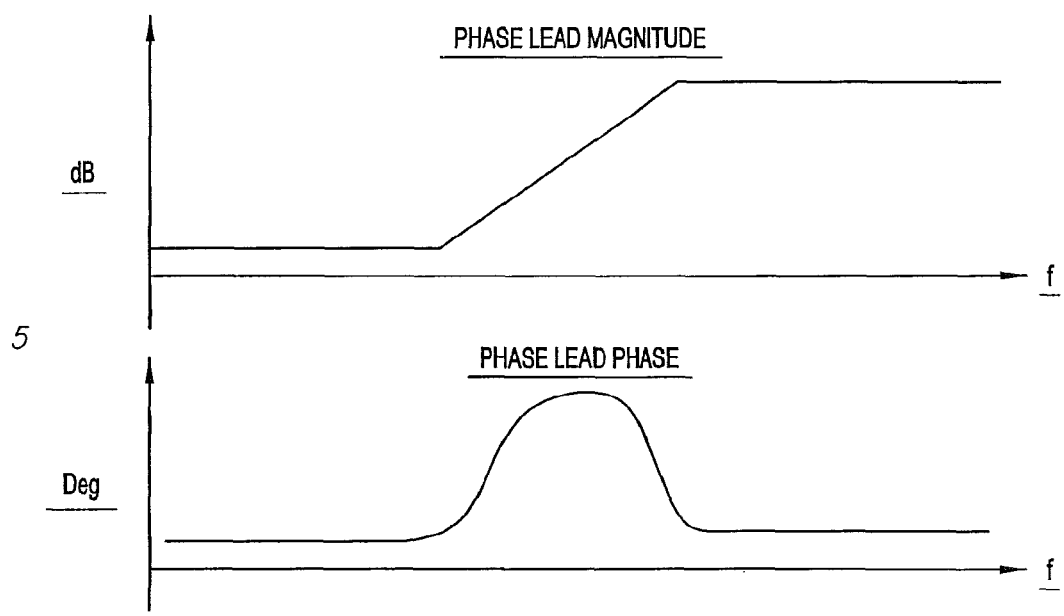

FIG. 5D shows an example transfer function for a phase lead as shown in FIGS. 5A and 5B.

Figure 5E:
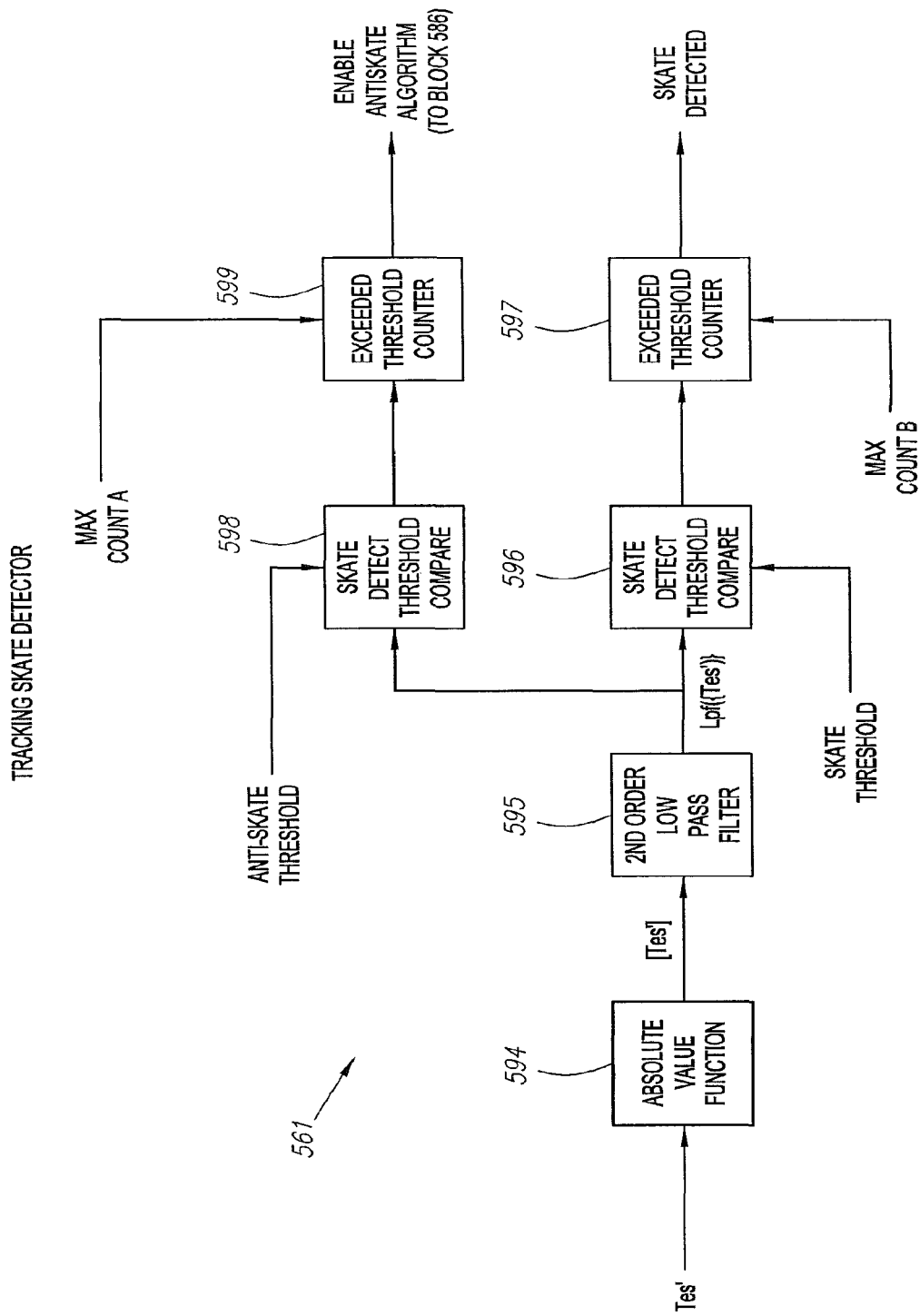
Figure 5F:
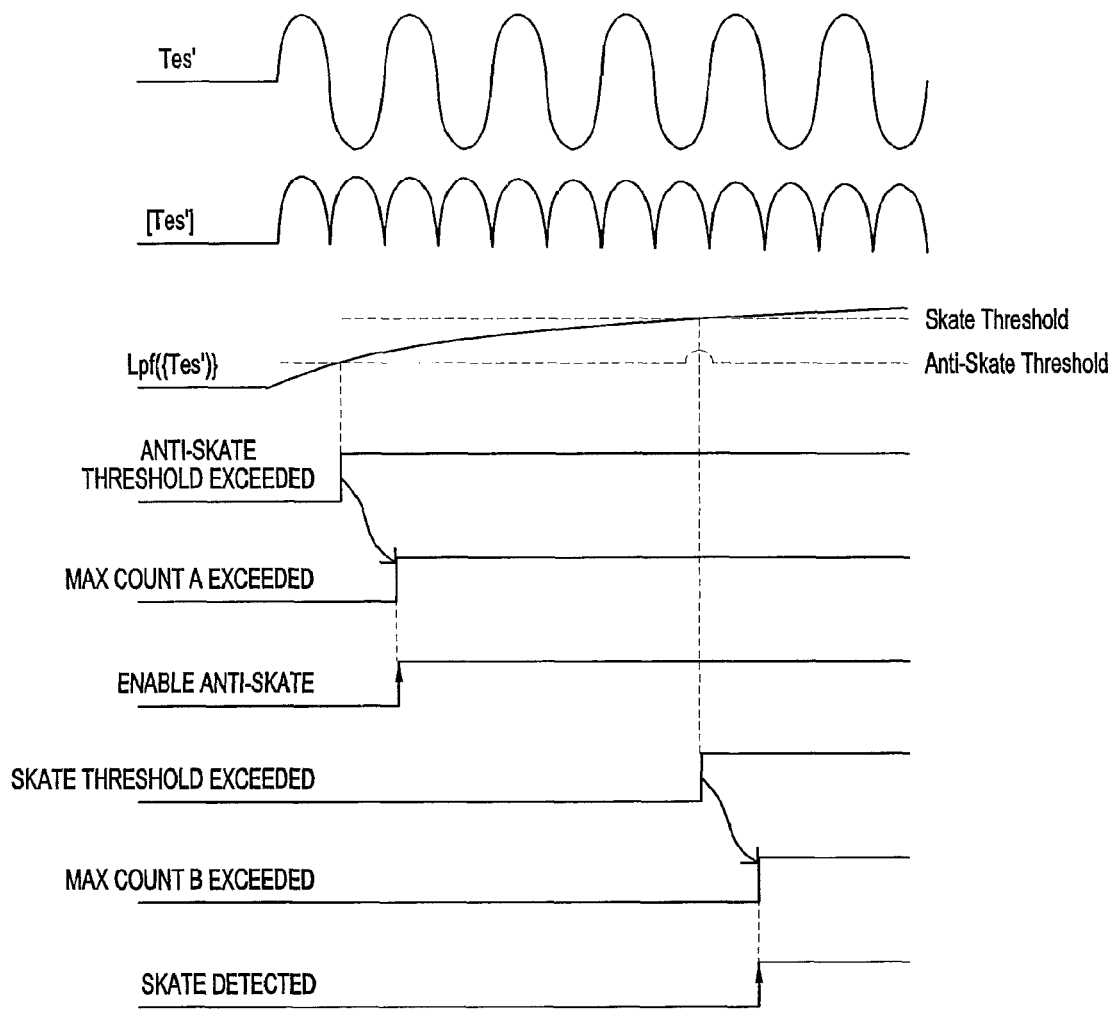

FIGS. 5E and 5F shows an example of a tracking skate detector according to some embodiments of the present invention.

Figure 5G:
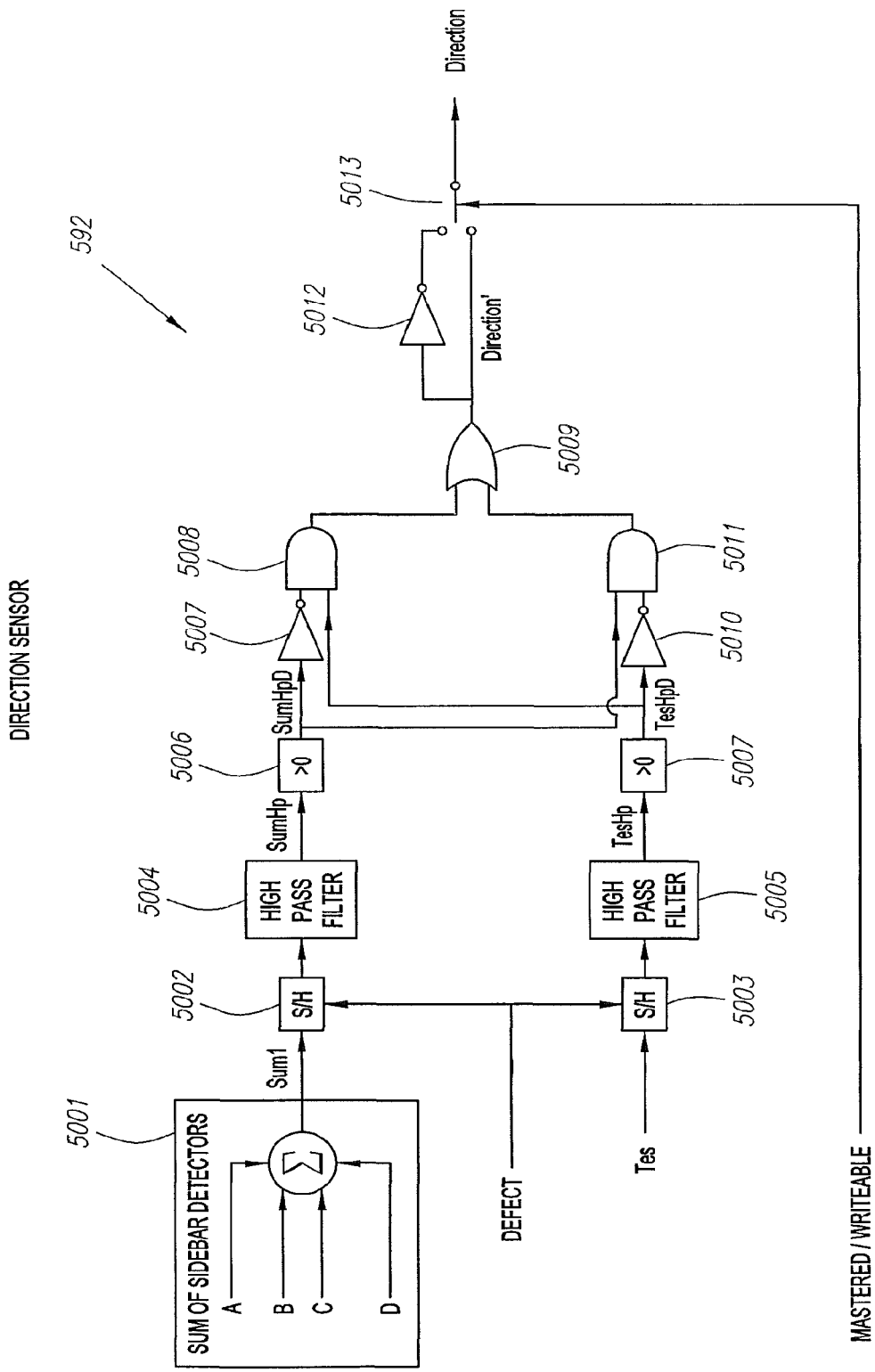

FIG. 5G shows an embodiment of a direction sensor according to some embodiments of the present invention.

Figure 6:
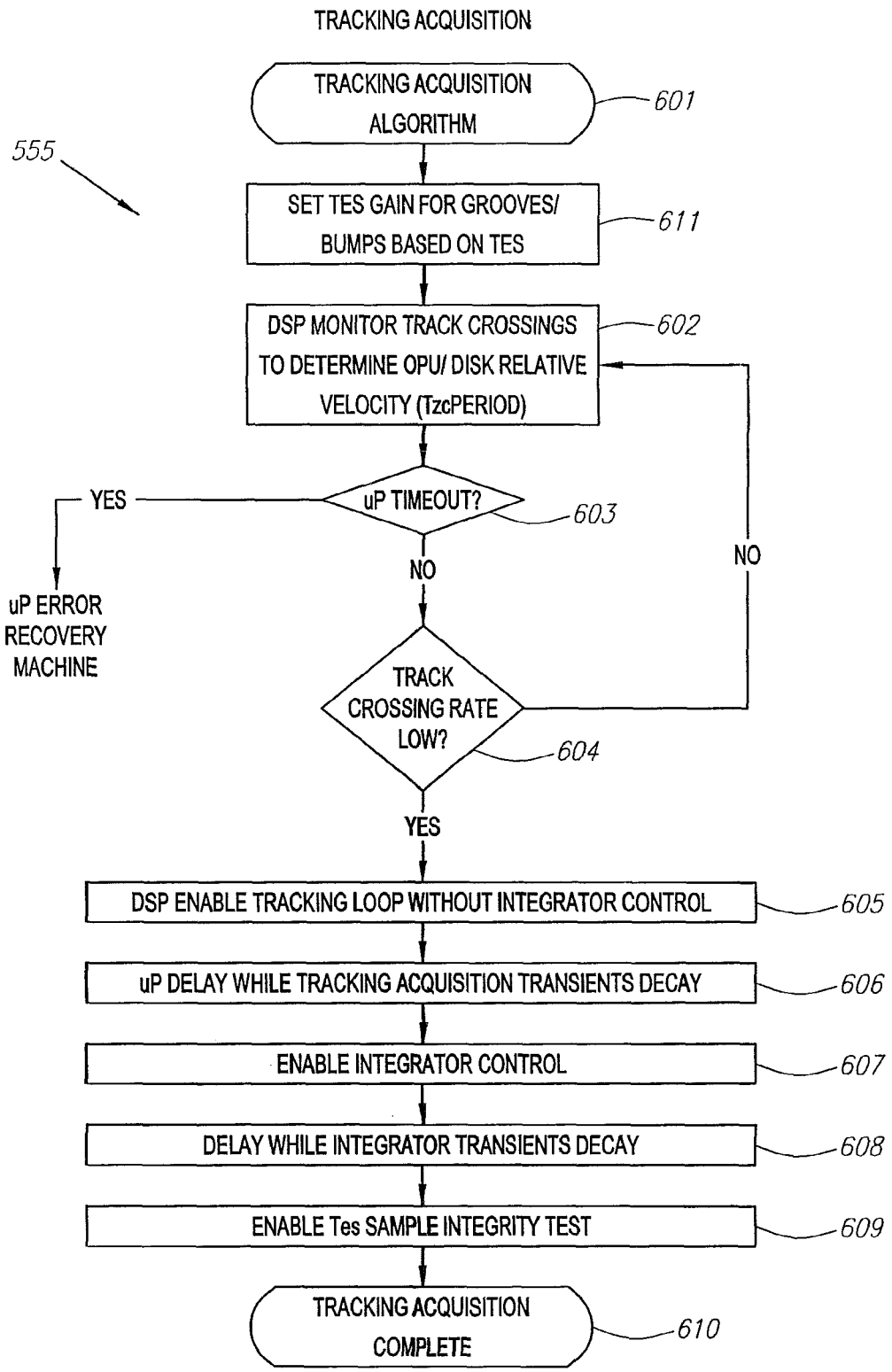

FIG. 6 shows an embodiment of a tracking acquisition algorithm executed with the algorithms shown in FIGS. 5A and 5B.

Figures 2, 7A:
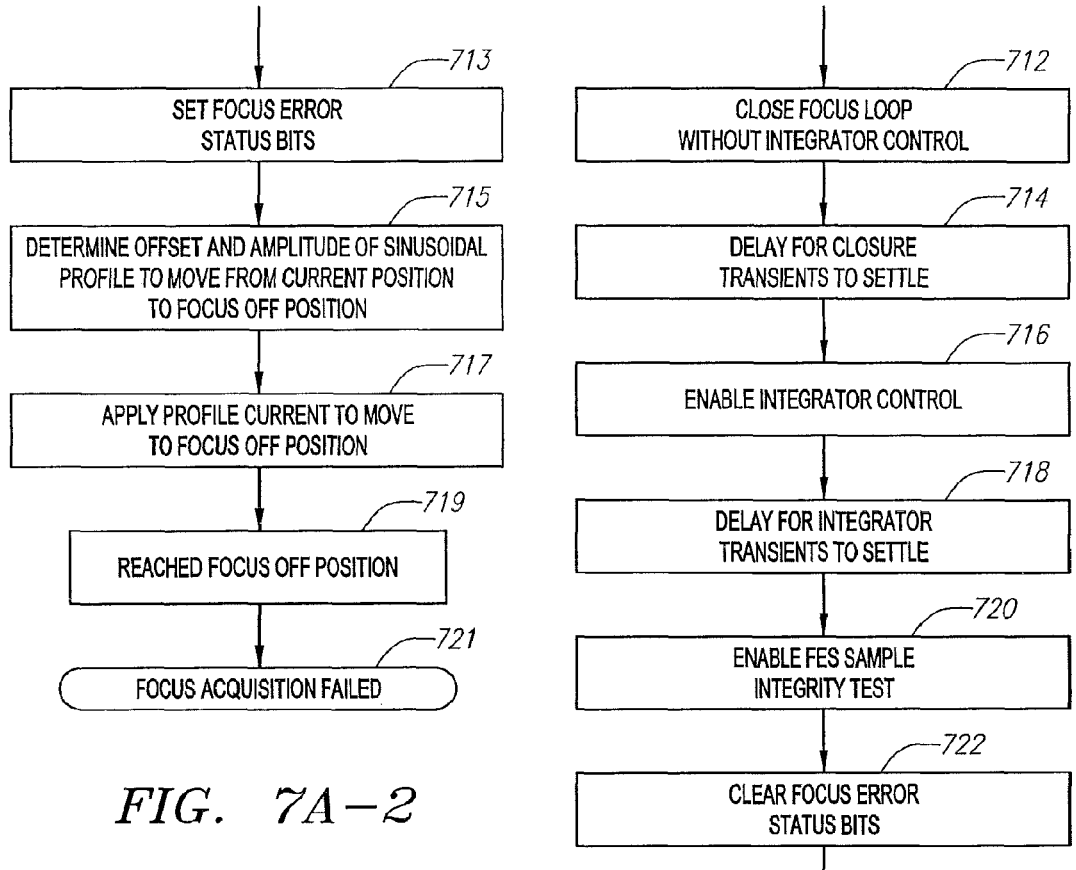

FIGS. 7A, 7B, 7C, and 7D, including FIGS. 7A-1 and 7A-2, show an embodiment of a focus acquisition algorithm executed with the algorithms shown in FIGS. 5A and 5B according to some embodiments of the present invention.

Figure 8A:
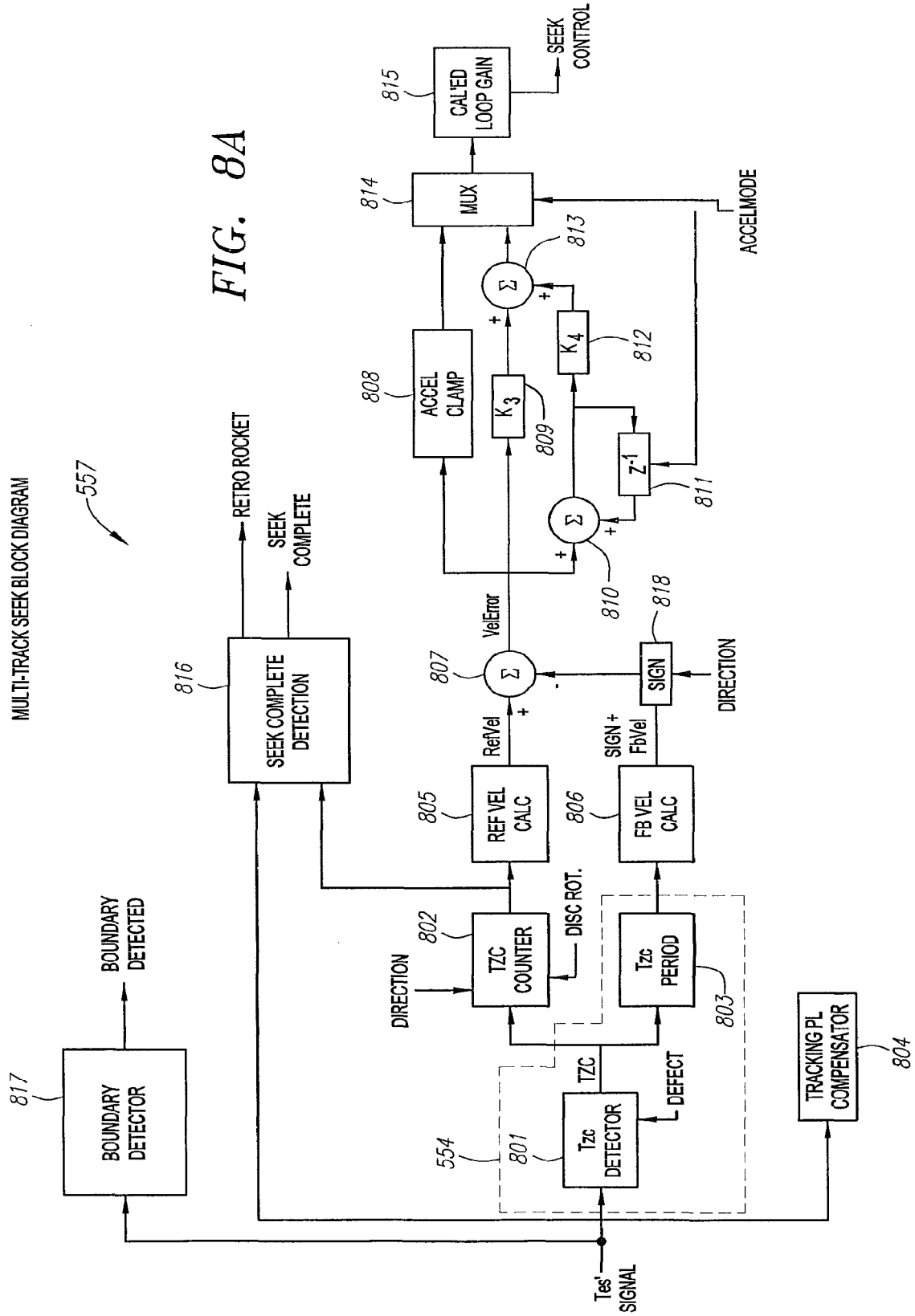
Figure 8B:
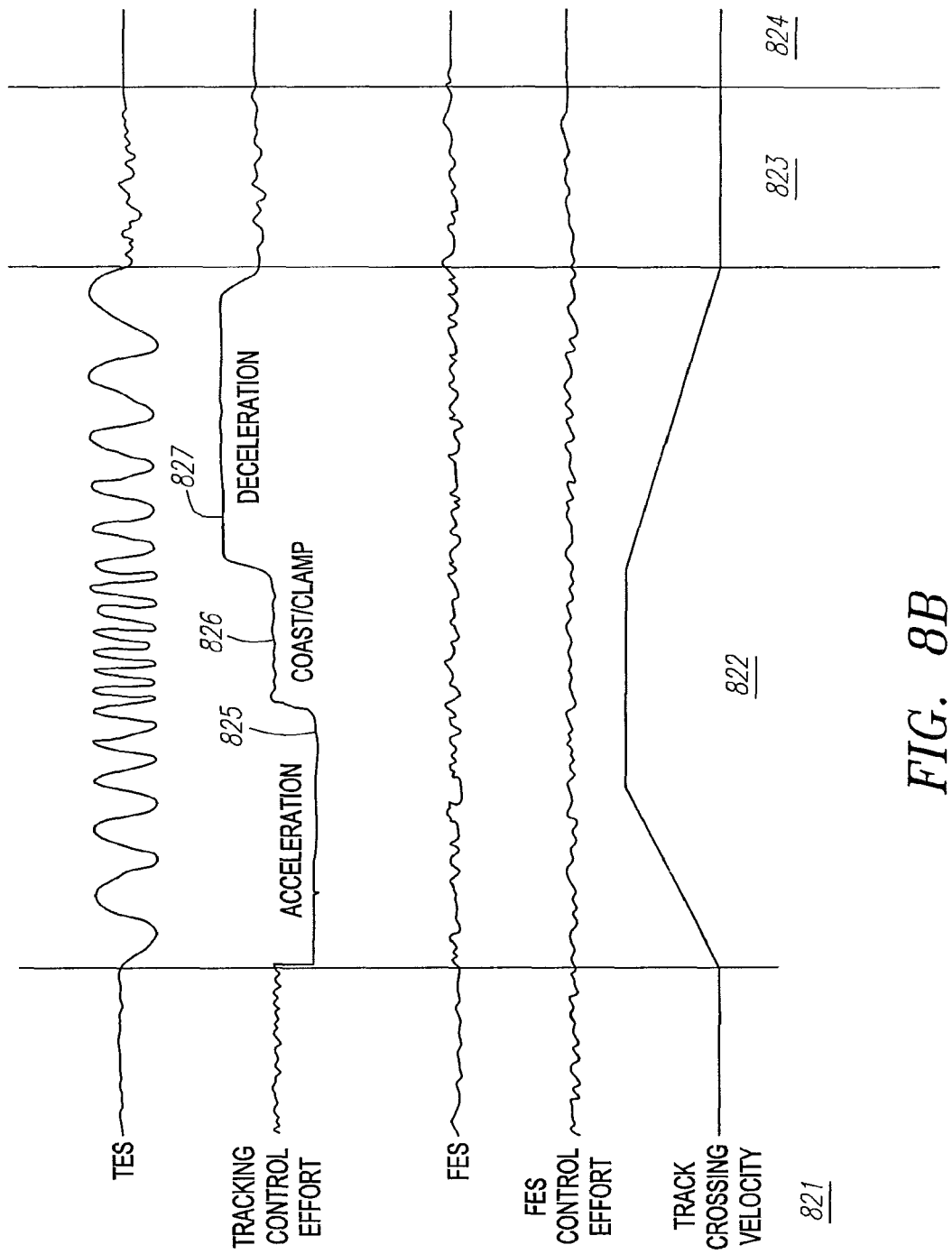

FIGS. 8A and 8B shows an embodiment of a multi-track seek algorithm according to some embodiments of the present invention.

Figure 9A:
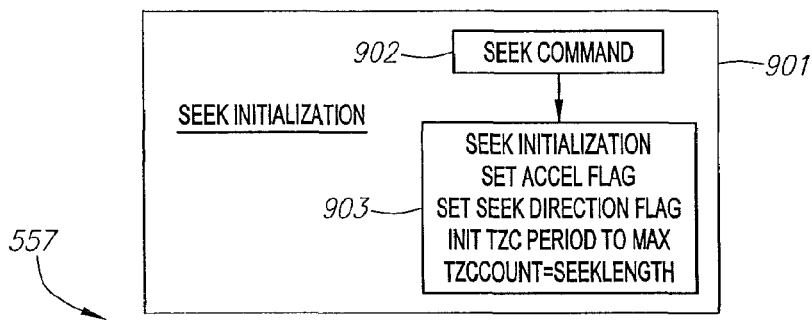
Figure 1:
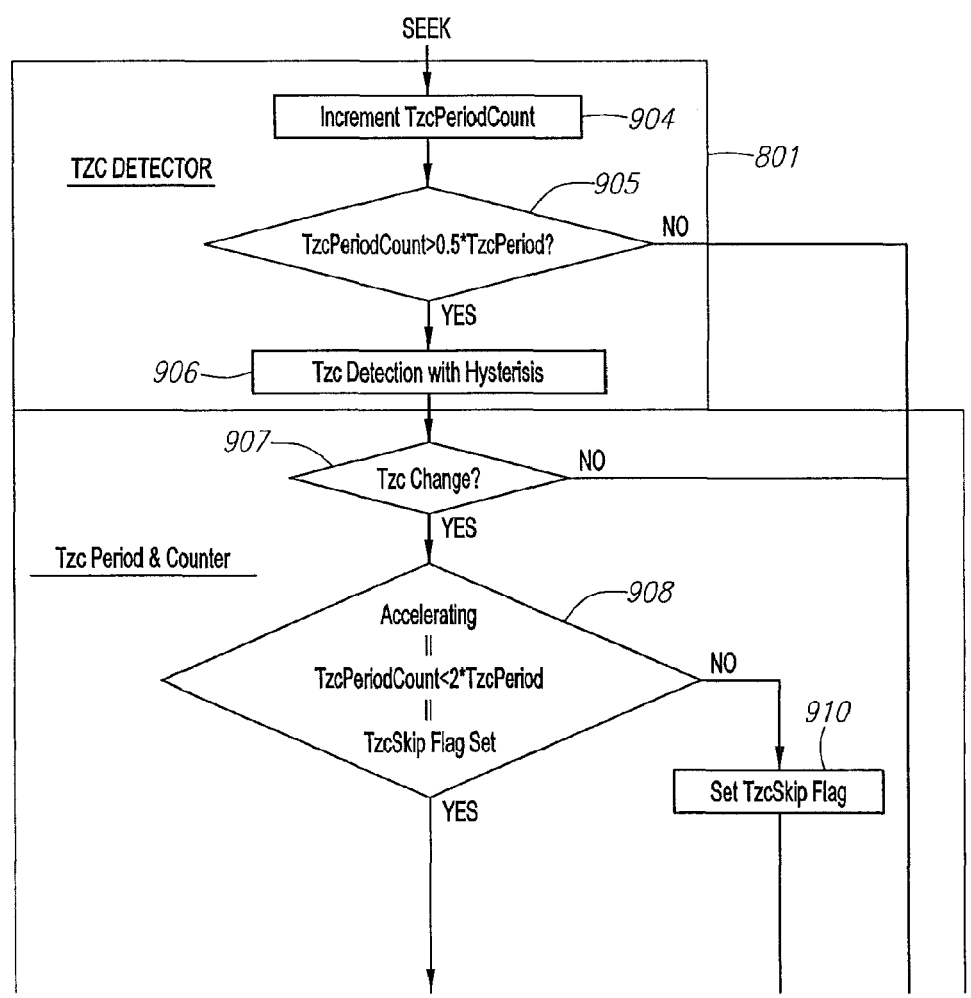
Figures 2, 9A:
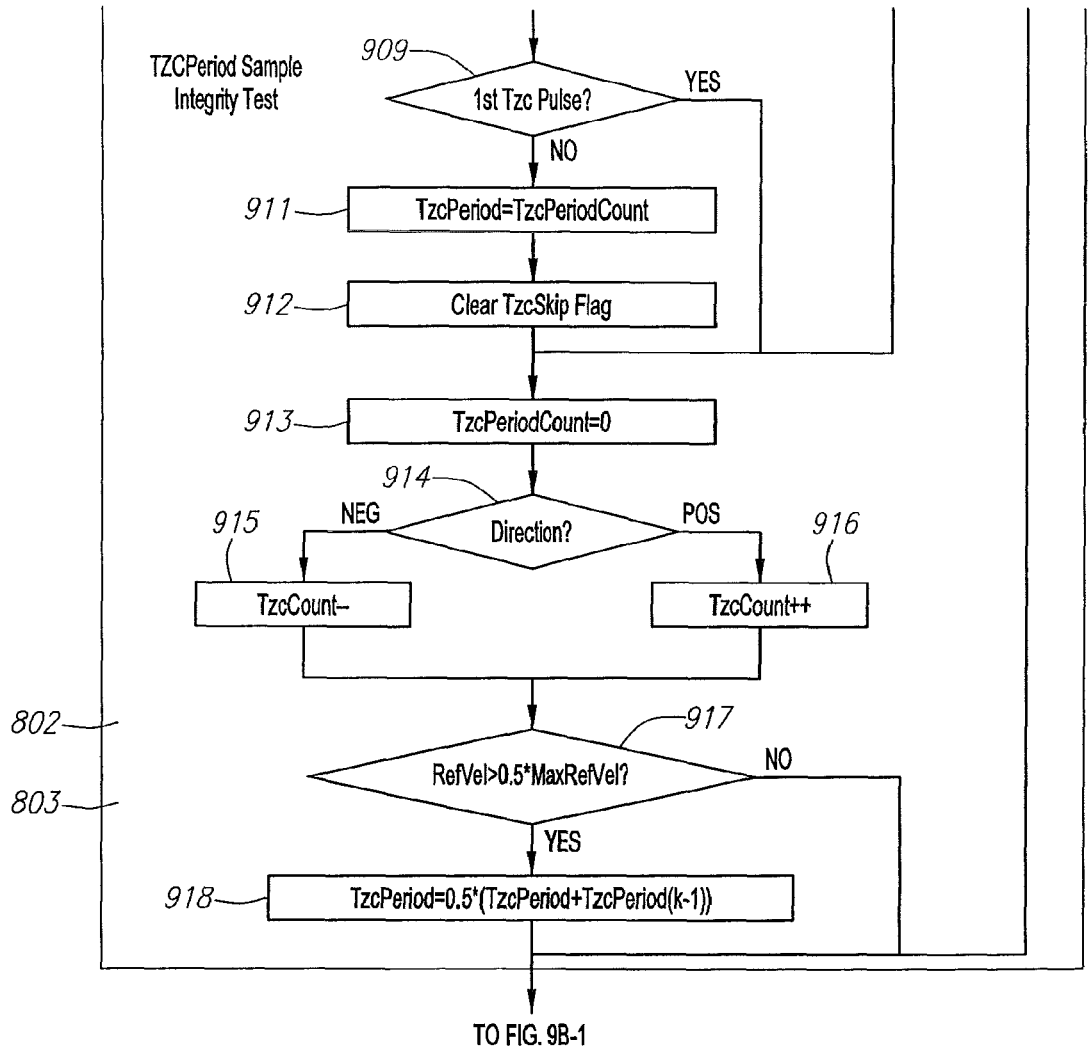
Figures 2, 9B:
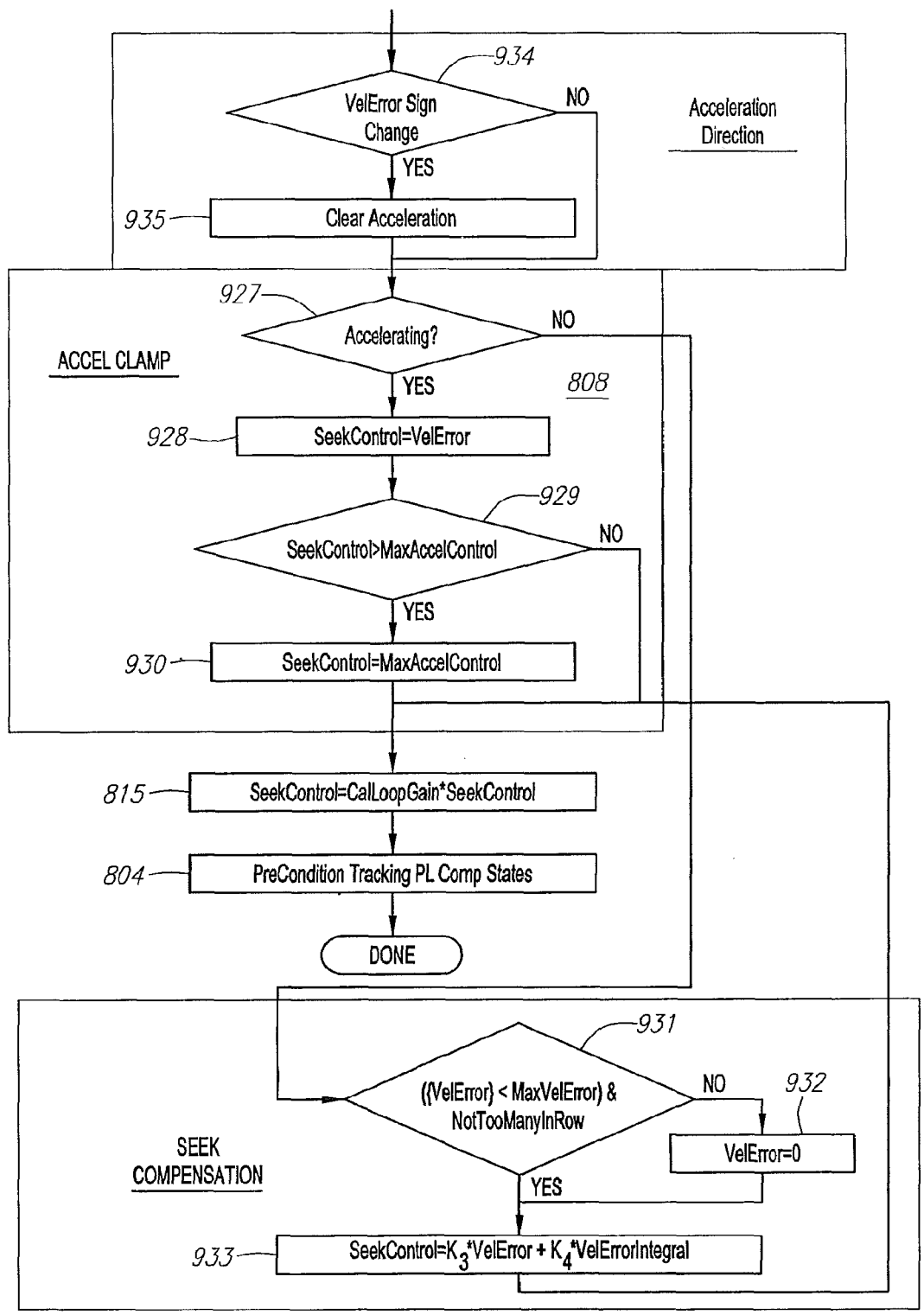

FIGS. 9A and 9B, including FIGS. 9A-1, 9A-2, 9B-1, and 9B-2, show an embodiment of a multi-track seek algorithm executed with the algorithms illustrated in the functional block diagram shown in FIGS. 8A and 8B in some embodiments of the present invention.

Figure 9C:
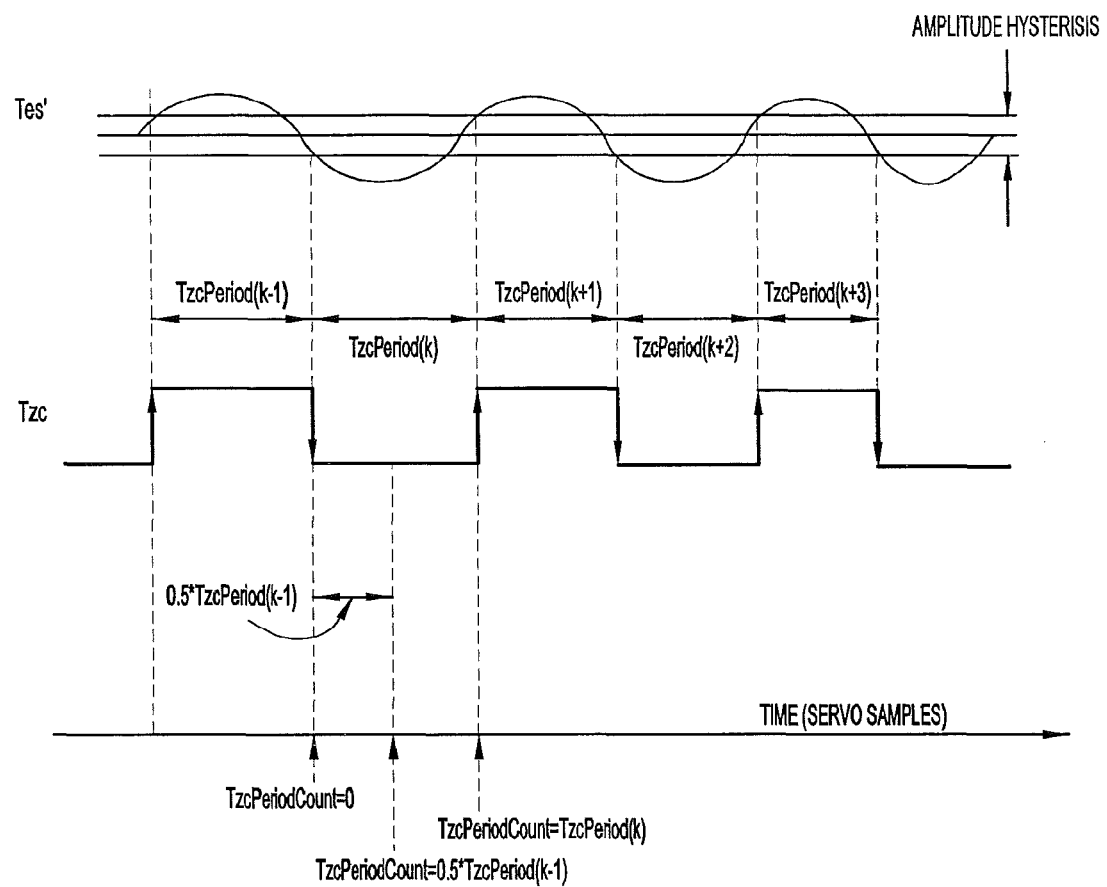

FIG. 9C illustrates the temporal hysterisis and amplitude hysterisis of tracking zero cross detection of FIGS. 9A and 9B.

Figure 10A:
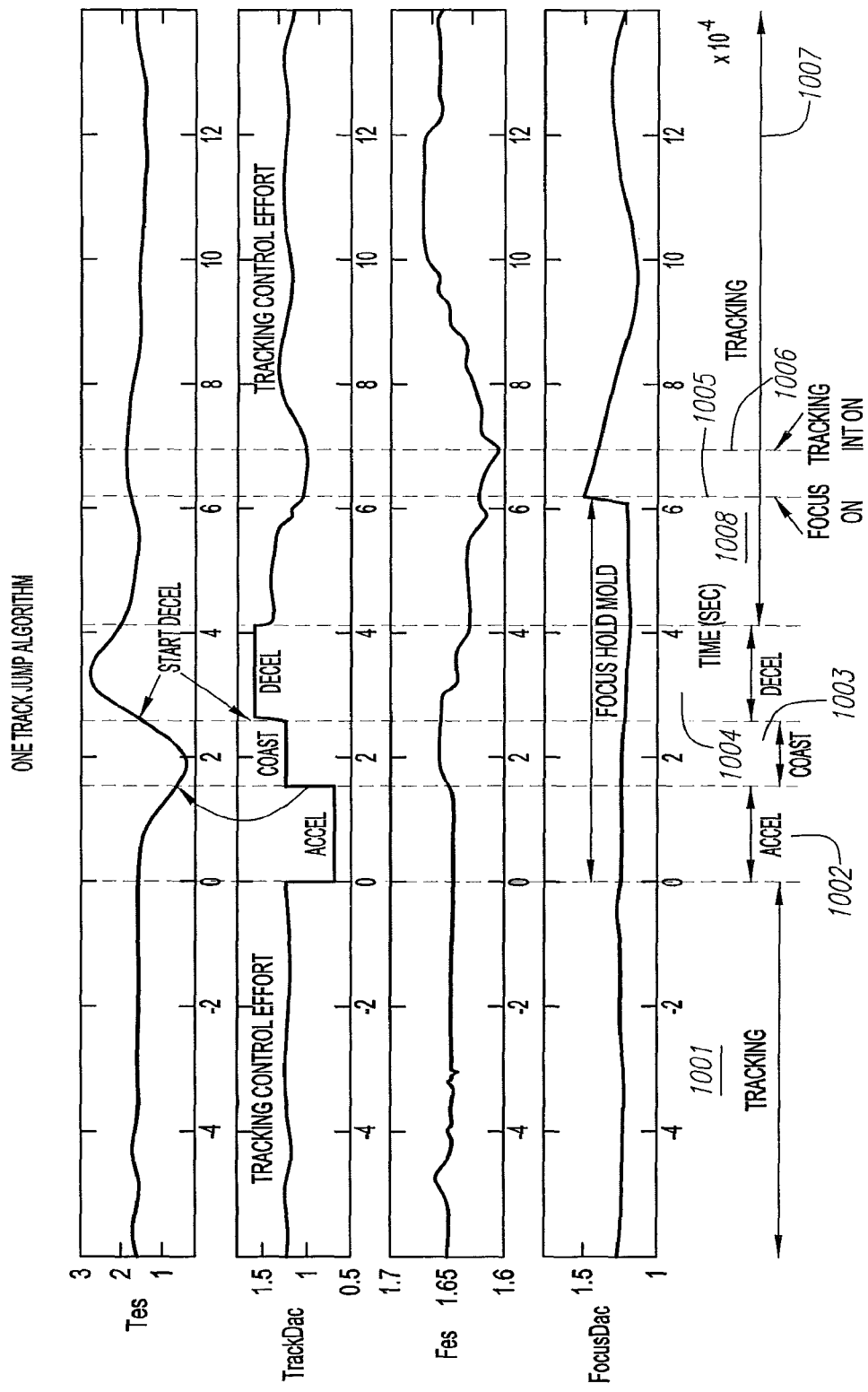
Figure 10B:
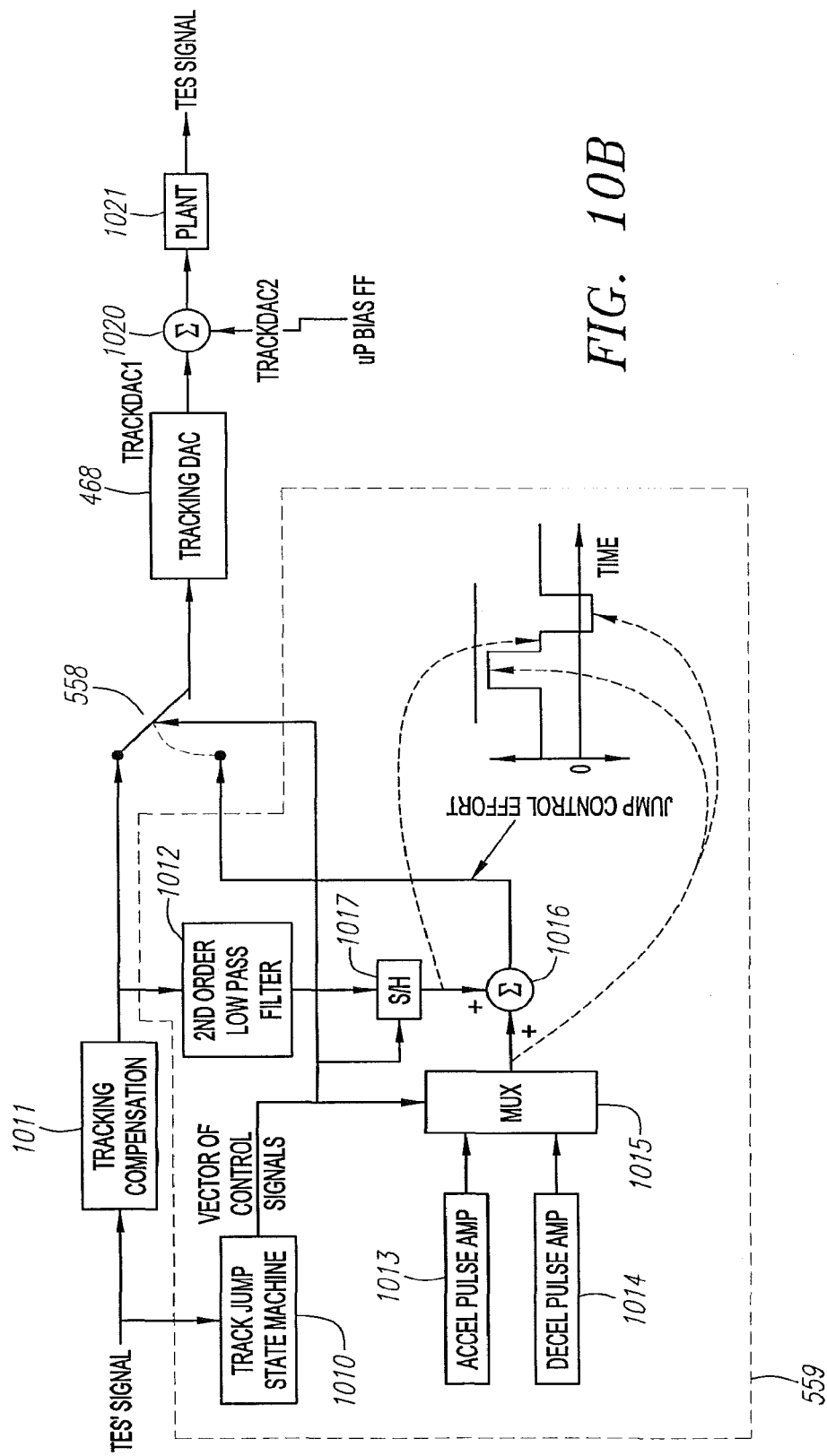

FIGS. 10A and 10B show demonstrative control signals and a block diagram of a one-track jump algorithm of FIGS. 5A and 5B according to some embodiments of the present invention.

Figure 11:
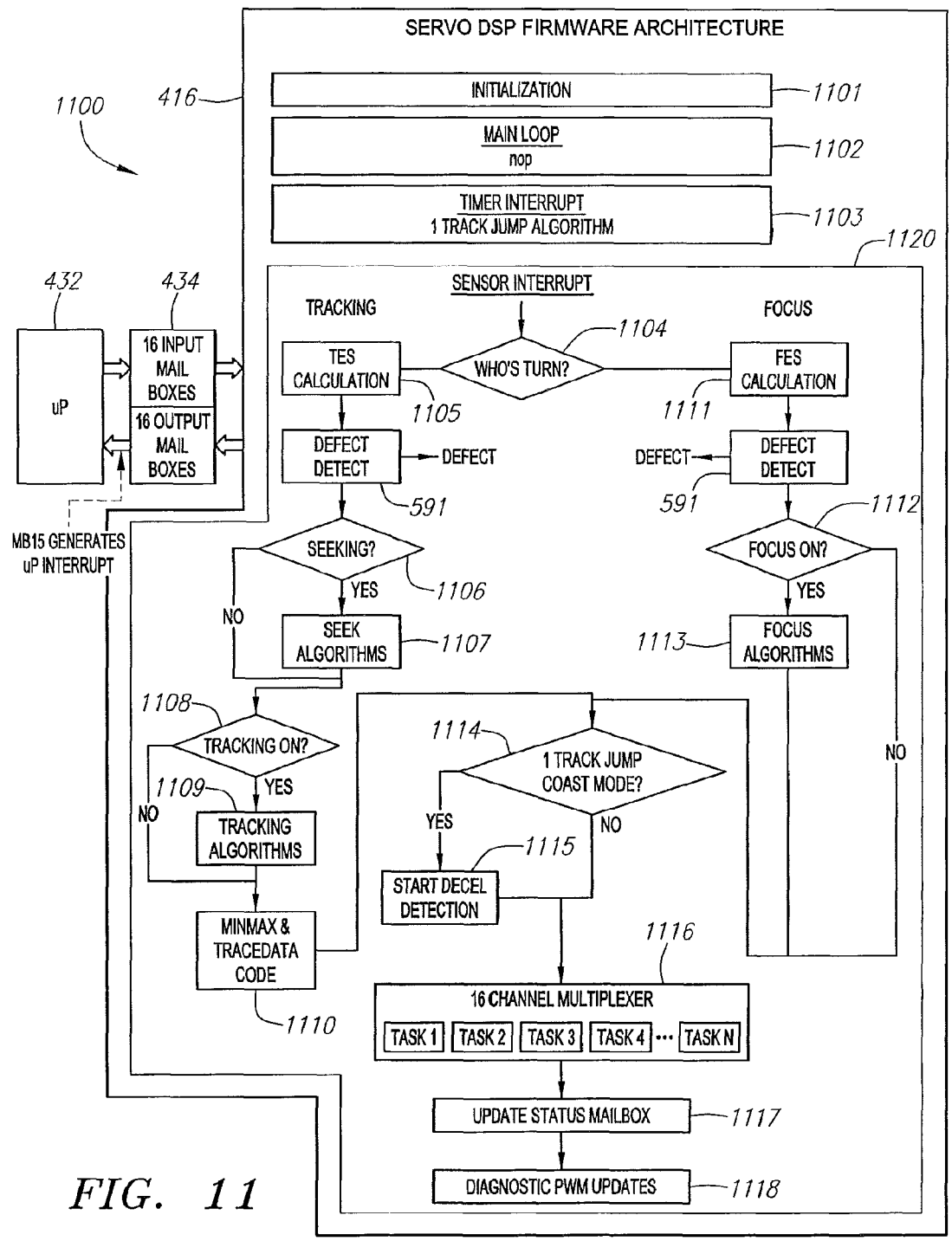

FIG. 11 shows an embodiment of the DSP firmware architecture for controlling and monitoring focus and tracking according to some embodiments of the present invention.

In the figures, elements having the same designation in multiple figures have the same or similar functions.

DETAILED DESCRIPTION OF THE FIGURES

The present disclosure was co-filed with the following sets of disclosures: the "Tracking and Focus Servo System" disclosures, the "Servo System Calibration" disclosures, the "Spin Motor Servo System" disclosures, and the "System Architecture" disclosures; each of which was filed on the same date and assigned to the same assignee as the present disclosure, and are incorporated by reference herein in their entirety. The Tracking and Focus Servo System disclosures include U.S. application Ser. Nos. 09/950,408, 09/950,444, 09/950,394, 09/950,413, 09/950,397, 09/950,914, 09/950,410, 09/950,441, 09/950,373, 09/950,425, 09/950,414, 09/950,378, 09/950,513, 09/950,331, 09/950,395, 09/950,376, 09/950,393, 09/950,432, 09/950,379, 09/950,515, 09/950,411, 09/950,412, 09/950,361, 09/950,540, and 09/950,519. The Servo System Calibration disclosures include U.S. application Ser. Nos. 09/950,398, 09/950,396, 09/950,360, 09/950,372, 09/950,541, 09/950,409, 09/950,520, 09/950,377, 09/950,367, 09/950,512, 09/950,415, 09/950,548, 09/950,392, and 09/950,514. The Spin Motor Servo System disclosures include U.S. application Ser. Nos. 09/951,108, 09/951,869, 09/951,330, 09/951,930, 09/951,328, 09/951,325 and 09/951,475. The System Architecture disclosures include U.S. application Ser. Nos. 09/951,947, 09/951,339, 09/951,469, 09/951,337, 09/951,329, 09/951,332, 09/951,931, 09/951,850, 09/951,333, 09/951,331, 09/951,156, 09/951,340 and 09/951,940.

Example of an Optical Disk Drive

Figure 1A:
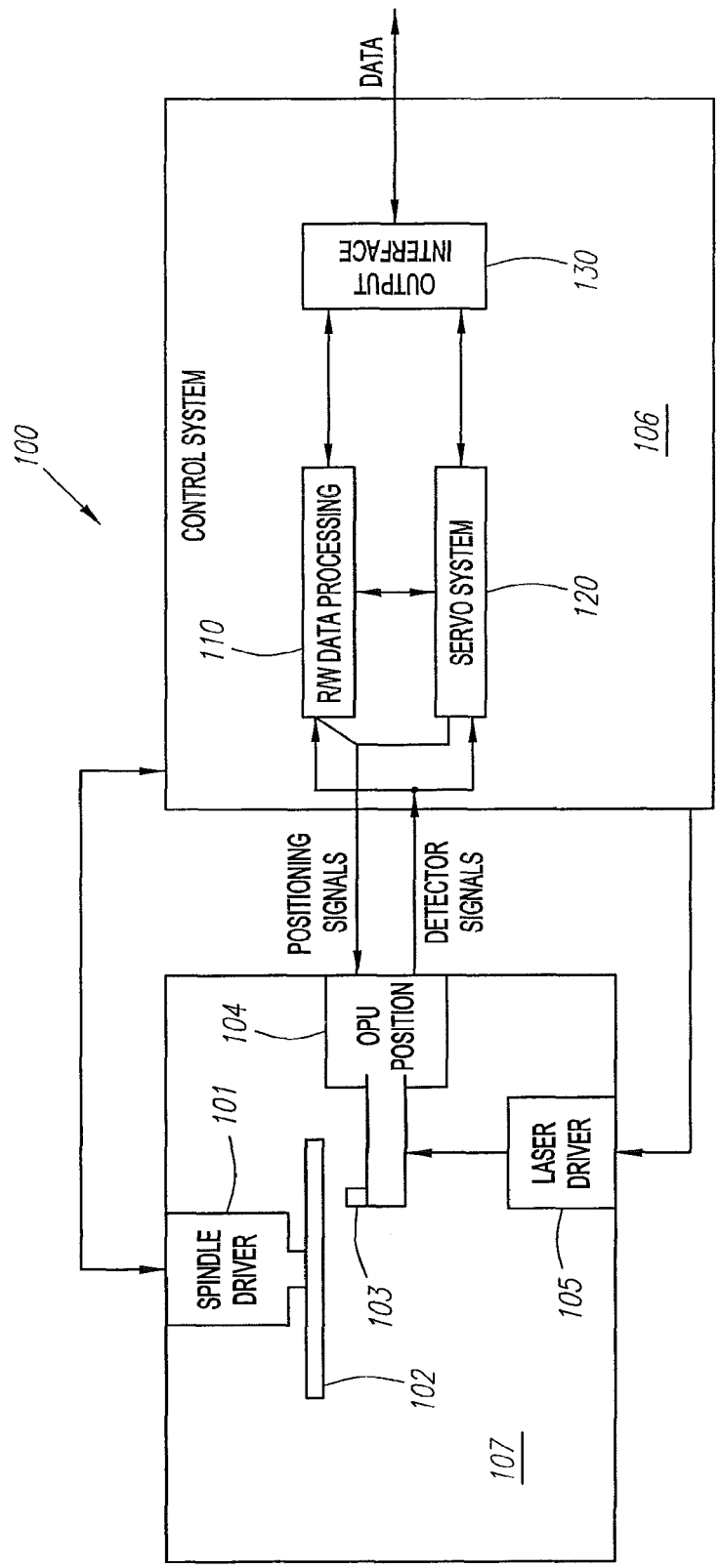
FIG. 1A shows an embodiment of an optical drive according to the present invention.

FIG. 1A shows an embodiment of an optical drive 100 according to the present invention. Optical drive 100 of FIG. 1A includes a spindle motor 101 on which an optical media 102 is mounted. Drive 100 further includes an optical pick-up unit (OPU) 103 mechanically controlled by an actuator arm 104. OPU 103 includes a light source electrically controlled by laser driver 105. OPU 103 further includes optical detectors providing signals for controller 106. Controller 106 can control the rotational speed of optical media 102 by controlling spindle motor 101, controls the position and orientation of OPU 103 through actuator arm 104, and controls the optical power of the light source in OPU 103 by controlling laser driver 105.

Controller 106 includes R/W processing 110, servo system 120, and interface 130. R/W processing 110 controls the reading of data from optical media 102 and the writing of data to optical media 102. R/W processing 110 outputs data to a host (not shown) through interface 130. Servo system 120 controls the speed of spindle motor 101, the position of OPU 103, and the laser power in response to signals from R/W processing 110. Further, servo system 120 insures that the operating parameters (e.g., focus, tracking, spindle motor speed and laser power) are controlled in order that data can be read from or written to optical media 102.

Figure 1B:
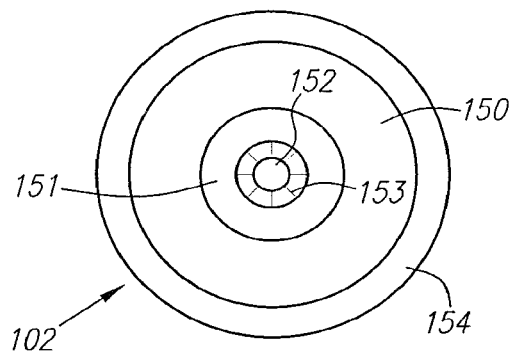
FIG. 1B shows an example of an optical media that can be utilized with an optical drive according to the present invention.

FIG. 1B shows an example of optical media 102. Optical media 102 can include any combinations of pre-mastered portions 150 and writeable portions 151. Premastered portions 150, for example, can be written at the time of manufacture to include content provided by a content provider. The content, for example, can include audio data, video data, text data, or any other data that can be provided with optical media 102. Writeable portion 151 of optical media 102 can be written onto by drive 100 to provide data for future utilization of optical media 102. The user, for example, may write notes, keep interactive status (e.g. for games or interactive books) or other information on the disk. Drive 100, for example, may write calibration data or other operating data to the disk for future operations of drive 100 with optical media 102. In some embodiments, optical media 102 includes an inner region 153 close to spindle access 152. A bar code can be written on a portion of an inner region 153. The readable portion of optical media 102 starts at the boundary of region 151 in FIG. 1B. In some embodiments, writeable portion 151 may be at the outer diameter rather than the inner diameter. In some embodiments of optical media 102, an unusable outer region 154 can also be included.

An example of optical media 102 is described in U.S. application Ser. No. 09/560,781 for "Miniature Optical Recording Disk", herein incorporated by reference in its entirety. The R/W Data Processing 110 can operate with many different disk formats. One example of a disk format is provided in U.S. application Ser. No. 09/527,982, for "Combination Mastered and Writeable Medium and Use in Electronic Book Internet Appliance," herein incorporated by reference in its entirety. Other examples of disk data formats are provided in U.S. application Ser. No. 09/539,841, "File System Management Embedded in a Storage Device;" U.S. application Ser. No. 09/583,448, "Disk Format for Writeable Mastered Media;" U.S. application Ser. No. 09/542,181, "Structure and Method for Storing Data on Optical Disks;" U.S. application Ser. No. 09/542,510 for "Embedded Data Encryption Means;" U.S. application Ser. No. 09/583,133 for "Read Write File System Emulation;" and U.S. application Ser. No. 09/583,452 for "Method of Decrypting Data Stored on a Storage Device Using an Embedded Encryption/Decryption Means," each of which is herein incorporated by reference in its entirety.

Drive 100 can be included in any host, for example personal electronic devices. Examples of hosts that may include drive 100 are further described in U.S. patent application Ser. No. 09/315,398 for Removable Optical Storage Device and System, herein incorporated by reference in its entirety. Further discussions of hosts that may include drive 100 is provided in U.S. application Ser. No. 09/950,516 and U.S. application Ser. No. 09/950,365, each of which is herein incorporated by reference in its entirety. In some embodiments, drive 100 can have a relatively small form factor such as about 10.5 mm height, 50 mm width and 40 mm depth.

Figure 2A:
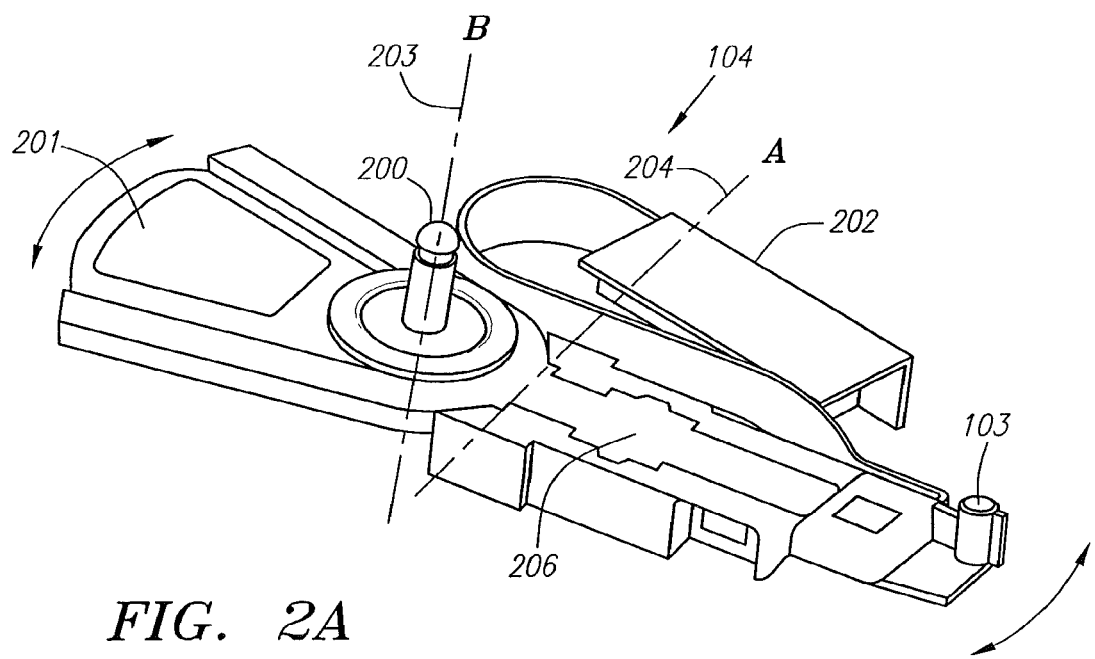
FIG. 2A shows an embodiment of an optical pickup unit mounted on an actuator arm according to some embodiments of the present invention.

FIG. 2A shows an embodiment of actuator arm 104 with OPU 103 mounted on one end. Actuator arm 104 in FIG. 2A includes a spindle 200 which provides a rotational pivot about axis 203 for actuator arm 104. Actuator 201, which in some embodiments can be a magnetic coil positioned over a permanent magnet, can be provided with a current to provide a rotational motion about axis 203 on spindle 200. Actuator arm 104 further includes a flex axis 204. A motion of OPU 103 substantially perpendicular to the rotational motion about axis 203 can be provided by activating actuator coil 206. In some embodiments, actuators 206 and 201 can be voice coil motors.

Figure 2B:
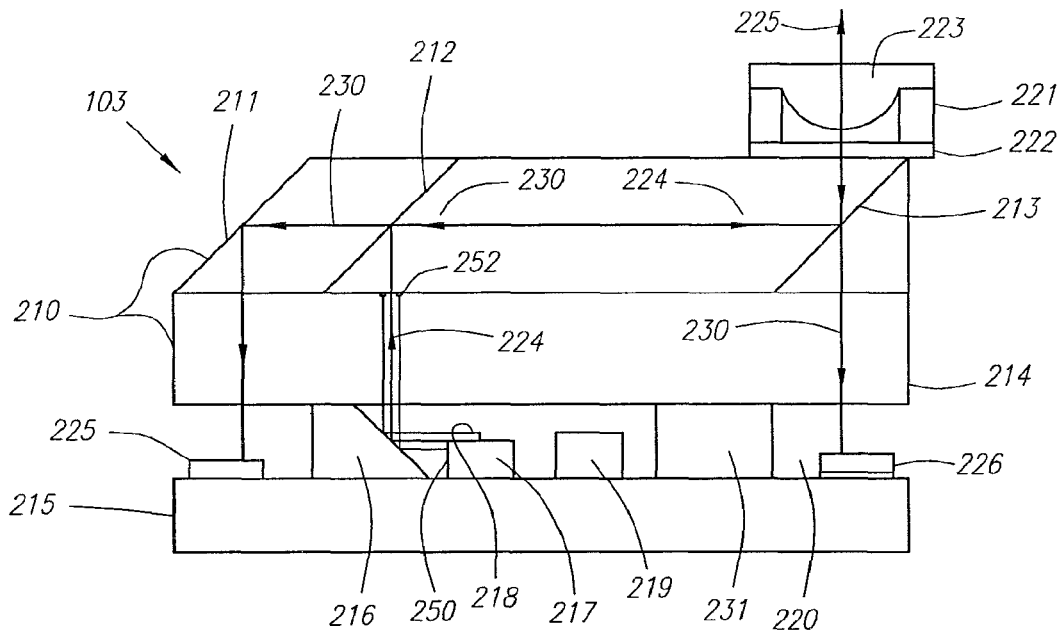
FIG. 2B shows an embodiment of an optical pick-up unit according to some embodiments of the present invention.
Figure 2C:
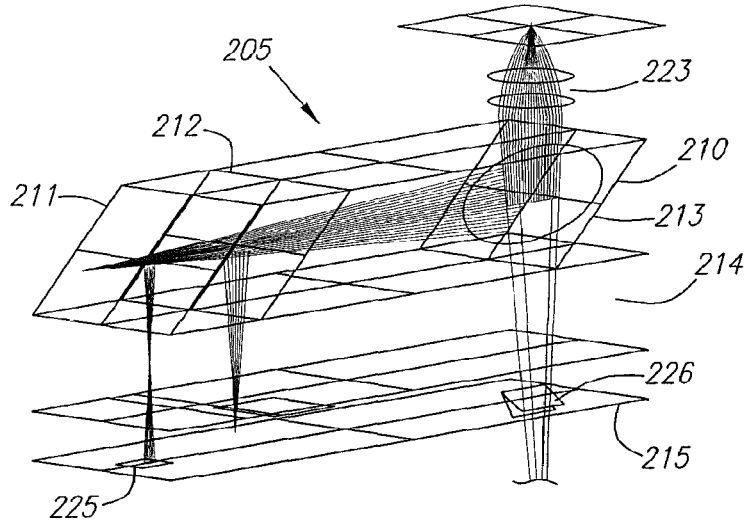
FIG. 2C illustrates the optical path through the optical pick-up unit of FIG. 2B.

FIGS. 2B and 2C show an embodiment of OPU 103 and an optical ray trace diagram of OPU 103, respectively. OPU 103 of FIG. 2B includes a periscope 210 having reflecting surfaces 211, 212, and 213. Periscope 210 is mounted on a transparent optical block 214. Object lens 223 is positioned on spacers 221 and mounted onto quarter wave plate (QWP) 222 which is mounted on periscope 210. Periscope 210 is, in turn, mounted onto turning mirror 216 and spacer 231, which are mounted on a silicon submount 215. A laser 218 is mounted on a laser mount 217 and positioned on silicon submount 215. Detectors 225 and 226 are positioned and mounted on silicon substrate 215. In some embodiments, a high frequency oscillator (HFO) 219 can be mounted next to laser 218 on silicon submount 215 to provide modulation for the laser beam output of laser 218.

Laser 218 produces an optical beam 224 which is reflected into transparent block 214 by turning mirror 216. Beam 224 is then reflected by reflection surfaces 212 and 213 into lens 223 and onto optical medium 102 (see FIG. 1A). In some embodiments, reflection surfaces 212 and 213 can be polarization dependent and can be tuned to reflect substantially all of polarized optical beam 224 from laser 218. QWP 222 rotates the polarization of laser beam 224 so that a light beam reflected from optical media 102 is polarized in a direction opposite that of optical beam 224.

The reflected beam 230 from optical medium 102 is collected by lens 223 and focused into periscope 210. A portion (in some embodiments about 50%) of reflected beam 230, which is polarized opposite of optical beam 224, passes through reflecting surface 213 and is directed onto optical detector 226. Further, a portion of reflected beam 230 passes through reflecting surface 212 and is reflected onto detector 225 by reflecting surface 211. Because of the difference in path distance between the positions of detectors 225 and 226, detector 226 is positioned before the focal point of lens 223 and detector 225 is positioned after the focal point of lens 223, as is shown in the optical ray diagram of FIG. 2C through 2F.

In some embodiments, optical surface 212 is nearly 100% reflective for a first polarization of light and nearly 100% transmissive for the opposite polarization. Optical surface 213 can be made nearly 100% reflective for the first polarization of light and nearly 50% reflective for the opposite polarization of light, so that light of the opposite polarization incident on surface 213 is approximately 50% transmitted. Optical surface 211 can, then, be made nearly 100% reflective for the opposite polarization of light. In that fashion, nearly 100% of optical beam 224 is incident on optical media 102 while 50% of the collected return light is incident on detector 226 and about 50% of the collected return light is incident on detector 225.

A portion of laser beam 224 from laser 218 can be reflected by an annular reflector 252 positioned in periscope 210 on the surface of optical block 214. Annular reflector 252 may be a holographic reflector written into the surface of optical block 214 about the position that optical beam 224 passes. Annular reflector 252 reflects some of the laser power back onto a detector 250 mounted on laser block 217. Detector 250 provides a laser power signal that can be used in a servo system to control the power of laser 218.

Figure 2D:
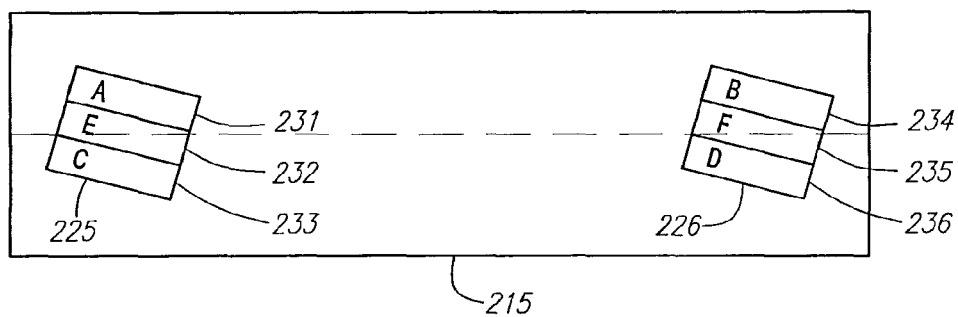
FIG. 2D shows an embodiment of optical detector positioning of the optical pick-up unit of FIG. 2B.

FIG. 2D shows an embodiment of detectors 225 and 226 which can be utilized with some embodiments of the present invention. Detector 225 includes an array of optical detectors 231, 232, and 233 positioned on a mount 215. Each individual detector, detectors 231, 232, and 233, is electrically coupled to provide raw detector signals $A_R$, $E_R$ and $C_R$ to controller 106. Detector 226 also includes an array of detectors, detectors 234, 235 and 236, which provide raw detector signals $B_R$, $F_R$, and $D_R$, respectively, to controller 106. In some embodiments, center detectors 232 and 235, providing signals $E_R$ and $F_R$, respectively, are arranged to approximately optically align with the tracks of optical media 102 as actuator arm 104 is rotated across optical media 102. In some embodiments, the angle of rotation of detectors 225 and 226 with respect to mount 215 is about 9.9 degrees and is chosen to approximately insure that the interference patterns of light beam 225 reflect back from optical media 102 is approximately symmetrically incident with segments 231, 232, 233 of detector 225 and segments 234, 235 and 236 of detector 226. Non-symmetry can contribute to optical cross-talk between derived servo signals such as the focus error signal and the tracking error signal.

A focus condition will result in a small diameter beam 230 incident on detectors 225 and 226. The degree of focus, then, can be determined by measuring the difference between the sum of signals $A_R$ and $C_R$ and the center signal $E_R$ of detector 225 and the difference between the sum of signals $B_R$ and $D_R$ and the center signal $F_R$ of detector 226. Tracking can be monitored by measuring the symmetric placement of beams 230 on detectors 225 and 226. A tracking monitor can be provided by monitoring the difference between signals $A_R$ and $C_R$ of detector 225 and the difference between signals B and D of detector 226. Embodiments of OPU 103 are further described in application Ser. No. 09/540,657 for "Low Profile Optical Head," herein incorporated by reference in its entirety.

Figure 2E:
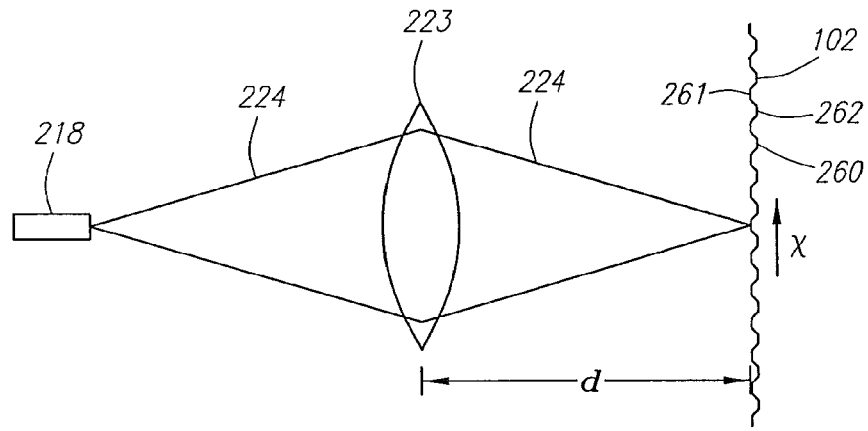
FIGS. 2E and 2F show simplified optical paths as shown in FIG. 2C.

FIG. 2E shows an effective optical ray diagram for light beam 224 traveling from laser 218 (FIG. 2B) to optical media 102 (FIG. 1A) in drive 100. Lens 223 focuses light from laser 218 onto optical media 102 at a position x on optical media 102. The distance between lens 223 and the surface of optical media 102 is designated as d. In some embodiments of the invention, data is written on the front surface of optical media 102. In some embodiments, data can be written on both sides of optical media 102. Further, optical media 102 includes tracks that, in most embodiments, are formed as a spiral on optical media 102 and in some embodiments can be formed as concentric circles on optical media 102. Tracks 260 can differ between premastered and writeable portions of optical media 102. For example, tracks 260 in writeable portions 151 of optical media 102 include an addressing wobble while tracks in premastered portion 150 of optical media 102 do not. Data can be written either on the land 261 or in the groove 262. For discussion purposes only, in this disclosure data is considered to be written on land 261 so that focus and tracking follow land 261. However, one skilled in the art will recognize that the invention disclosed here is equally applicable to data written in groove 262.

In premastered portion 150 of optical media 102 (FIG. 1B), data is written as pits or bumps so that the apparent reflective property of reflected beam 230 changes. Although the actual reflectivity of a bump is the same as the reflectivity elsewhere on the disk, the apparent reflectivity changes because a dark spot over the premastered marks is created due to phase differences in light reflected from the bump versus light reflected from land 261 around in the bump. The phase difference is sufficient to cause destructive interference, and thus less light is collected. Another factor in reducing the amount of light detected from optical media 102 at a bump includes the additional scattering of light from the bump, causing less light to be collected.

In writeable portion 151 of optical media 102 (FIG. 1B), a film of amorphous silicon provides a mirrored surface. The amorphous silicon can be written by heating with a higher powered laser beam to crystallize the silicon and selectively enhances, because the index of refraction of the material is changed, the reflectivity and modifies the phase properties of the writeable material in writeable portion 151 of optical media 102.

Figure 2F:
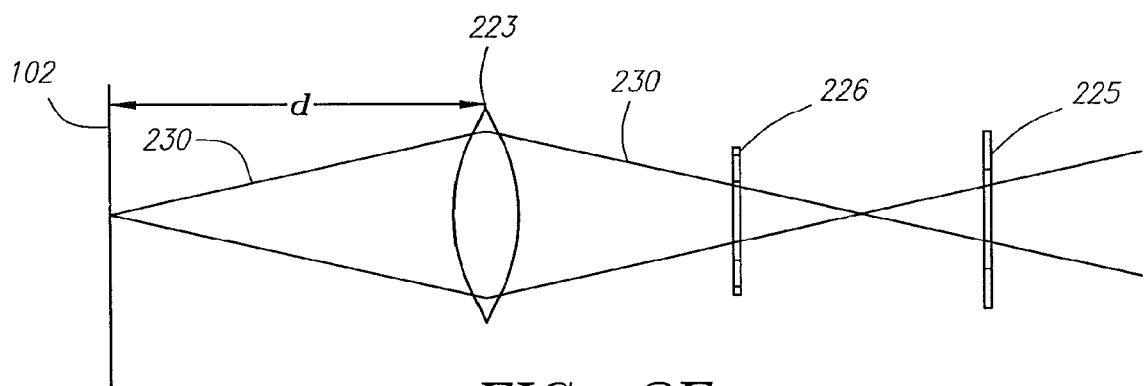

FIG. 2F shows the reflection of light beam 230 from optical media 102 onto detector arrays 225 and 226 of OPU 103. Reflected light beam 230 from optical media 102 is collected by lens 223 and focused on detectors 225 and 226 in OPU 103. Detector 226 is positioned before the focal point of lens 223 while detector 225 is positioned after the focal point of lens 223. As shown in FIG. 2B, the light beam reflected from optical media 102 is split at surface 213 to be reflected onto each of detectors 225 and 226. Detectors 225 and 226 can then be utilized in a differential manner to provide signals to a servo control that operates actuators 201 and 206 to maintain optimum tracking and focus positions of OPU 103.

Figure 2G:
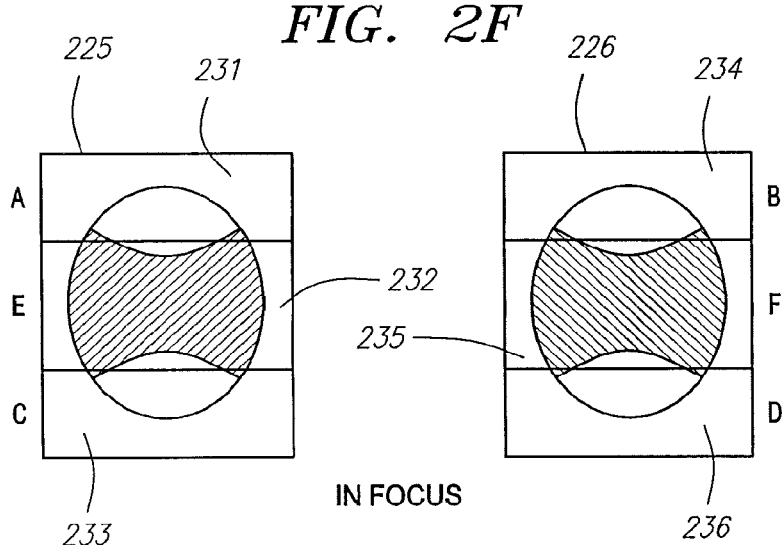
FIGS. 2G, 2H, 2I, 2J, 2K and 2L illustrate development of a focus error signal (FES) as a function of distance between the optical pick-up unit and the surface of the optical media in some embodiments of the present invention.
Figure 2H:
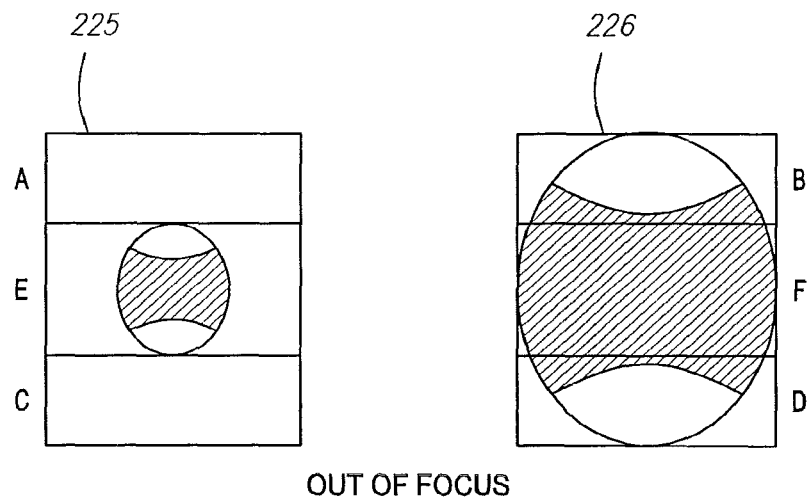
Figure 2I:
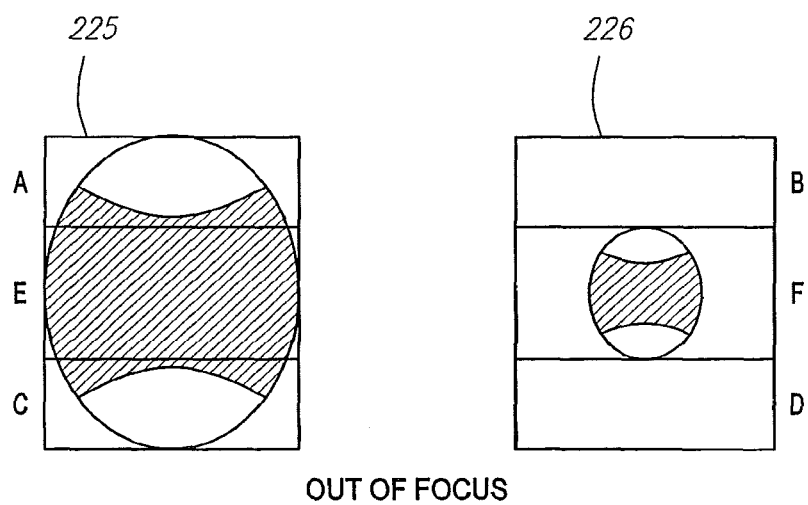
Figure 2J:
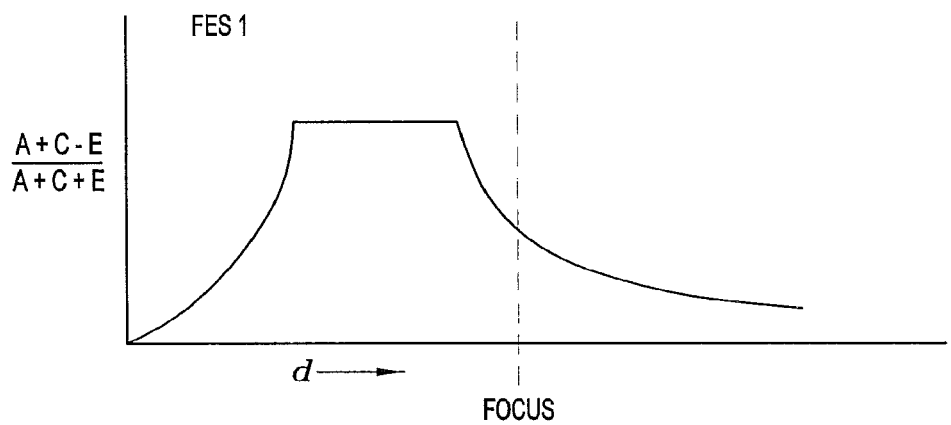
Figure 2K:
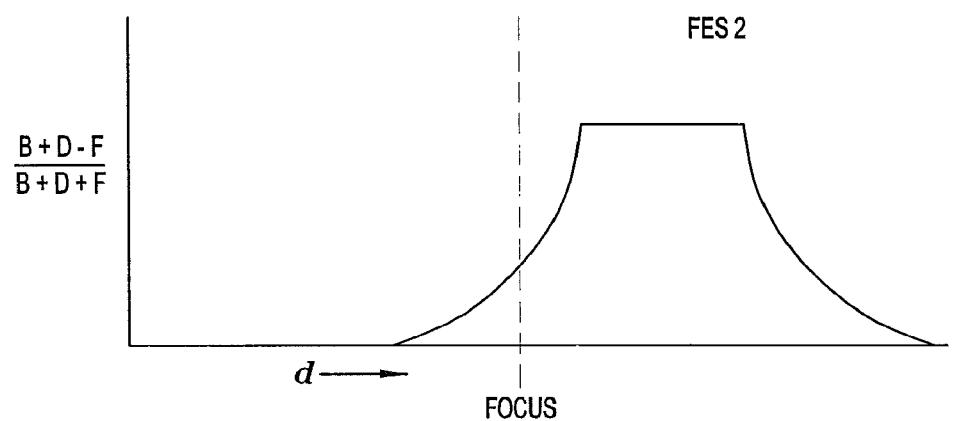
Figure 2L:
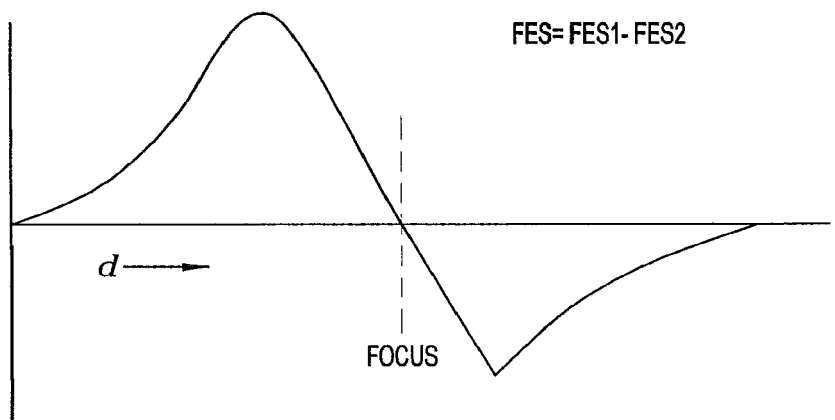

FIG. 2G shows light beam 230 on optical detectors 225 and 226 when d, the distance between lens 223 and the surface of optical media 102, is at an optimum in-focus position. The light intensity of light beam 230 reflected from optical media 102 onto detectors 225 and 226 is evenly distributed across segments 231, 232, and 233 of detector 225 and across segments 234, 235, and 236 of detector 226. FIG. 2H shows the light beams on detectors 225 and 226 when d is lengthened. The beam on detector 226 gets larger while the beam on detector 225 gets smaller. As shown in FIG. 2I, the opposite case is true if distance d is shortened. A focus signal on detector 225, then, can be formed by adding signals A and C and subtracting signal E. In some embodiments, the resulting signal is normalized by the sum of signals A, C and E. FIG. 2J shows the relationship of quantity A+C−E as a function of d. FIG. 2K shows the relationship of corresponding quantity B+D−F as a function of d. The difference between the two functions shown in FIGS. 2J and 2K is shown in FIG. 2L. In FIG. 2L, the focus point can be at the zero-crossing of the curve formed by taking the difference between the graphs of FIGS. 2J and 2K as a function of focus distance d. In the preceding discussion, subscripts are dropped from the detector signals A, C, E, B, D, and F to indicate that the discussion is valid for the analog or digital versions of these signals.

Figure 2M:
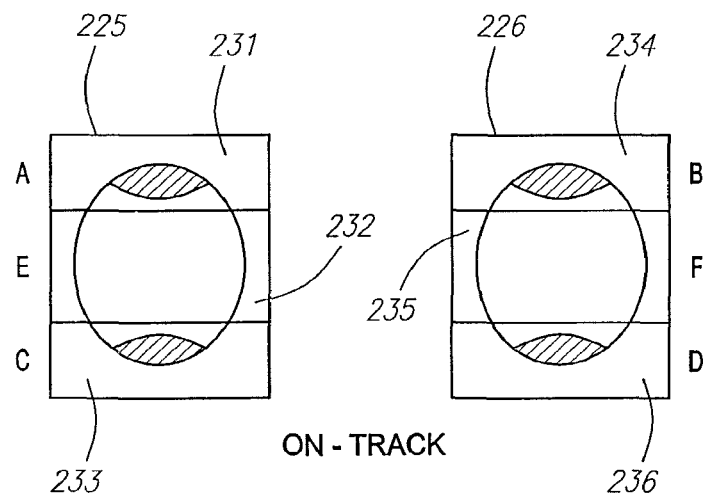
Figure 2N:
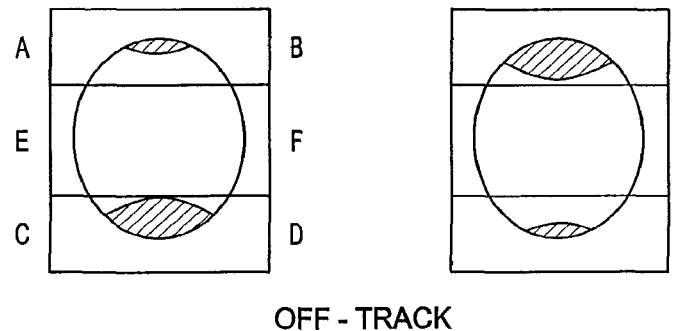
Figure 2O:
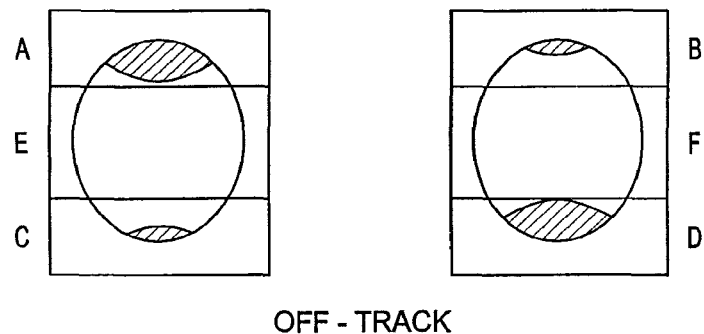
Figure 2P:
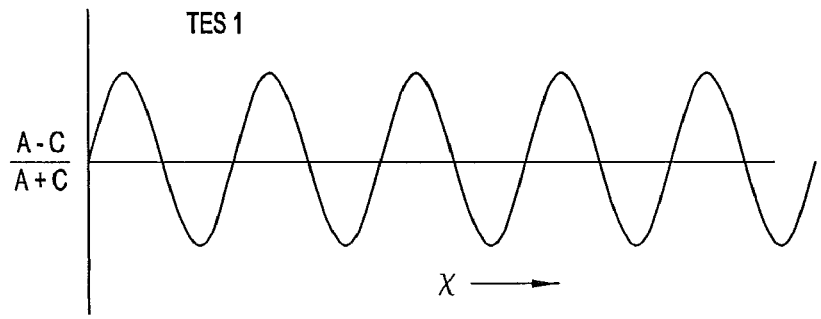
Figure 2Q:
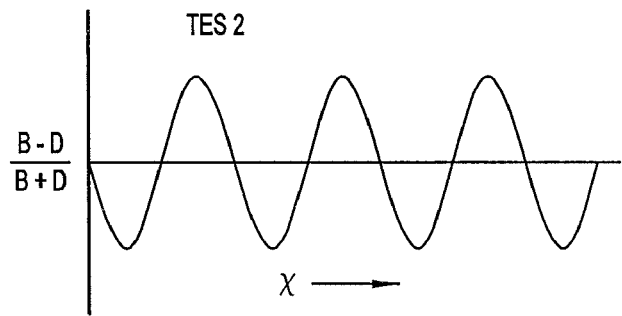
Figure 2R:
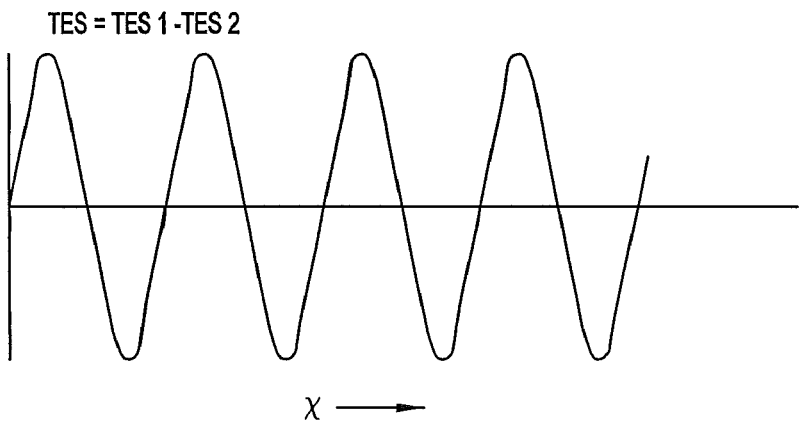

FIG. 2M shows beam of light 230 on each of detectors 225 and 226 in an on-track situation. As shown in FIG. 2E, light from laser 218 is incident on optical media 102 which has tracks 260 with lands 261 and grooves 262. The beam is broad enough that interference patterns are formed in the reflected light beam that, as shown in FIG. 2F, is incident on detectors 226 and 225. As shown in FIG. 2M, the interference pattern forms an intensity pattern with most of the intensity centered on elements 232 and 235, the center elements of detectors 225 and 226, respectively, where constructive interference from tracks 260 is formed. Lower intensity light, where destructive interference is formed, is incident on outside elements 231 and 233 of detectors 225, 234 and 236 of detector 226. If light beam 224 from laser 218 is focused on edges of tracks 260, the interference pattern shifts. FIGS. 2N and 2O show interference patterns indicative of light at edges of tracks 260. Since, when the light beam is "on-track" the intensity of light in outside elements 231 and 233 and outside elements 234 and 236 are the same, a tracking signal can be formed by the difference in signals A and C and B and D. FIG. 2P shows the normalized value A−C as a function of x as light beam 224 from laser 218 is moved over the surface of optical media 102. FIG. 2Q shows the normalized value of B−D as a function of x. In each case, a sinusoidal function is generated where an on-track condition is met at zero-crossings. Because detectors 225 and 226 are differential in nature, and because the relationship shown in FIG. 2Q is out of phase with that shown in FIG. 2P, an overall tracking error signal can be formed by taking the difference between the calculations shown in FIG. 2P and the calculations shown in FIG. 2Q as an indication of tracking error. Variation over a complete period of the sine wave shown in FIG. 2Q indicates a full track crossing. In other words, a zero-crossing will indicate either land 261 or groove 262 of track 260. The slope of the tracking error signal (TES) at the zero crossing can indicate whether the crossing is through a groove or through a land in track 260.

Utilizing detectors 225 and 226 in a normalized and differential manner to form tracking and focus error signals minimizes the sensitivity of drive 100 to variations in laser power or to slight differences in reflectivity as optical media 102 is rotated. Variations common to both detectors 225 and 226 are canceled in a differential measurement. Further, although best tracking and best focus may occur at zero points in the TES or FES signals, these locations may not be optimum for the best reading or writing of data. Since the purpose of drive 100 is to read and write data to optical media 102, in some embodiments different operating points may be made thus allowing drive 100 to switch between optimum servo function and optimum data read function. This factor is further discussed below with respect to the TES and FES servo algorithms.

Further, there can be significant cross-talk between the TES and FES signals as described above with FIGS. 2A through 2R. FES, as defined above for each of detectors 225 and 226, will depend on TES as OPU 103 passes over tracks on optical media 102. With the observation that the cross-talk intensity changes are concentrated on the outer elements (e.g., elements 231 and 233 of detector 225) and that the sum signal is not dependent on spot size, so long as the spot stays on detector 225, then FES can be defined such that cross-talk is reduced or eliminated. For example, with detector 225 FES is defined as (A+C−E)/(A+C+E). Since the cross-talk in the outer elements (elements 231 and 233) have a large crosstalk the cross-talk in the central element, element 232, is smaller and out of phase with the cross-talk in the outer elements, then cross-talk can be reduced by defining a new FES, NFES, as FES-SUM, where SUM is A+C+E. In some embodiments, NFES can be FES−HP(SUM), where HP(SUM) is a high-pass filtered sum signal with a filter gain chosen to reduce cross-talk. In some embodiments, NFES can be normalized with the SUM signal or with a low-pass filtered SUM signal. In differential mode, i.e. with both detectors 225 and 226, the new FES signal with reduced cross-talk can be defined, as above, by the difference between the FES signal calculated from detector 225 and the FES signal calculated from detector 226.

Embodiments of drive 100 (FIG. 1A) present a multitude of challenges in control over conventional optical disk drive systems. A conventional optical disk drive system, for example, performs a two-stage tracking operation by moving the optics and focusing lens radially across the disk on a track and performs a two-stage focusing operation by moving a focusing lens relative to the disk. Actuators 201 and 206 of actuator arm 104 provide a single stage of operation that, nonetheless in some embodiments, performs with the same performance as conventional drives with conventional optical media. Further, conventional optical disk drive systems are much larger than some embodiments of drive 100. Some major differences include the actuator positioning of actuator arm 104, which operates in a rotary fashion around spindle 200 for tracking and with a flexure action around axis 204 for focus. Further, the speed of rotation of spindle driver 101 is dependent on the track position of actuator arm 104. Additionally, the characteristics of signals $A_R$, $B_R$, $C_R$, $D_R$, $E_R$, and $F_R$ received from OPU 103 differ with respect to whether OPU 103 is positioned over a premastered portion of optical media 102 or a writeable portion of optical media 102. Finally, signals $A_R$, $B_R$, $C_R$, $D_R$, $E_R$, and $F_R$ may differ between a read operation and a write operation.

It may generally be expected that moving to a lightweight structural design from the heavier and bulkier conventional designs, such as is illustrated with actuator arm 104, for example, may reduce many problems involving structural resonances. Typically, mechanical resonances scale with size so that the resonant frequency increases when the size is decreased. Further, focus actuation and tracking actuation in actuator arm 104 are more strongly crosscoupled in actuator arm 104, whereas in conventional designs the focus actuation and tracking actuation is more orthogonal and therefore more decoupled. Further, since all of the optics in drive 100 are concentrated at OPU 103, a larger amount of optical cross-coupling between tracking and focus measurements can be experienced. Therefore, servo system 120 has to push the bandwidth of the servo system as hard as possible so that no mechanical resonances in actuator arm 104 are excited while not responding erroneously to mechanical and optical cross couplings. Furthermore, due to the lowered bandwidth available in drive 100, nonlinearities in system response can be more severe. Further, since drive 100 and optical media 102 are smaller and less structurally exact, variations in operation between drives and between various different optical media can complicate control operations on drive 100.

One of the major challenges faced by servo system 120 of control system 106, then, includes operating at lower bandwidth with large amounts of cross coupling and nonlinear system responses, and significant variation in servo characteristics between different optical media and between different optical drives. Additionally, the performance of drive 100 should match or exceed that of conventional CD or DVD drives in terms of track densities and data densities. Additionally, drive 100 needs to maintain compatibility with other similar drives so that optical media 102 can be removed from drive 100 and read or written to by another similar drive.

Conventional optical drive servo systems are analog servos. In an analog environment, the servo system is limited with the constraints of analog calculations. Control system 106, however, can include substantially a digital servo system. A digital servo system, such as servo system 120, has a higher capability in executing solutions to problems of system control. A full servo loop is formed when servo system 120 is coupled with actuator 104, OPU 103, spin motor 101 and optical media 102, where the effects of a control signal generated by servo system 120 is detected. A full digital servo system is limited only by the designer's ability to write code, the memory storage available in which to store data and code, and processor capabilities. Embodiments of servo system 120, then, can operate in the harsher control environment presented by disk drive 100 and are capable of higher versatility towards upgrading servo system 120 and for refinement of servo system 120 than in conventional systems.

Drive 100 can also include error recovery procedures. Embodiments of drive 100 which have a small form factor can be utilized in portable packages and are therefore subject to severe mechanical shocks and temperature changes, all of which affect the ability to extract data (e.g., music data) from optical media 102 reliably or, in some cases, write reliably to optical media 102. Overall error recovery and control system 106 is further discussed in the System Architecture disclosures, while tracking, focus and seek algorithms are discussed below, and in the Tracking and Focus Servo System disclosures. Further, since drive 100, therefore, has tighter tolerances than conventional drives, some embodiments of servo-system 120 include dynamic calibration procedures, which is further described in the Servo System Calibration disclosures. Control of the spin motor 101 is described in the Spin Motor Servo System disclosures. The System Architecture disclosures, the Tracking and Focus Servo System disclosures, the Servo System Calibration disclosures, and the Spin Motor Servo System disclosures have been incorporated by reference into this disclosure.

Example Embodiment of an Optical Drive Controller

FIG. 3A shows a block diagram of an embodiment of controller 106 according to the present invention. Optical signals are received from OPU 103 (see FIGS. 2B-2D). As discussed above with FIGS. 2B, 2C and 2D, some embodiments of OPU 103 include two detectors with detector 225 including detectors 231, 232, and 233 for providing detector signals $A_R$, $E_R$, and $C_R$, respectively, and detector 226 having detectors 234, 235 and 236 providing detector signals $B_R$, $F_R$, and $D_R$, respectively. Further, some embodiments of OPU 103 include a laser power detector 250 mounted to receive reflected light from an annular reflector 252 positioned on periscope 210, as discussed above, and therefore provides a laser power signal $LP_R$ as well.

Detector signals received from OPU 103 are typically current signals. Therefore, the detector signals from OPU 103 are converted to voltage signals in a preamp 310. Preamp 310 includes a transimpedance amplifier, which converts current signals to voltage signals. Further, preamp 310 generates a high frequency (HF) signal based on the detector signals from OPU 103. The HF signal can be utilized as the data signal and is formed by the analog sum of the signals from OPU 103 (signals $A_V$, $B_V$, $C_V$, $D_V$, $E_V$ and $F_V$ in FIG. 3A).

FIG. 3B shows a block diagram of an embodiment of preamp 310. Preamp 310 includes an array of transimpedance amplifiers, amplifiers 311, 312, 313, 314, 315, 316 and 317 in FIG. 3B. Amplifier 311 receives the laser power signal $LP_R$ from OPU 103 and amplifiers 312 through 317 receive signals $A_R$ through $F_R$, respectively, from OPU 103. In general, preamp 310 can receive any number of detector signals from OPU 103. In some embodiments, each of signals $A_R$ through $F_R$ and laser power $LP_R$ are current signals from detectors 225, 226 and 250 of OPU 103. Amplifiers 311 through 317 output voltage signals $LP_V$, $A_V$, $B_V$, $C_V$, $D_V$, $E_V$, and $F_V$, respectively. The gain of each of amplifiers 311 through 317, G1 through G7, can be set by gain conversion 318. Gain conversion 318 can receive a W/R gain switch that indicates a read or a write condition and can adjust the gains G1 through G7 of amplifiers 311 through 317 accordingly. In some embodiments, gain conversion 318 receives gain selects for each of gains G1 through G7 and a forward sensor FWD sensor. In some embodiments, gains G1 and G2 are the same and gains G3 through G6 are the same. In some embodiments, gains G3 through G6 are approximately ½ of gains G1 and G2.

Since the laser power required for a write operation is much higher than the laser power required for a read operation, the gains G1 through G7 can be set high for a read operation and can be lowered for a write operation. In some embodiments, gain conversion 318 outputs one of a number (e.g., two) of preset gains for each of gains G1 through G7 in response to the W/R gain switch setting. Summer 319 receives each of the signals $A_V$, $B_V$, $C_V$, $D_V$, $E_V$, and $F_V$ from amplifiers 312 through 317, respectively, and outputs a differential HF signal. In some embodiments, the differential HF signal is the analog sum of signals $A_V$, $B_V$, $C_V$, $D_V$, $E_V$, and $F_V$. The differential HF signal indicates the total light returned from optical medium 102 (see FIG. 1) and therefore includes, in a read operation, the actual data read from optical medium 102.

In some embodiments, preamplifier 308 can include summers 331 through 336, which receives the output signals from amplifiers 312 through 317, respectively, and offsets the output values from amplifiers 312 through 317, respectively, by reference voltages VREF6, VREF5, VRD4, VRD3, VRD2, and VRD1, respectively. In some embodiments VRD1 through VRD4 are the same and VREF5 and VREF6 are the same. The input signals to differential summer 319, then, are the output signals from adders 331 through 336 and the output signal from amplifier 311.

As shown in FIG. 3A, the voltage signals $LP_V$, $A_V$, $B_V$, $C_V$, $D_V$, $E_V$, $F_V$, and HF from preamp 310 are input signals to control chip 350. Control chip 350 can be a digital and analog signal processor chip which digitally performs operations on the input signals $A_V$, $B_V$, $C_V$, $D_V$, $E_V$, $F_V$, HF, and $LP_V$ to control the actuators of actuator arm 104 (FIG. 1), the laser power of laser 218 (FIG. 2B), and the motor speed of spindle motor 101 (FIG. 1). Control 350 also operates on the HF signal to obtain read data and communicate data and instructions with a host (not shown). In some embodiments, control 350 can be a ST Microelectronics 34-00003-03.

The laser power signal $LP_v$ is further input to laser servo 105 along with a W/R command, indicating a read or a write operation. In some embodiments, laser servo 105 is an analog servo loop that controls the power output of laser 218 of OPU 103. In some embodiments, the laser power can also be included in a digital servo loop controlled by control chip 350. The laser power of laser 218 is high for a write operation and low for a read operation. Laser servo 105, then, holds the power of laser 218 to a high power of low power in response to the laser W/R power control signal from control chip 350. Analog servo systems for utilization as laser servo 105 are well known to one skilled in the art. In some embodiments, laser servo 105 can also be a digital servo system.

Control chip 350 is further coupled with data buffer memory 320 for buffering data to or from the host and program memory 330. Program memory 330 holds program code for, among other functions, performing the servo functions for controlling focus and tracking functions, laser power, and motor speed. Data read through OPU 103 can be buffered into data buffer memory 320, which assists in power savings and allows more time for error recovery if drive 100 suffers a mechanical shock or other disturbing event. In some embodiments, control chip 350 activates mechanical components 107 of drive 100 when data buffer 320 is depleted and deactivates mechanical portions 107 when buffer 320 is filled. Servo system 120, then, needs only to be active while mechanical portions 107 are active.

In some embodiments, control chip 350 is a low power device that operates at small currents. Therefore, control voltages for controlling focus and tracking actuators (through coils 206 and 201, respectively) are input to power driver 340. Power driver 340 outputs the current required to affect the focus and tracking functions of actuator arm 104 through focus actuator 206 and tracking actuator 201. In some embodiments, as described above, focus actuator 206 and tracking actuator 201 are voice coil motors mounted on actuator arm 104 so that tracking actuator 201 moves OPU 103 over tracks of optical media 102 and focus actuator 206 flexes actuator arm 104 to affect the distance between OPU 103 and optical media 102.

Driver 340 can also provide current to drive spindle motor 101. Spindle motor 101 provides sensor data to a servo system and can also be responsive to the tracking position of OPU 103 so that the speed of spindle motor 101 is related to the track. In some embodiments, the data rate is held constant by controlling the speed of spindle motor 101 as OPU 103 tracks across optical media 102. A servo system for controlling spindle motor 101 is further described in the Spin Motor Servo System disclosures.

Further, power drivers 340 can also control a cartridge eject motor 360 and latch solenoid 370 in response to commands from control chip 350. Cartridge eject motor 360 mounts and dismounts optical media 102 onto spindle motor 101. Latch solenoid 370 provides a secured latch so that the OPU 103 does not contact optical media 102 during non-operational shock conditions.

Finally, system 300 can include power monitor 380 and voltage regulators 390. Power monitor 380 provides information about the power source to control chip 350. Control chip 350, for example, can be reset by power monitor 380 if there is a power interruption. Voltage regulators 390, in response to an on/off indication from control chip 350, provides power to drive laser 218, as well as control chip 350 and pre-amp 310. Spindle motor 101, actuators 206 and 201, cartridge eject motor 360, and latch solenoid 370 can be powered directly from the input voltage.

FIG. 4 shows an embodiment of control chip 350 of control system 300. The embodiment of control chip 350 shown in FIG. 4 includes a microprocessor 432 and a digital signal processor (DSP) 416. Since DSP 416 operates much faster, but has lower overall capabilities (e.g., code and data storage space), than microprocessor 432, in some embodiments real time digital servo system algorithms can be executed on DSP 416 while other control functions and calibration algorithms can be executed on microprocessor 432. A control structure for embodiments of control chip 350, and interactions between DSP 416 and microprocessor 432, are further discussed in the System Architecture disclosures.

Control chip 350 receives voltage signals $A_v$, $E_v$, $C_v$, $B_v$, $F_v$, $D_v$, HF, and $LP_v$ from preamp 310 (see FIG. 3A). Signals $A_v$, $E_v$, $C_v$, $B_v$, $F_v$, and $D_v$ are input into offset blocks 402-1 through 402-6, respectively. Offset blocks 402-1 through 402-6 provide a variable offset for each of input signals $A_v$, $E_v$, $C_v$, $B_v$, $F_v$, and $D_v$. The value of the offset is variable and can be set by a calibration routine executed in microprocessor 432 or DSP 416, which is further described in the Servo System Calibration disclosures.

In some embodiments, the offset values can be set so that when the power of laser 218 is off the output signal from each of offsets 402-1 through 402-6 is zero, i.e. a dark-current calibration. In some embodiments, the effects of light scattering in OPU 103 may also be deducted in offset 402-1 through 402-6.

The signals output from offsets 402-1 through 402-6 are input to variable gain amplifiers 404-1 through 404-6, respectively. Again, the gains of each of variable gain amplifiers 404-1 through 404-6 are set by a calibration routine executed in microprocessor 432 or DSP 416, as further described in the Servo System Calibration disclosures. In some embodiments, the gains of amplifiers 404-1 through 404-6 can be set so that the dynamic range of analog-to-digital converters 410-1 and 410-2 are substantially fully utilized in order to reduce quantization error.

The offsets and gains of offsets 402-1 through 402-6 and 404-1 through 404-6, respectively, may be different for each of signals $A_v$, $E_v$, $C_v$, $B_v$, $F_v$, and $D_v$. Further, the gains and offsets may be different for read operations and write operations and may be different for pre-mastered verses writeable portions of optical media 102. Further, the offsets and gains may vary as a function of tracking position on optical media 102 (in addition to simply varying between premastered or writeable regions). Some factors which may further lead to different offset and gain settings include light scattering onto detectors, detector variations, detector drift, or any other factor which would cause the output signal from the detectors of OPU 103 to vary from ideal output signals. Various calibration and feedback routines can be operated in microprocessor 432 and DSP 416 to maintain efficient values of each of the offset and gain values of offsets 402-1 through 402-6 and amplifiers 404-1 through 404-6, respectively, over various regions of optical media 102, as is further discussed in the Servo System Calibration disclosures.

Therefore, in some embodiments the offset and gain values of offsets 402-1 through 402-6 and amplifiers 404-1 through 404-6 can be varied by microprocessor 432 and DSP 416 as OPU 103 is positionally moved over optical media 102. Additionally, in some embodiments microprocessor 432 and DSP 416 monitor the offset and gain values of offset 402-1 through 402-6 and amplifiers 404-1 through 404-6 in order to dynamically maintain optimum values for the offset and gain values as a function of OPU 103 position over optical media 102. In some embodiments, offset and gain values are set in a calibration algorithm. In some embodiments, the offset values of offsets 402-1 through 402-6 are determined such that the dynamic range of the respective input signals are centered at zero. Further, the gains of amplifiers 404-1 through 404-6 are set to fill the dynamic range of analog-to-digital converters 410-1 and 410-2 in order to reduce quantization error. In some embodiments, the gains of amplifiers 404-1 through 404-6 can be modified in error recovery routines. See the System Architecture disclosures. In some embodiments, the gains of amplifiers 404-1 through 404-6 can be optimized through continuous performance monitoring. See the Servo System Calibration disclosures.

The output signals from variable gain amplifiers 404-1 through 404-6 are input to anti-aliasing filters 406-1 through 406-6, respectively. Anti-aliasing filters 406-1 through 406-6 are low-pass filters designed to prevent aliasing. In some embodiments, the output signals from each of anti-aliasing filters 406-1 through 406-5 are input to analog-to-digital converters. In other embodiments, a limited number of analog-to-digital converters are utilized. In the embodiment shown in FIG. 4, the output signals from anti-aliasing filters 406-1 through 406-5 are input to multiplexers 408-1 and 408-2. The output signals from anti-aliasing filters 406-1 through 406-3 are input to multiplexer 408-1 and the output signals from anti-aliasing filters 406-4 through 406-6 are input to multiplexer 408-2.

The HF signal from preamp 310 (see FIG. 3A) can be input to equalizer 418. Equalizer 418 equalizes the HF signal by performing a transform function that corrects systematic errors in detecting and processing data read from optical media 102. In some embodiments, equalizer 418 operates as a band-pass filter. The output signal from equalizer 418 is input to amplifier 420. The output signal from amplifier 420 can be input as a fourth input to multiplexer 408-1.

The laser power signal $LP_v$ can be input to multiplexer 436 where $LP_v$ can be multiplexed with other signals that may require digitization. The output signal from multiplexer 436 can then be input as a fourth input to multiplexer 408-2. One skilled in the art will recognize that if no other signals are being digitally monitored, multiplexer 436 can be omitted. Further, one skilled in the art will recognize that any number of analog-to-digital converters can be utilized and any number of signals can be multiplexed to utilize the available number of analog-to-digital converters. The particular embodiment shown here is exemplary only.

The output signal from multiplexer 408-1 is input to analog-to-digital converter 410-1. The output signal from multiplexer 408-2 is input to analog-to-digital converter 410-2. Analog-to-digital converters 410-1 and 410-2 can each include registers 478 for the storage of digitized values. ADC 410-1 includes registers 478-1 through 478-4 and ADC 410-2 includes registers 478-5 through 478-8. Further, multiplexers 408-1 and 408-2 and ADC 410-1 and 410-2 are coupled to a clock 476 which determines which signals from multiplexers 408-1 and 408-2 are currently being digitized and, therefore, in which of register 478-1 through 478-4 the result of that digitization should be stored. In some embodiments, analog-to-digital converters 410-1 and 410-2 can be, for example, 10 bit converters sampling at a rate of about 26 Mhz, with each sample being taken from a different input of multiplexers 408-1 and 408-2, respectively. In some embodiments ADC 410-1 and 410-2 can sample the output signals from anti-aliasing filters 406-1 through 406-6 at a higher rate than other signals, for example the $LP_v$ signal or the output signal from gain 420. In some embodiments, for example, ADC 410-1 and 410-2 may sample each of the output signals from anti-aliasing filters 406-1 through 406-6 at an effective sampling rate of about 6.6 MHz.

The digitized signals from analog-to-digital converts 410-1 and 410-2, then, are the digitized and equalized HF signal $HF_d$, the digitized laser power signal $LP_d$, and digitized detector signals $A_d$, $E_d$, $C_d$, $B_d$, $F_d$, and $D_d$. Digitized laser power signal $LP_d$ is input to DSP 416 and can be utilized in a digital servo loop for controlling laser power or in determination of gain and offset values for various components. Alternatively, DSP 416 or microprocessor 432 can monitor $LP_d$ to determine error conditions.

The digitized HF signal $HF_d$ can be input to focus OK (FOK) 412, which outputs a signal to DSP 416 and microprocessor 432 indicating whether focus is within a useful range. Detectors 225 and 226 are sized such that, when OPU 103 is seriously out of focus, light is lost off detectors 225 and 226. Therefore, FOK 412 determines if the total intensity of light on detectors 225 and 226 is above a FOK threshold value indicating a near in-focus condition. In some embodiments, this function can also be executed in software rather than hardware. Further, the FOK threshold value can be fixed or can be the result of a calibration algorithm. In some embodiments, the FOK threshold value can be dependent upon the type of media on optical media 102 that OPU 103 is currently over.

Digitized detector signals $A_d$, $E_d$, $C_d$, $B_d$, $F_d$, and $D_d$ are input to decimation filters 414-1 through 414-6, respectively. Decimation filters 414-1 through 414-6 are variable filters which down-sample the digitized detector signals $A_d$, $E_d$, $C_d$, $B_d$, $F_d$, and $D_d$ to output signals $A_f$, $E_f$, $C_f$, $B_f$, $F_f$, and $D_f$, which are input to DSP 416. In some embodiments, for example, each of signals $A_d$, $E_d$, $C_d$, $B_d$, $F_d$, and $D_d$ has effectively been sampled at 6.6 MHz by ADC 410-1 and 410-2. Decimation filters 414-1 through 414-6 can then down-sample to output signals $A_f$, $E_f$, $C_f$, $B_f$, $F_f$, and $D_f$ at, for example, about 70 kHz. Embodiments of decimation filters 414-1 through 414-6 can down-sample to any sampling rate, for example from about 26 kHz to about 6.6 MHz.

The effects of down-sampling in decimation filters 414-1 through 414-6 include an averaging over several samples of each of signals $A_d$, $E_d$, $C_d$, $B_d$, $F_d$, and $D_d$. This averaging provides a low-pass filtering function and provides higher accuracy for signals $A_f$, $E_f$, $C_f$, $B_f$, $F_f$, and $D_f$ which are actually read by DSP 416 and utilized in further calculations. In some embodiments, the accuracy is effectively increased to 13 bits from the 10 bit output signals from ADC 410-1 and 410-2.

Further, although the data signals included in the HF signal can be at high frequency (e.g., several MHz), the servo information is at much lower frequencies. In some embodiments, the mechanical actuators 206 and 201 of actuator arm 104 can respond to changes in the hundreds of hertz range yielding servo data in the 10s of kilohertz range, rather than in the Megahertz ranges of optical data. Further, mechanical resonances of actuator arm 104 can occur in the 10's of kilohertz range. Therefore, down-sampling effectively filters out the high frequency portion of the spectrum that is not of interest to servo feedback systems. Further, a much cleaner and more accurate set of digital servo signals $A_f$, $E_f$, $C_f$, $B_f$, $F_f$, and $D_f$ are obtained by the averaging performed in decimation filters 414-1 through 414-6, respectively. In some embodiments, decimation filters 414-1 through 414-6 can be programmed by microprocessor 432 or DSP 416 to set the output frequency, filtering characteristics, and sampling rates.

In particular, a tracking wobble signal at about 125 KHz in the track on writeable portions 151 of optical media 102 results from a slight modulation in the physical track in that region. This wobble is filtered out of signals $A_f$, $E_f$, $C_f$, $B_f$, $F_f$, and $D_f$ by filtering provided in decimation filters 414-1 through 414-6. Actuator arm 104 cannot respond to control efforts in this frequency range. Similarly, a stabilizing frequency on laser power at 500 MHz, from modulator 219 (see FIG. 2B), is filtered out of signals $A_f$, $E_f$, $C_f$, $B_f$, $F_f$, and $D_f$ by filtering provided in decimation filters 414-1 through 414-6. For servo purposes, only the lower frequency region of the signals are important. Then, the signals $A_f$, $E_f$, $C_f$, $B_f$, $F_f$, and $D_f$ only include sensor noise and real disturbances that can be followed by a servo system operating on, for example, actuator arm 104. Those disturbances can include physical variations due to stamping errors in the mastering process, since tracks will not be perfectly laid. In addition, spindle motor 101 may provide some errors through bearings that cause vibration. Additionally, optical media 102 may not be flat. Tracking and focus servo functions, as well as the servo systems tracking laser power and the rotational speed of spindle motor 101, can follow these errors. Further, it is important that the spectral response of a servo system be responsive to the frequency range of the errors that are being tracked. If not, then the servo system may make the tracking and focus environments worse. Further, embodiments of drive 100 operate in extremes of physical abuse and environmental conditions that may alter the resonant frequency characteristics and response characteristics of spindle motor 101, optical media 102, and actuator arm 104 during operation in the short term or during the lifetime of drive 100 or optical media 102. A servo system according to the present invention should be insensitive to these changing conditions.

The digital output signals $A_d$, $E_d$, $C_d$, $B_d$, $F_d$, and $D_d$ are further input to summer 438. Summer 438 can be a programmable summer so that a sum of particular combinations of inputs $A_d$, $E_d$, $C_d$, $B_d$, $F_d$, and $D_d$ can be utilized. Summer 438 sums a selected set of signals $A_d$, $E_d$, $C_d$, $B_d$, $F_d$, and $D_d$ to form a low-bandwidth digitized version of the HF signal. The output signal from summer 438 is multiplexed in multiplexer 441 and multiplexer 443 with the digitized HF signal $HF_d$ output from ADC 410-1. A HF select signal input to each of multiplexer 441 and 443 selects which of $HF_d$ or the output signal from summer 438 are chosen as the output signal from multiplexer 441 and 443. The output signal from multiplexer 441 is input to disturbance detector 440. Disturbance detector 440 detects defects on media 102 by monitoring the data signal represented by $HF_d$ or the output from summer 438 and alerts DSP 416 of a defect. A defect can include a scratch or speck of dust on optical media 102. Results of defects manifest themselves as sharp spikes in the input signal. In some embodiments, disturbance detector 440 can include a low pass filter. The input signal to disturbance detector 440 is low pass filtered and the filtered signal is compared with the unfiltered input signal. If the difference exceeds a pre-set defect threshold signal, then a defect flag is set. The defect flag can be input to DSP 416 or microprocessor 432.

The output signal from multiplexer 443 is also input to mirror detector 442. Mirror detector 442 provides a signal similar to the TES, but 90 degrees out of phase. DSP 416 receives the mirror signal and, in combination with the TES calculated within DSP 416, can determine direction of motion while track seeking. The TES is a sine wave that indicates a track jump over one period of the wave. If a tracking servo system attempts to track at the zero-crossing with an improper slope, the servo system will simply move actuator arm 104 away from that zero-crossing. The mirror signal can be utilized to indicate if the motion is in the proper direction.

Additionally, signals $A_d$ and $C_d$ are received in summer 444, which calculates the value $A_d$-$C_d$. Further, signals $B_d$ and $D_d$ are input to summer 446 which calculates the value $B_d$-$D_d$. The output signals from summer 444 and summer 446 are input to summer 448, which takes the difference between them forming a version of tracking error signal, TES, from the digitized detector output signals. The output signal from summer 448 is input to a bandpass filter 450. The output signal from bandpass filter 450 is PushPullBP. The output signal from summer 448 is further input to a lowpass filter 452. The output signal from lowpass filter 452 is input to track crossing detector 454 which determines when the TES calculated by summer 448 indicates that OPU 103 has crossed a track on optical media 102. The output signal from track crossing detector 454 is the TZC signal and is input to DSP 416.

The low-pass filtered TES is a sine wave as a function of position of OPU 103 over optical media 102. (See, e.g., FIG. 2R). A one-period change in TES indicates a track crossing. Then, in some embodiments track crossing detector 454 can output a TZC pulse whenever the TES crosses zero (which results in two pulses per track crossing). In some embodiments, track crossing detector 454 can generate a pulse whenever a zero crossing having the proper slope in the TES curve is detected.

The signal PushPullBP can be input to Wobble/PreMark detector 428. In some embodiments, in the writeable portion of optical media 102 the tracks have a predetermined wobble, resulting from an intentional modulation in track position, which has a distinct frequency. In some embodiments, the wobble frequency of PushPullBP is in the 100 kHz range (in some embodiments around 125 kHz) and therefore, with decimation filters 414-1 through 414-6 operating as a low-pass filter at around 70 kHz, is filtered out of signals $A_f$, $E_f$, $C_f$, $B_f$, $F_f$, and $D_f$. Bandpass filter 450 can be set to pass TES signals of that frequency so that detector 428 detects the wobble in the track.

The frequency of wobble in the track from detector 428 is indicative of the rotational speed of spindle driver 101. Further, a spindle speed indication from spindle motor 101 itself can be directly input to microprocessor 432 and DSP 416. Further, the signal from gain 420 can be input to slicer 422, DPLL 424, and Sync Mark Detector 426 to provide a third indication of the speed of spindle motor 101. Slicer 422 determines a digital output in response to the output signal from equalizer 418 and amplifier 420. Slicer 422 simply indicates a high state for an input signal above a threshold value and a low state for an input signal below the threshold. DPLL 424 is a digital phase-locked loop, which basically servos a clock to the read back signal so that sync marks on the tracks can be detected. Sync mark detector 426, then, outputs a signal related to the period between detected sync marks, which indicates the rotational speed of spindle driver 101.

Each of these speed indications can be input to multiplexer 430, whose output is input to microprocessor 432 as the signal indicating the rotational speed of spindle motor 101. Microprocessor 432 can choose through a select signal to multiplexer 430 which of these rotational speed measurements to use in a digital servo loop for controlling the rotational speed of spindle driver 101.

Microprocessor 432 and DSP 416 output control efforts to drivers that affect the operation of drive 100 in response to the previously discussed signals from actuator arm 104 and spindle driver 101. A control effort from microprocessor 432 is output to spin control 456 to provide a spin control signal to driver 340 (see FIG. 3A) for controlling spindle driver 101. A digital servo system executed on microprocessor 432 or DSP 416 is further discussed in the Spin Motor Servo System disclosures. In some embodiments, as is further discussed below, microprocessor 432 outputs a coarse tracking control effort to serial interface 458.

In embodiments of drive 100 with a digital servo loop for controlling laser power, a signal from microprocessor 432 or DSP 416 is input to a laser control digital to analog converter 460 to provide a control effort signal to the laser driver of laser servo 105 (see FIG. 3A). A focus control signal can be output from either microprocessor 432 or DSP 416 to a focus digital to analog converter 464 to provide a focus control signal to power driver 340 (see FIG. 3A). A tracking control signal, which in some embodiments can be a fine tracking control effort, can be output from either microprocessor 432 or DSP 416 to a tracking digital to analog converter 468 to provide a tracking control signal to power drivers 340. A diagnostic digital to analog converter 466 and other diagnostic functions, such as analog test bus 470, digital test bus 472, and diagnostic PWM's 474, may also be included. Further a reference voltage generator 462 may be included to provide a reference voltage to digital-to-analog converters 460, 464, 466, and 468.

Microprocessor 432 and DSP 416 can communicate through direct connection or through mailboxes 434. In some embodiments, DSP 416 operates under instructions from microprocessor 432. DSP 416, for example, may be set to perform tracking and focus servo functions while microprocessor 432 provides oversight and data transfer to a host computer or to buffer memory 320. Further, microprocessor 432 may provide error recovery and other functions. Embodiments of control architectures are further discussed in the System Architecture disclosures. DSP 416, in some embodiments, handles only tracking and focus servo systems while microprocessor 432 handles all higher order functions, including error recovery, user interface, track and focus servo-loop closings, data transport between optical media 102 and buffer memory 320, and data transfer between buffer memory 320 and a host, read and write operations, and operational calibration functions (including setting offset and gain values for offset 402-1 through 402-6 and amplifiers 404-1 through 404-6 and operational parameters for decimation filters 414-1 through 414-6).

Tracking and Focus Servo Algorithms

FIGS. 5A and 5B together show a block diagram of an embodiment of tracking, focus and seek algorithms 500. Algorithms 500 shown in FIGS. 5A and 5B can be, for example, primarily executed on DSP 416 of FIG. 4. In some embodiments, real-time tracking and focus algorithms are executed on DSP 416 whereas other functions, including calibration and high-level algorithm supervision, are executed on microprocessor 432. In some embodiments, microprocessor 432 can also manage which algorithms are executed on DSP 416. Algorithm 500 includes a focus servo algorithm 501 and a tracking algorithm 502. Further algorithms include a multi-track seek algorithm 557 and a one-track jump algorithm 559.

Focus servo algorithm 501, as shown in FIGS. 5A and 5B, includes, when fully closed, summer 506, offset summer 507, FES gain 509, inverse non-linearity correction 511, cross-coupling summer 513, FES sample integrity test 515, low frequency integrator 516, phase lead 518, notch filter 519, focus close summer 521, loop gain 524, and feedforward summer 533. Similarly, tracking servo loop 502, when fully closed, includes summer 540, offset summer 541, TES gain 543, TES inverse non-linearity correction 546, TES sample integrity test 548, low frequency filter 549, phase lead 550, notch filters 551 and 553, and loop gain amplifier 564.

Further, algorithm 500 includes detector offset calibration 584 and detector gain calibration 583. Along with other calibration procedures shown in algorithm 500, these calibrations are discussed further in the Servo System Calibration disclosures.

As shown in block 503, digitized and filtered signals $A_f$, $E_f$, $C_f$, $B_f$, $F_f$, and $D_f$ from decimation filters 414-1 through 414-6 as shown in FIG. 4. For purposes of discussion, signals $A_f$, $E_f$, $C_f$, $B_f$, $F_f$ and $D_f$ have been relabeled in subsequent Figures to be A, E, C, B, F, and D, respectively. Block 504 receives signals A, C, and E and calculates an $FES_1$ signal as $$FES_1=(A+C-E)/(A+C+E),$$

as was previously discussed with FIG. 2J with the analog versions of signals A, C, and E. Block 505 receives signals B, D, and F and calculates an $FES_2$ signal according to $$FES_2=(B+D-F)/(B+D+F),$$

as was previously discussed with FIG. 2K with the analog versions of signals B, D, and F. Summer 506 calculates the differential FES signal according to $$FES=FES_1-FES_2.$$

As was previously discussed, FIG. 2L shows the FES signal as a function of distance between OPU 103 and optical media 102. As previously discussed, in some embodiments further processing can be performed on TES and FES signals, for example to reduce cross-talk.

The FES signal is input to offset adder 507, which adds an FES offset from offset calibration 508. The best position on the FES curve (see FIG. 2L) around which a servo system should operate can be different for the servo system than it is for read or write operations. In other words, optimum read operations may occur around a position on the FES curve that differs from the optimum position utilized for best servo operation. FES offset calibration 508, which inputs the peak-to-peak tracking error signal TES P-P and a data jitter value and outputs an FES offset value, is further discussed below.

The output signal from offset adder 507 is input to FES Gain 509. The gain of FES gain 509 is determined by FES gain calibration 510. The gain of FES gain 509 is such that the output value of gain 509 corresponds to particular amounts of focus displacement at focus actuator 206. Fixing the correlation of the magnitude of the output signal from gain 509 with particular physical displacements of OPU 103 allows the setting of thresholds that determine whether or not focus loop 501 is sufficiently closed to transfer data. Although discussed further in the Servo System Calibration disclosures, FES gain calibration 510 can determine an appropriate value of the gain for FES gain 509 by varying the distance between OPU 103 and optical media 102 and monitoring the peak-to-peak value of the resulting FES signal. In some embodiments, the gain of FES gain 509 can be fixed.

As a result of the calibrated gain of FES gain 509, the FES signal output from FES gain 509 can have a set peak-to-peak value. Between the peaks of the amplified FES signal from FES gain 509 is a near linear region of operation. Focus servo algorithm 501 operates in this region unless a shock sufficient to knock focus out of the linear region is experienced. It is beneficial if, between separate drives and between different optical media 102 on drive 100, along with any differences in detectors and actuator response between drives, that the FES output from FES gain 509 be normalized. This allows for threshold values independent of particular drive or particular optical media to be set based on the amplified FES to determine ability to read or write to optical media 102. In some embodiments, for example, the peak-to-peak motion of OPU 103 relative to optical media 102 may correspond to about a 10 μm movement.

However, although the amplified FES output from FES gain 509 can be normalized to a particular peak-to-peak value corresponding to particular displacements of OPU 103 relative to optical media 102, the amplified FES output can be non-linear between those peaks. FES inverse non-linearity 511 operates to remove the potentially destabilizing effects of non-linearity of the amplified FES. In some embodiments, calibration 512 may create a table of gains related to the slope of the FES as a function of the FES offset value. In that case, if a shock occurs and the servo is on a different offset value of the FES curve, then FES inverse non-linearity 511 can obtain a linearizing gain value from the table of gains. In that fashion, FES inverse non-linearity 511 can help quickly react to a shock to recover focus. In some embodiments, the FES curve can be recorded and the gain of FES non-linearity 511 can be set according to the recorded FES curve. In either case, the gain setting of inverse non-linearity 511 is set depending on the FES offset voltage, which determines the point on the FES curve about which servo system 501 is operating.

The output signal from FES inverse non-linearity 511 is input to coupling summer 513. An estimate of the optical cross-coupling with a corresponding TES signal is subtracted from the FES at summer 513. The estimated correction is determined by Tes-to-Fes Cross-Coupling Gain 514. TES-to-FES cross-coupling gain 514 may, in some embodiments, determine the amount of TES to subtract in summer 513 from a ratio produced by TES-to-FES Cross Talk Gain Calibration 579. As discussed further in the Servo System Calibration disclosures, calibration 579 can insert a small test component (e.g., a sine wave) to the tracking control effort signal and measure the effects on the FES signal at the input of summer 513 in order to determine the ratio used in cross-coupling gain 514.

Therefore, a certain percentage of the TES signal is subtracted from the FES signal in summer 513. In some embodiments, the particular percentage (indicated by the gain of gain block 514) can be fixed. In some embodiments, a TES-to-FES cross-talk gain calibration 579 determines the gain of gain block 514. Cross-talk gain calibration 579 is further discussed in the Servo System Calibration disclosures. In some embodiments, the gain of gain block 514 can be changed depending upon the type of media, e.g. writeable or premastered, that OPU 103 is currently over.

The output signal from cross-talk summer 513 is input to FES sample integrity test 515. Sharp peaks may occur in the FES signal as a result of many factors, including defects in optical media 102, dust, and mechanical shocks. These signals occur as a dramatic change from the typical FES signal that has been observed at integrity test 515. In some embodiments, signals of this type may be on the order of 10 to 500 microseconds in duration. In many instances, the resulting FES signal may indicate an apparent acceleration of actuator arm 104 that is physically impossible. It would be detrimental to overall operation of drive 100 for focus servo algorithm 501 to respond to such sporadic inputs since, if there is a response by focus servo algorithm 501, recovery to normal operation may take a considerable amount of time. Therefore, integrity test 515 attempts to detect such signals in the FES signal and cause focus servo algorithm 501 to ignore it by filtering the signal out.

Integrity test 515 inputs a defect signal, which can be the defect signal output from disturbance detector 440 shown in FIG. 4. Essentially, upon receiving a defect signal, integrity test 515 creates a low-pass filtered version of the FES signal to substitute for the defective FES signal. In some embodiments, a defect flag can be set each time this occurs so that error recovery can be initiated if too many defects, resulting in filtered FES signals, are experienced. Use of the low-pass filtered FES signal over a long period of time can cause phase-margin problems in focus servo algorithm 501, which can affect the stability of drive 100.

In some embodiments, sample integrity test 515 may low-pass filter FES signal at its input and subtract the filtered FES signal from the received input FES signal. If a peak in the difference signal exceeds a threshold value, then the low-pass filtered FES signal is output from integrity test 515 instead of the input FES signal and a defect flag is set or a defect counter is incremented. The occurrence of too many defects in too short a time can be communicated to an error recovery algorithm. See the System Architecture Disclosures.

In some embodiments, the change in the FES signal between adjacent cycles can be monitored. If the change, measured by the difference between the FES signal in the current cycle and the previous cycle, is greater than a threshold value, then the low-pass filtered FES signal is output from integrity test 515 instead of the input FES signal and a defect flag can be set and the defect counter incremented.

In some embodiments, FES sample integrity test 515 may be disabled. Disabling FES sample integrity test 515, in some embodiments, may occur during focus acquisition so that focus servo algorithm 501 can better respond to transient effects. In some embodiments, FES sample integrity test 515 may be disabled during multi-track seek algorithm 557 and during one-track jump algorithm 559. In some embodiments, FES sample integrity test 515 may be disabled while track following during a read to write transition.

The output signal from FES sample integrity test 515 is input to TES OK detector 517. If a low pass filtered (e.g., 200 Hz $2^{nd}$ order low pass) version of the absolute value of the FES signal FES' output from integrity test 515 exceeds a TES OK threshold value, then a tracking error signal TES can not be trusted. In reality, if the FES signal deviates significantly from its best focus value, then the TES signal can become small. A small TES signal indicates to tracking servo algorithm 502 that tracking is good, which is not the case. Instead, focus has deviated so that tracking is no longer reliable. Under these conditions, an error recovery algorithm can be initiated. See the System Architecture Disclosures.

In some embodiments of the invention, the FES signal FES' is input to seek notch filter 590. Seek notch filter 590 is adjusted to filter out signals at the track crossing frequency when a multi-track seek operation is being performed. Even though there is a TES-FES cross-coupling correction at summer 513, not all of the TES signal will be filtered out of the FES signal, especially during a multi-track seek operation. Therefore, notch filter 590 can be enabled during a multi-track seek operation in order to help filter more of the TES-FES cross coupling from the FES signal. When not enabled, notch filter 590 does not filter and the output signal from filter 590 matches the input signal to filter 590.

The FES signal output from notch filter 590 can be input to low frequency integrator 516. The low frequency integrator provides further gain at low frequencies as opposed to high frequencies. Since the responses to which focus actuator 206 should respond, as discussed above, occur at low frequencies, there is a large incentive in focus servo loop 501 to increase the gain at low frequencies and place emphasis on the servo response at those frequencies. In order to further emphasis the low frequencies, in some embodiments low frequency integrator 516 can be a $2^{nd}$ Order low frequency integrator. Integrator 516 provides additional error rejection capability for low frequency disturbances such as DC bias, external shock and vibration. An example transfer function for low frequency integrator 516 is shown in FIG. 5C. Low frequency integrator 516, for example, can be particularly sensitive to frequencies less than about 100 Hz in order to boost servo response to frequencies less than 100 Hz.

The output signal from integrator 516 is input to phase lead 518. Phase lead 518 provides phase margin or damping to the system for improved stability and transient response. In some embodiments, for example, phase lead 518 can be sensitive to frequencies greater than about 500 Hz. Again, in some embodiments of the invention, phase lead 518 can be a second order phase lead. Further, in some embodiments integrator 516 can be disabled during focus acquisition in order to allow focus servo system algorithm 501 to better respond to transient effects during a focus acquisition procedure. An example transfer function for phase lead 518 is shown in FIG. 5D.

In some embodiments, low frequency integrator 516 and phase lead compensation 518 are accomplished with second order filters instead of first order filters. A second order low frequency integrator provides more low frequency gain, providing better error rejection, than a first order integrator. Additionally, a second order phase lead compensator provides increased phase advance or phase margin at the servo open loop bandwidth than that of a first order phase lead compensator. The second order phase lead compensator also causes less high frequency amplification than that of a first order phase lead for the same amount of phase advance at the crossover.

The output signal from phase lead 518 can be input to a notch filter 519. Notch filter 519 filters out signals at frequencies that, if acted upon by focus servo algorithm 501, would excite mechanical resonances in drive 100, for example in actuator arm 104. In general, notch filter 519 can include any number of filters to remove particular frequencies from the FES signal output from phase lead 518. In some embodiments, notch filter 519 filters out any signal that can excite a mechanical resonance of actuator arm 104 that occurs at around 6 KHz in some embodiments of actuator arm 104.

The output signal from notch filter 519 is input to summer 521. Summer 521 further receives a signal from focus close 535. Focus close 535, during operation, provides a bias control effort to servo loop 501. In some embodiments, focus close 535 provides a focus acquire signal that is summed with the output signal from notch filter 519. In some embodiments, the focus acquire signal operates through focus actuator 206 to first move OPU 103 away from optical disk 102 and then to move OPU 103 back towards optical disk 102 until an FES signal is acquired, after which the focus acquire signal is held constant. When the focus acquire signal is held constant at the bias control effort, servo algorithm 501 operates with the FES signal measured from the A, C, E, B, D, and F values and is therefore a closed loop (with a variation in the FES signal resulting in a corresponding correction in the focus control that is applied to focus actuator 206).

The output signal from summer 521, then, is input to loop gain 522. Loop gain 522 applies a gain designed to set the open-loop bandwidth of servo algorithm 501 to be a particular amount. For example, in some embodiments the open-loop bandwidth is set at about 1.5 kHz, which means that the open loop frequency response of the entire servo loop (including OPU positioner 104, signal processing, and algorithm 501) is 0 dB at 1.5 kHz. Although focus loop gain calibration 522 is further discussed in the Servo System Calibration disclosures, in essence a sine wave generated in sine wave generator 528 is input to summer 523, resulting in a modulation of focus control which translates into a modulation of the measured FES signal. The resulting response in the signal from summer 521 is monitored by discrete Fourier transform (DFT) 527, and DFT 525 in combination with gain calibration 526 in order to set the gain of loop gain amplifier 524. In some embodiments where the transfer function at 1.5 kHz should be unity, the sine wave generator provides a 1.5 kHz sine wave function to summer 523 and gain calibration 526 set the gain of loop gain 524 so that the overall gain of the 1.5 kHz component of the signal output from summer 521 is equal to the overall gain of the 1.5 KHz component of the signal output from summer 523.

The output signal from loop gain 524 is input to multiplexer 531, along with a low-pass filtered version formed in filter 529 and a signal from sample and hold (S/H) 530. During normal operation, multiplexer 531 is set to output the output signal from loop gain 524. Although much of the optical cross-talk is canceled from the control effort signal at summer 513, there is still enough cross talk so that, while OPU 103 is crossing tracks on optical media 102, a track crossing component of the control effort will appear in the output signal of loop gain 524. In some embodiments, seek operations are accomplished at fairly high rates, resulting in a track crossing signal of the order of a few kHz. Therefore, during a seek operation a low-pass filtered version of the output signal from loop gain 524 can be substituted for the signal from loop gain 524. In some embodiments, the output signal from a sample and hold (S/H) 530 circuit can be substituted for the signal from loop gain 524 by multiplexer 531. The effects of changing FES as OPU 103 passes over multiple tracks can then be prevented from translating into a corresponding movement of OPU 103.

In a one-track jump operation, there is a similar concern about effects on the FES signal from crossing tracks (i.e., TES-FES crosstalk). In some embodiments, in a one-track jump, the output signal from sample and hold (S/H) 530 is output from multiplexer 531. Sample and hold (S/H) 530 holds the output signal to match that of previous output signals so that the resulting control effort is simply held constant through the one-track jump operation.

The output signal from multiplexer 531 is input to summer 533. The output signal from summer 533 is, then, the control effort signal that is input to focus DAC 464 (FIG. 4) from DSP 416 and then to power driver 340 to result in a current being applied to focus actuator 206 to provide focus. In summer 533, the output signal from multiplexer 531 is summed with an output signal from feed-forward loop 532. Feed-forward loop 532 inputs the output signal from multiplexer 531 and attempts to predict any regularly occurring motion of OPU 103 relative to optical media 102. These motions occur, for example, because optical media 102 is not flat and the surface of optical media 102 will vary in a regular way as optical media 102 is spun. As a result, left alone, there will be a FES generated having the same harmonic as the rotational rate of optical media 102. Feedforward loop 532 provides these harmonics to summer 533 so that the control effort includes these regular harmonics. In that case, the FES signal calculated from signals A, C, E, B, F, D will not include these regular harmonics. In some embodiments, feed-forward loop 532 responds to multiple harmonics of any such regular motion of OPU 103 so that none of the harmonics are included in the calculated FES signal.

In order to determine if the focus is OK, a sum of all of the detector signals A, C, E, B, D and F is calculated in summer 534 and the resultant sum is input to Focus OK block 536. Focus OK block 536 compares the overall sum with a focus threshold value generated by FES Gain calibration 510 and, if the sum is greater than the focus threshold, indicates a focus OK condition. If, however, the sum is less than the focus threshold, then a focus open signal is generated by focus OK block 536. In some embodiments, focus OK block 536 may indicate an open focus condition only after the sum signal has dropped below the focus threshold for a certain period of time. This will prevent a defect situation (e.g., a dust particle) from causing servo algorithm 501 to lose (i.e., open) focus.

The output signal from summer 534 is also input to defect detector 591. Defect detector 591 monitors a high-pass filtered sum signal to identify the presence of media defects. In some embodiments, if the high-pass filtered sum signal exceeds a threshold value then the presence of a defect is indicated. In some embodiments, defect detector 591 can determine whether or not changes in the sum signal from summer 534 are the result of changes in laser power (for example in transitions from read to write or write to read or in spiraling over previously written data) as media defects. In some embodiments, defect detector 591 will "time-out" if the defect appears to remain present for a long period of time, which under that condition may indicate other than a media defect.

In some embodiments, defect detector 591 detects defects by detecting sudden changes in the sum signal. A change in laser power can result in a sudden changes in the sum signal which can be falsely identified as a defect. In some embodiments, a laser servo controller can inform defect detector 591 of changes in laser power. Once defect detector 591 is notified of a change, then defect detector can delay for a time period (for example about 5 ms) to allow the sum signal and transients from a sum signal low pass filter in defect detector 591 to settle before proceeding to detect detects. Notification of defect detector 591 before a laser power change can reduce the risk of falsely identifying a defect. In some embodiments, defect detector 591, which can be executed on DSP 416, can monitor the focus sum threshold value, which can be changed in by microprocessor 432 when laser power is changed. Defect detector 591 can then by notified of changes in laser power by the change in focus sum threshold value.

Additionally, the sum signal can change when crossing media types (e.g., from premastered to writeable or from writeable to premastered). In some embodiments, multi-track seek algorithm 557 knows when a boundary crossing will occur. In some embodiments, multi-track seek algorithm 557 can inform defect detector 591 when a boundary is crossed so that a false defect detection at a boundary crossing does not occur. In some embodiments, the defect threshold value, the threshold value against which the sum signal is compared to detect defects, can be set large enough to not respond to changes in reflectivity associated with a media type boundary change. However, if the defect threshold value is set too high defects may not be detected.

Sliding Notch Filter 595 can reduce the effects of optical cross-talk (TES into FES) during multi-track seek operations. Multi-track seek controller 557 can be a velocity controlled servo controller. Sliding notch filter 595 can track the seek reference velocity of multi-track seek controller 557. For example, the maximum reference velocity could be 10 kHz and the minimum reference velocity could be 2 kHz. Sliding notch filter 595 can vary it's center frequency from 10 kHz to 2 kHz as a function of the seek reference velocity multi-track seek controller 557.

Tracking servo algorithm 502, in many respects, is similar in operation to focus servo algorithm 501. In some embodiments, tracking servo algorithm 502, when closed, inputs detector signals A, C, B, and D and calculates a tracking error signal TES from which a tracking control effort is determined. In some embodiments a coarse tracking control effort, which is output from loop gain calibration 562, and a coarse tracking control effort, which is output from feedforward control 585, can be output.

Detector signals A and C are input to block 538, which calculates a tracking error signals $TES_1$ according to $$TES_1=(A-C)/(A+C),$$

such as is described with FIG. 2P. Detector signals B and D are input to block 539, which calculates $TES_2$ according to $$TES_2=(B-D)/(B+D),$$

such as described with FIG. 2Q. The difference between $TES_1$ and $TES_2$ is calculated in summer 540 to form a TES input signal, as is described with FIG. 2R. The TES input signal responds to variation in the tracking motion of OPU 103 (as controlled by tracking actuator 201) as discussed above with the analog versions of signals A, C, E, B, D, and F, for example, with FIGS. 2M through 2R. In some embodiments, further processing of the TES signal may be performed, for example to reduce cross-talk.

The TES signal output from summer 540 is input to summer 541, where it is summed with an offset value. The offset value is determined by TES offset calibration 542. The output signal from offset summer 541 is input to TES gain 543, which calibrates the peak-to-peak value of the TES signal in accordance with a TES gain calibration algorithm 544. As discussed above, the TES signal as a function of tracking position is a sine wave. As discussed below, in some embodiments the TES offset value can be determined to be the center point between the maximum and minimum peaks of the TES sine wave. Additionally, in some embodiments the TES offset value can be affected by a determination of the optimum value of the TES offset value for data reads or writes and may vary for differing tracking positions across optical media 102. In some embodiments, the TES gain calibration is set so that the peak-to-peak value of the resulting TES signal output from TES gain is at a preset peak-to-peak value. The preset peak-to-peak value is selected to provide the best dynamic range over the range of tracking motion of OPU 103.

Information regarding the peak-to-peak value of the TES signal as a function of position on optical media 102 can be determined in TES P-P 545. In an open tracking situation, the TES signal varies through its range of motions as tracks are crossed by OPU 103. TES P-P 545, in some embodiments, records the highest and lowest values of the TES signal as the peak-to-peak values. In some embodiments, an average of the highest and lowest values of the TES signal is recorded as the peak-to-peak values. The peak-to-peak values can be input to Offset calibration 542 which calculates the center point and gain calibration 544, which calculates the gain required to adjust the peak-to-peak values to the preset value.

The TES signal output from offset 541 is input to TES gain 543. TES gain 543 can, in some embodiments, be calibrated by TES offset calibration 542. Calibration algorithms, such as TES offset calibration 542, are further described in the Servo System Calibration disclosures.

The TES signal output from TES gain 543 is input to TES inverse non-linearity 546. TES inverse non-linearity 546 operates to linearize the TES signal around the operating point determined by the TES offset, as was discussed above with respect to FES inverse non-linearity 511. Calibration 547 can calculate the gain of TES non-linearity 546 for various values of TES offset to linearize the TES signal as a function of position about the operating point.

The output signal from TES inverse non-linearity 546 is input to TES sample integrity test 548. TES sample integrity test 548 operates with the TES signal in much the same fashion as FES sample integrity test 515 operates with the FES signal, which is discussed above. In some embodiments, TES sample integrity test 548 can be enabled with an enablement signal. When TES sample integrity test 548 is not enabled, then the output signal from TES sample integrity test 548 is the same as the input signal to TES sample integrity test 548.

The input signal to TES sample integrity test 548 and the input signal to FES sample integrity test 515 and a defect signal produced by defect detector 591 are input to write abort algorithm 537, which determines whether, in a write operation, the write should be aborted. If it appears from FES or TES that TES or FES is too large (i.e., one of TES and FES has exceeded a threshold limit), then write abort 537 aborts a write operation to the optical media 102 by providing an abort write flag. However, if TES or FES exceeds the threshold limits and defect detector 591 indicates a defect, the write is not aborted. In some embodiments, low pass filtered FES and TES values are utilized to determine whether FES or TES are too large. Low pass filtered FES and TES values can essentially include the DC components of the FES and TES signals. A programmable number N, for example 2, consecutive samples with TES or FES above limits and a defect indicated are allowed before write abort 537 aborts a write operation. Aborting the write can prevent damage to optical media 102 due to the high power of laser 218, which crystallizes the amorphous material on the writeable portion of optical media 102. Further, damage to adjacent track data can also be prevented.

The output signal from TES sample integrity test, TES', is, in a closed tracking situation, input to low frequency integrator 549 and then to phase lead 550. Low frequency integrator 549 and phase lead 550 operate similarly to low frequency integrator 516 and phase lead 518 of focus servo algorithm 501. Again, in order to provide better response to low frequency portions of TES, low frequency integrator 516 and phase lead 518 can be second order filters. As discussed previously, a second order low frequency integrator provides more low frequency gain, providing better error rejection, than a first order integrator. Additionally, a second order phase lead compensator provides increased phase advance or phase margin at the servo open loop bandwidth than that of a first order phase lead compensator. The second order phase lead compensator also causes less high frequency amplification than that of a first order phase lead for the same amount of phase advance at the crossover.

The output signal from phase lead 550 is input to notch filter 551. Notch filter 551 can be calibrated by notch calibration 552. Again, notch filter 551 prevents control efforts having frequencies that excite mechanical resonances in actuator arm 104. These mechanical resonances can be well known in nature (depending on the structure of actuator arm 104) but may vary slightly between different drives. The output signal from notch filter 551 can be input to a second notch filter 553 in order that fixed and known resonances can be filtered. Notch filter 551 and notch filter 553 can each include multiple notch filters.

In some embodiments, the output signal from notch filter 553 is input to a retro-rocket loop gain amplifier 830. Retro rocket 830 provides additional gain to tracking servo loop 501 after execution of a multi-track seek operation in order to more aggressively close tracking on a target track. Retro rocket 830 is enabled by multi-track seek controller 557.

In a closed-tracking mode, switch 556 is closed and the output signal from notch filter 553 is input to multiplexer 558. Again, in a closed tracking mode, multiplexer 558 provides the output signal from notch filter 553 to loop gain calibration 562. As discussed above with respect to focus loop gain calibration 522, loop gain calibration 562 arranges that the frequency response at a selected frequency is 0 dB. To do that, a sine wave generated in generator 568 is added to the control effort in summer 563 and the response in input signal to gain calibration 562 is monitored. The input signal is provided through Discrete Fourier Transform (DFT) 567 to gain calibration 566, along with the output signal from summer 563 processed through DFT 565. Gain calculation 566, then, sets the gain of loop gain 564 so that the open loop gain has 0 dB of attenuation at that frequency. The bandwidth set by loop gain calibration 562 may differ from the bandwidth set by focus loop gain calibration 522.

Switch 556 is closed by close tracking algorithm 555. When tracking is open, the TES signal is a sine wave as tracks pass below OPU 103. The period of the sine wave represents the time between track crossings. Tracking can be closed near, for example, the positive sloping zero-crossing of the TES versus position curve (see FIG. 2R). If a track closing is attempted at a zero-crossing with the improper slope, tracking servo algorithm 502 will operate to push OPU 103 into a position at the zero-crossing with the proper slope.

In some embodiments, TZC detector 554 receives the TES' signal from TES sample integrity test 548 and determines the track zero-crossings TZC and the TZC period, which indicates how fast tracks are crossing under OPU 103. In some embodiments, TZC can be input from tracking crossing detector 454 and that TZC value can be utilized to compute the TZC period. If the track crossings are at too high a frequency, then tracking algorithm 502 may be unable to acquire tracking on a track. However, in another part of the rotation of optical media 102 the track crossing frequency will become lower, providing an opportunity to acquire tracking. In some embodiments, close tracking algorithm 555 can reduce the angular speed of spin motor 101 if the track crossing frequency is too high.

Therefore, when close tracking algorithm 555 is commanded to close tracking, close tracking algorithm 555 monitors the TZC period and, when the TZC period gets high enough (i.e., the frequency of track crossings gets low enough), tracking algorithm 555 closes switch 556 to close tracking servo loop algorithm 502 to operate closed loop on a track. However, there can be large transients when switch 556 is closed because OPU 103 can have some initial velocity with respect to the track when switch 556 is closed.

Therefore, the lower the frequency of crossing (indicating a lower speed of OPU 103 with respect to the tracks), the lower the transients caused by closing switch 556. Prior and during closing of switch 556, the low frequency integrator 549 is disabled by a enable signal from close tracking algorithm 555.

In some embodiments, the output signal from loop gain 564 provides a fine control effort. In some embodiments, tracking DAC 468 (FIG. 4) is an 8-bit digital-to-analog converter. Tracking actuator 201, however, needs to move OPU 103 from the inner diameter (ID) of optical media 102 to the outer diameter (OD) of optical media 102. Therefore, although actuator arm 104 must move OPU 103 from ID to OD, while tracking is closed small motions of OPU 103 around the tracking position are required. For example, in some embodiments when tracking is closed OPU 103 moves in the range of approximately ±70 nm around a central position. Further, in some embodiments a full stroke from ID to OD is approximately ¼ inch to a ½ inch. In addition to the large dynamic range required to move OPU 103 from ID to OD on optical media 102, there is also a spring force in the mounting of spindle 203 of actuator arm 104 to overcome.

Therefore, in some embodiments of the invention a second DAC converter can be utilized as a coarse actuator control while the control effort from loop gain 564 can be utilized as a fine actuator control. The tracking control effort signal output from loop gain 564, then, is input to tracking DAC 468 (FIG. 4). Tracking DAC 468 can have any number of bits of accuracy, but in some embodiments includes an 8-bit digital to analog converter.

In some embodiments, a coarse tracking control effort is generated by bias feedforward control 585. The coarse tracking control effort generated by bias feedforward control 585 can be the low-frequency component of the tracking control effort produced by loop gain 564. The coarse tracking control effort, then, can be communicated to microprocessor 432, which can then transfer the coarse control effort to power driver 340 (FIG. 3A) through serial interface 458. A second digital-to-analog converter in power driver 340, in some embodiments having an accuracy of 14 bits, receives the coarse control effort from microprocessor 432 through serial interface 458. In power drive 340, the analog course control effort is then summed with the analog fine control effort from DAC 468 to provide the whole tracking control current to tracking actuator 201. Therefore, microprocessor 432 can determine the low frequency component of the tracking control effort in order to bias tracking actuator 201 while DSP 416, executing tracking servo algorithm 502, determines the fine tracking control effort to hold OPU 103 on track.

In some embodiments, the output signal from loop gain 564 is input to anti-skate algorithm 593. Anti-skate algorithm 593 receives a direction signal from direction detector 592 and an anti-skate enable signal from tracking skate detector 561. Anti-skate algorithm 593, when enabled, determines which TES slope is stable and which is unstable. The stable slope will be different for the two opposite directions of motion of OPU 103 relative to optical media 102. For example, if a positive sloping TES signal is stable when OPU 103 is traveling from the inner diameter (ID) to the outer diameter (OD), the negative sloping TES signal is stable when OPU 103 is traveling from the OD to the ID. Anti-skate algorithm 593, then, prevents tracking control loop 502 from closing on an unstable slope, which can prevent further skating from attempting to close on the unstable slope. During periods when the tracking error signal indicates an unstable slope, a substitute tracking control effort can be substituted for the tracking control effort received from tracking servo system 502. Anti-skate algorithm 593 allows tracking control algorithm 502 to more easily close onto a track once a significant disturbance has caused the tracking servo to slide across several tracks (i.e. skate).

Bias control 585 receives the control effort signal from loop gain 564 through anti-skate algorithm 502. Low pass filter 569, which can be a 200 Hz second order filter, receives the tracking control effort and passes only the low frequency component. The sign of the signal output from low pass filter 569 is detected in sign 570. The sign adds a set amount (for example+1, 0, or −1) to a track and hold circuit that includes summer 574 and feedback delay 575. With 0 inputs to summer 574, the output signal from summer 574 will be the last output signal received, as is stored in delay 575. Sign 570, then, determines whether to increase the bias value of the coarse control effort or decrease the bias value of the coarse control effort. Since the decision to increase or decrease the coarse control effort occurs only during an interrupt cycle of microprocessor 432, and since a single increment or decrement is made per cycle, the course control effort resulting from bias forward control 585 varies very slowly (for example, one increment every 2 ms).

In operations, bias control 585 essentially removes the low frequency component of the fine tracking control effort output from loop gain 564 by transferring the low frequency control effort to coarse control effort output from bias control 585. A constant control effort appearing on the fine tracking control effort, for example, will eventually be totally transferred to the coarse tracking control effort output from bias control 585. However, if the interaction between the fine tracking control effort and the coarse tracking control effort is too fast, there can be stability problems. Therefore, there is incentive to make bias control 585 respond slowly to changes in the low frequency component of the tracking control effort output from loop gain 564. The incrementing or decrementing of the coarse control effort output from bias control 585 occurs during the regular interrupt time (Ts) for operating microprocessor 432, which can in some embodiments be about 2 milliseconds.

In a closed tracking mode, the coarse control effort signal output from summer 578 changes very slowly. However, during seek operations there is a need to change the coarse control effort signal much more quickly. Therefore, during seek operations, the output signal from low pass filter 569 is further filtered through low pass filter 571. A portion (indicated by K multiplier in block 576) is added in summer 574 to the coarse control effort and to summer 578, whose output is the coarse control effort. Therefore, during seek operations the coarse control effort output from bias control 585 can change quickly. Low pass filter 571 allows frequencies low enough (e.g., less than about 20 Hz) to allow the seek control effort to increase the coarse control effort faster than the incremental changes allowed by switch 573 but is of low enough frequency that other disturbances do not affect the coarse control effort output by summer 578.

Additionally, the output signal from low pass filter 569 is input to off-disk detection algorithm 572, which monitors very low frequency components. Since very low frequency components of the TES are amplified a great deal through integrator 549 and phase lead 550, an essentially DC component of TES will have a large gain and, therefore, will be a large component of the tracking control effort output from loop gain 564. This low frequency component is not filtered by low-pass filter 569 and, therefore, is input to off-disk detection algorithm 572. If a large DC signal is observed over a period of time, off-disk detection algorithm 572 concludes that OPU 103 is outside of the operational range of optical media 102 and provides an error message to microprocessor 432. Microprocessor 432, as described in the System Architecture disclosures, then takes the appropriate error recovery steps.

In some embodiments, a calibrated tracking feed-forward control 579 can also be included. Feed-forward control 579 can determine any regular variations in the tracking control effort produced by loop gain 564 and insert a corresponding harmonic effort into the tracking control effort in order to anticipate the required motion of OPU 103. Those harmonics, then, would be subtracted from the TES.

When close tracking algorithm 555 closes tracking, in some embodiments integrator 549 and sample integrity test 548 may be disabled when switch 556 is first closed. This will increase the damping, at the cost of reduced low frequency gain, in tracking servo loop algorithm 502. Once switch 556 is closed, close tracking algorithm 555 may wait some time for any transient effects to decay before enabling integrator 549 and then enabling sample integrity test 548. In other words, before the low frequency components of TES are boosted by integrator 549, servo loop algorithm 502 and actuator arm 104 have settled close to the desired tracking position.

The TES' signal from sample integrity test 548 can also be input to multi-track seek controller 557, one track jump control 559, and tracking skate detector 561. Multi-track seek controller 557, in a multi-track seek operation, supplies a control effort to multiplexer 558 which, when selected, causes actuator arm 104 to move OPU 103 near to a target track on optical media 102. After OPU 103 is at or near the target track, then close tracking algorithm 555 can be activated to close tracking at or near the target track. One track jump algorithm 559, which can be calibrated by a calibration algorithm 560, outputs a control effort signal to multiplexer 558 which, when selected, moves OPU 103 by one track. In some embodiments, a large motion of OPU 103 can be undertaken by multi-track seek controller 557 and then one track jump control 559 can operate to move OPU 103 closer to the target track before tracking is closed by close tracking algorithm 555. Tracking skate detector 561 monitors FES' and indicates when tracking has been opened. If tracking skate detector 561 indicates an open tracking condition, then tracking may need to be reacquired. Furthermore, tracking skate detector 561 enables anti-skate algorithm 593. A signal can be sent to microprocessor 432 so that microprocessor 432 can execute error recovery algorithms, which in this case may involve reacquiring tracking long enough to determine the position of OPU 103 and then performing a seek operation to move OPU 103 to the selected track and reacquiring tracking at the selected track. See the System Architecture Disclosures.

FIGS. 5E and 5F show an embodiment of tracking skate detector 561. As shown in FIGS. 5E and 5B, tracking skate detector 561 receives the TES' signal from TES sample integrity test 548. As shown in FIG. 5F, as OPU 103 moves across tracks the TES' signal shows a sinusoidal signal. The absolute value of the TES' signal is calculated in block 594. The output signal from absolute value block 594 is then input to low pass filter 595. In effect, low pass filter 595 can act as an integrator. The output signal from low pass filter 595 is input to compare block 598 where it is compared with an anti-skate threshold. The output signal from compare block 598 is input to threshold counter 599. If the output signal from low pass filter 595 exceeds the anti-skate threshold more than a maximum number of clock cycles, then counter 599 sets the enable anti-skate flag, enabling anti-skate algorithm 593.

The output signal from low pass filter 595 is also input to compare block 596. Compare block 596 compares the output signal from low pass filter 595 with a skate threshold, which is typically larger than the anti-skate threshold. The output signal from compare block 596 is input to counter 597. If the skate threshold is exceeded for a maximum number of cycles, then counter 597 outputs a skate detected flag. The skate detected flag can then indicate that tracking is open.

FIG. 5G shows an embodiment of direction sensor 592. Direction sensor 592 determines the direction that optical pick-up unit 103 is traveling radially across the surface of optical pick-up unit 103. Summer 5001 sums the optical signals from outside elements of detectors 225 and 226 (FIG. 2D), elements 231, 233, 234 and 236, to form a direction sum signal. In some elements, more or less than two detectors are including in optical pick-up unit 103. The direction sum signal from summer 5001 includes both DC and AC components. The DC component of the direction sum signal represents the laser intensity of laser 218. The AC component of the direction sum signal is dominated by a quadrature signal, which looks similar to TES when crossing tracks except that it is 90 degrees out of phase with the TES. In some embodiments, for example, the direction sum signal can be 90 degrees phase advanced when traveling from the inner diameter (ID) to the outer diameter (OD) of optical media 102 (FIG. 1B) and 90 degrees phase lagged when traveling from OD to ID of optical media 102.

The direction sum signal is input to sample and hold 5002 while the TES, for example from the output signal from summer 541, is input to sample and hold 5003. Media defects on optical media 102 can cause erroneous direction sum signals and TES signals, therefore the Sample and Hold S/H functions 5002 and 5003 hold the high pass filter input signals constant during the presence of a media defect, indicated by the defect signal from defect detector 591.

The output signals from sample and holds 5002 and 5003 are input to high pass filters 5004 and 5005, respectively. The disk reflectivity of optical media 102 varies as a function of disk angular orientation resulting in an undesirable AC signal at the first harmonic of the rotation frequency of optical media 102. The High Pass filter cutoff frequency of filters 5004 and 5005, then, can attenuate the first harmonic reflectivity variation signal. The output signal from High Pass filter 5004, SumHp, is an AC signal representing the quadrature component from the sum signal. Block 5006 converts the analog SumHp signal into a digital logic signal SumHpD, depending on whether SumHp is greater than or less than zero. High Pass Filter 5004 introduced a phase shift into the resulting SumHpD. High Pass Filter 5005 introduces the same phase shift into the TES in order to form a TESHpD signal, which then has a matching phase shift. Similarly, block 5007 converts the TESHpD signal into a logic signal by comparing the TESHpD signal with zero. Logic blocks 5007, 5008, 5009, 5010 and 5011 together perform the following logic function:

$$\text{Direction'} = (\text{TESHpD AND } \overline{\text{SumHpD}}) \text{ OR } (\overline{\text{TESHpD}} \text{ AND SumHpD})$$

The polarity of the direction sensor changes between Mastered and Write-able media. Inverter 5012 inverts Direction' and switch 5013 outputs a direction signal from the output signal of inverter 5012 or from direction', depending on whether OPU 103 is over mastered or write-able media.

FIG. 6 shows an embodiment of a close tracking algorithm 555 (FIG. 5B). Close tracking algorithm 555 closes tracking servo algorithm 502 and therefore acquires tracking. In step 601, algorithm 555 receives a command to close tracking. The close tracking command can originate from microprocessor 432 or from another algorithm executing in DSP 416. Once the close tracking command is received, algorithm 555 proceeds to step 611

In step 611, the TES gain is set based on the peak-to-peak value of the TES signal. In some embodiments, the TES gain can be set for groove crossings or bumps. From step 611, algorithm 555 proceeds to step 602.

In step 602, algorithm 555 determines the TZC period in order to determine the track crossing speed, indicating the relative velocity between OPU 103 and the tracks on optical media 102. The track crossing speed is related to the period of track crossing parameter TZC, which can be determined from TZC detector 554 or can be calculated from TES'.

After the track crossing speed is determined in step 602, algorithm 555 checks for a time-out condition in step 603 by determining whether too much time has passed since the close tracking command was received in step 601. If too much time has passed, a microprocessor time-out flag is set and microprocessor 432 proceeds to an error recovery routine. Otherwise, algorithm 555 proceeds to step 604.

Step 604 determines if the track crossing rate is too high to close tracking. Step 604 can determine if the track crossing rate is too high, for example, by comparing the TZC period with a track close threshold. If the threshold is not exceeded, then the track crossing rate is too high and algorithm 555 returns to step 602. If the track crossing rate is low enough, then algorithm 555 continues to step 605.

In step 605, close tracking algorithm 555 closes switch 556, thereby closing the tracking servo loop. When switch 556 is first closed, integrator 549 and integrity test 548 are disabled to allow better response of the tracking servo loop while transient effects decay. Once switch 556 is closed, algorithm 555 proceeds to step 606.

In step 606, algorithm 555 delays long enough for transient effects from closing switch 556 to decay. Once a particular delay time period has elapsed, algorithm 555 proceeds to step 607 where integrator 549 is enabled. Enabling integrator 549 introduces a new set of transient effects. Therefore, once integrator 549 is enabled, algorithm 555 proceeds to step 608, which waits for another delay time. Once the second delay time has elapsed, algorithm 555 proceeds to step 609 where TES sample integrity test 548 is enabled.

Once step 609 is complete, algorithm 555 proceeds to stop 610 where a tracking closed flag can be sent to either microprocessor 432 or DSP 416, depending on where the original close tracking command originated. In some embodiments of the invention, algorithm 555 is performed as a join effort between both microprocessor 432 and DSP 416. For example, microprocessor 432 may command DSP 416 to close loop in step 601. DSP 416 receives TZC period in step 602 and checks to see if the TZC is below a TZC threshold in step 604. Meanwhile, microprocessor 432 begins a time-out clock. If DSP 416 has not closed switch 556 within the time-out period, then microprocessor 432 proceeds to error recovery. Once switch 556 is closed, DSP 416 will not proceed on this algorithm until, in step 607, microprocessor 432 tells DSP 416 to enable integrator 549. Microprocessor 432 controls the relative timing, while the DSP 416 is slaved and only responds to commands from microprocessor 432. Further, once integrator 549 is enabled in step 607, microprocessor 432 then can tell DSP 419 to enable sample integrity test 548. In some embodiments, without commands from microprocessor 432, DSP 419 will not change state.

FIG. 7A shows a block diagram of an embodiment of focus close algorithm 535. Focus close algorithm 535 asserts control efforts onto the focus control effort through summer 521. In some embodiments, summer 521 may be replaced with a switch or multiplexer circuit that chooses a control effort originating from focus close algorithm 535 or from notch filter 519.

Algorithm 535, in some embodiments, starts with a control effort so that OPU 103 is positioned away from optical media 102 (i.e., the distance between OPU 103 and optical media 102 is larger than the focus distance). Algorithm 535 then generates a control effort to move OPU 103 closer to optical media 102 until the control effort is appropriate for a focus distance. Once OPU 103 is near the focus distance, then algorithm 535 holds its contribution to the control effort constant while the focus servo loop 501 generates the additional focus control effort required to maintain closed loop focus.

In step 701, a focus acquire flag is set. The focus acquire flag can be set by a routine executing in microprocessor 432 or in DSP 416. In step 703, algorithm 535 determines whether the actuator is positioned appropriately to start a focus acquisition procedure. This can be tested by setting a range of values for the current focus control effort or by comparing with a threshold value for the focus control effort. In some embodiments, the current in focus actuator 206 is zero and algorithm 535 needs to push OPU 103 away from optical media 102.

If the control effort for focus actuator 206 is not positioned appropriately, then algorithm 535 must generate a focus control effort appropriate to move OPU 103 to an acceptable starting point. In addition, algorithm 535 should provide a control effort that moves OPU 103 in such a way as to not excite mechanical resonances in actuator arm 104. For example, if a focus control effort profile is generated by algorithm 535 that simply sets the focus control effort to a value calculated to be the value at the acquisition starting position, many mechanical resonances are likely to be excited in actuator arm 104. Should mechanical resonances in actuator arm 104 become excited, there may be transient motions generated with large decay times, increasing significantly the amount of time required for focus acquisition. In some embodiments, in step 704 algorithm 535 generates a sinusoidal starting focus control effort profile which moves OPU 103 to an acquisition starting position in a smooth fashion.

Figure 7B:
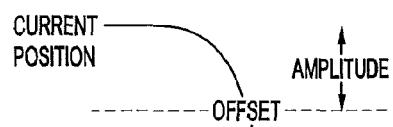

FIG. 7B shows an example of a starting focus control effort profile generated in step 704. Step 704 generates a sine wave with one peak being at the current focus control effort (indicating the current position of OPU 103 relative to optical media 102) and the opposite peak being at the acquisition starting position control effort. The starting focus control effort can be applied to focus actuator 206 in step 705 by adding the starting focus control effort into the focus control effort at summer 521. This method of positioning elements, in both the focus and the tracking directions, can be widely utilized. In other words, whenever OPU 103 needs to be positioned relative to optical media 102, a smooth control effort as described above can be generated and applied. The resulting smooth motion of OPU 103 can reduce excitations of mechanical resonances which may be obtained by application of more abrupt control efforts.

If, in step 703, OPU 103 is already at an appropriate starting acquisition position, then algorithm 535 proceeds to step 706. Additionally, after the starting control effort is applied to focus actuator 206, then algorithm 535 proceeds to step 706.

Figure 7D:
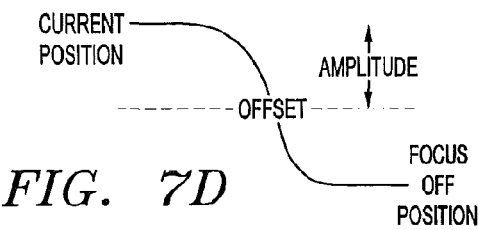
Figure 7C:
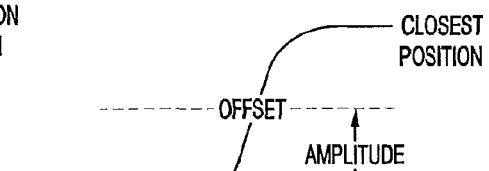

In step 706, algorithm 535 generates an acquisition control effort that moves OPU 103 from the starting acquisition position through the best focus position. Algorithm 535, in some embodiments, can provide the focus acquisition control effort required to move OPU 103 from the starting acquisition position through the best focus position. However, again if mechanical resonances are excited in actuator arm 104, it may take some time for the transient oscillations to damp out. Therefore, in some embodiments, step 706 calculates a sinusoidal focus acquisition control effort between the starting acquisition position and the control effort corresponding to a position close to optical media 102. In some embodiments, the position close to optical media 102 may be the closest position that OPU 103 can be moved toward optical media 102. Such a focus acquisition control effort profile is shown in FIG. 7C.

Once the focus acquisition control effort profile is calculated, then in step 707 DSP 416 is enabled to monitor the sum signal from summer 534, which generates the sum of all of the detector signals A, B, C, D, E, and F, and the FES signal output signal from summer 513 in order to determine when focus has been acquired. In step 708, the focus acquisition control effort according to the focus acquisition control effort profile calculated in step 706 is applied through summer 521 to the focus control effort, and therefore applied to focus actuator 206 in order to physically move OPU 103 through the best focus position.

In step 710, algorithm 535 monitors the closure criteria during the application of the focus acquisition control effort profile. If the closure criteria is not satisfied, then algorithm 535 proceeds to step 711. In step 711, algorithm 535 checks to see if the closest position has been reached. If in step 711, it is determined that OPU 103 has not yet reached the closest position, then algorithm 535 proceeds to step 708 to continue to apply the focus acquisition control effort profile as the focus control effort.

Step 710 can determine whether OPU 103 is close to the focus position, in some embodiments, by the sum signal output from summer 534. In that case, if the sum signal is above a focus sum threshold determined by FES gain calibration 510, then OPU 103 is near to the focus position. Furthermore, close to the focus position the FES signal will be near zero. Therefore, in some embodiments the closure criteria of step 710 can be that the sum signal is above a sum threshold and the FES signal is below an FES threshold.

If in step 710 algorithm 535 determines that the closure criteria is satisfied, algorithm 535 proceeds to step 712. In step 712, algorithm 535 closes the focus loop without integrator 516 being enabled. Algorithm 535 then sets the current focus control effort to the bias control effort. In that case, step 712 maintains the focus control effort from the acquisition focus control effort profile when the closed criteria was satisfied. The acquisition focus control effort is held constant by algorithm 535 when focus is closed as long as focus remains closed.

In step 714, algorithm 535 delays for transient effects to decay before turning integrator 516 on in step 716. Algorithm 535 can further delay in step 718 for transient effects to decay before enabling FES sample integrity test 515 in step 720. Once focus is closed and integrator 516 and sample integrity test 515 are enabled, a focus acquisition complete flag can be set in step 723. In some embodiments, the "begin acquisition position" of step 704 may be recalibrated and stored for future executions of algorithm 535 in step 723.

If the closure condition of step 710 is not met, algorithm 535 proceeds to closest position check step 711. If algorithm 535 determines in step 711 that OPU 103 is at a closest position to optical media 102, then algorithm 535 sets a focus error bit in step 713. In some embodiments, the closest position can be the physically closest distance that OPU 103 can be from optical media 102. In some other embodiments, however, the closest position refers to a closest allowable position that can be a predetermined value.

Once the focus error bit is set in step 713, algorithm 535 can proceed to step 715. In step 715, algorithm 535 determines a sinusoidal tracking control effort profile that moves OPU 103 away from optical media 102 to a focus off position. As before, the sinusoidal tracking control effort can be determined, as is shown in FIG. 7D, by fitting a half sine wave between the closest position and the focus off position. A focus control effort according to the sinusoidal tracking control effort is applied to focus actuator 206 in step 717. Once OPU 103 has reached the focus off position in step 719, then algorithm 535 exits in a failed condition in step 721. If focus acquisition fails, then error recovery routines can be initiated as is described in the System Architecture disclosures. In some embodiments, the error recovery routines can attempt to execute focus close algorithm 535 multiple times or change the "Begin Acquisition Position" in step 704 of algorithm 535 shown in FIG. 7A.

FIGS. 8A and 8B illustrate an embodiment of multi-track seek algorithm 557. FIG. 8A shows a block diagram of an embodiment of multi-track seek algorithm 557 while FIG. 8B shows signals as a function of time for performing a multi-track seek function according to the present invention.

FIG. 8B shows the TES, tracking control effort, FES, and focus control effort signals during a multi-track seek operation performed by algorithm 557. During time period 821, focus servo algorithm 501 and tracking servo algorithm 502 are both on and tracking. At the beginning seek period 822, algorithm 557 generates a seek tracking control effort profile which includes an acceleration tracking control effort 825 and a deceleration tracking control effort 827. A coasting or clamped tracking control effort 826 can also be included between acceleration effort 825 and deceleration effort 827.

The TES signal, then, begins to sinusoidally vary when acceleration tracking control effort 825 is applied to tracking actuator 360. The period of the sinusoidal variation indicates the track crossing velocity. During acceleration, the period is decreasing indicating an increasing track crossing velocity. In some embodiments, seek algorithm 557 may clamp velocity at a particular value. Further, acceleration control effort 825 and deceleration control effort 827 may be calculated by controlling the actual acceleration of OPU 103 relative to optical media 102 as measured with the varying period of the sinusoidal TES. In FIG. 8B, a track crossing velocity curve that may be generated by seek algorithm 557 is shown, which indicates a constant acceleration the period when acceleration tracking control effort 825 is applied and a constant deceleration the period when deceleration tracking control effort 827 is applied. During period 823, seek algorithm 557 reacquires a tracking on condition in tracking servo algorithm 502.

In some embodiments, during the seek operation the FES control effort is selected in multiplexer 531 to be the low-pass filtered focus control effort output by low pass filter 529 in order that TES-FES crosstalk effects are minimized. In some embodiments, the output signal from sample and hold 530 is selected by multiplexer 531 during seek operations. In some embodiments, seek cross-talk notch filter 590 can also be enabled during the seek operation in order to reduce the effects of the sinusoidal TES on FES. Therefore, in operation seek algorithm 557 in some embodiments adjusts multiplexer 531 to receive the focus control effort from filter 529 and can enable notch filter 590. Algorithm 557 also adjusts multiplexer 558 to receive a tracking control effort generated by algorithm 557, turning tracking servo algorithm 502 off. Algorithm 557 then generates and applies a seek tracking control effort profile, which is responsive to the velocity of OPU 103, and moves OPU 103 to a target track on optical media 102. The velocity of OPU 103 can be determined by measuring the period of the sinusoidally varying TES. Once algorithm 557 completes the actual move of OPU 103, then tracking is reacquired in close tracking algorithm 555 and multiplexer 558 is reset to receive the focus control effort signal from notch filter 553 through switch 556. Further, multiplexer 531 is reset to pass the signal output from loop gain 524 as the focus control effort.

FIG. 8A shows a block diagram of an embodiment of algorithm 557. The TES' signal output from TES sample integrity test 548 is received by Track Zero Crossing (TZC) detector 801. TZC detector 801 determines the track crossings and, in some embodiments, each time a track is crossed generates a pulse signal. In some embodiments of the invention, algorithm 557 may read the TZC signal from track crossing detector 454 (see FIG. 4). In some embodiments, TZC detector 801 receives a defect signal from defect detector 591. The defect signal disables the TZC detector output from generating a pulse during the presence of a media defect. The TZC signal is input to TZC counter 802 and TZC period 803. TZC detector 554 of FIG. 5B includes TZC detector 801 and TZC period 803. TZC counter 802 counts the number of tracks crossed. The Direction signal from Direction Detection 592 determines the direction TZC counter 802 counts. For example, if a direction reversal occurs near the end of a seek possibly due to an external disturbance, then the counter will increment instead of decrement. This assures the seek crosses the correct number of tracks. TZC period 803 calculates the time period between successive track crossings. Seek completion detection 816 monitors the number of tracks crossed from TZC counter 802 and indicates whether seek is complete. Seek complete detection 816, therefore, also indicates the number of tracks remaining to the target track. In addition, seek complete detection 816 can output a retro-rocket signal which can enable retro-rocket gain 830. In some embodiments, seek completion 816 indicates that the seek is completed when the count exceeds the target count and when the TES signal has an appropriate slope in which to close tracking.

In some embodiments, TZC counter 802 receives a signal indicating each full rotation of optical media 102. During seek operations, optical media 102 continues to rotate. The rotations can cause additive seek length error to the actual seek length if the seek servo simply counts track crossings in TZC counter 802 instead of taking the track spiral into account. Predicting the number of disk rotations based upon seek length could be used; however, this method does not account for seek time variations caused by outside factors such as, for example, mechanical disturbances. TZC counter 802, by incrementing the TZC count during seeks on each rotation of optical media 102, can prevent errors in seek length.

A velocity profile is calculated in reference velocity calculation 805. The velocity profile calculated in reference velocity calculation 805 can, as shown in FIG. 8B, be optimized to move OPU 103 to the target track in a minimum amount of time without exciting resonances and stop OPU 103 at or very near the target track. FB velocity calculation 806 receives the measured track crossing period from TZC period 803 and calculates the actual velocity of OPU 103. The difference between the reference velocity calculation from calculation 805 and the actual velocity as calculated by calculation 806 is formed in summer 807, which outputs a velocity error value. In some embodiments, the output signal from calculation 806 is input to a sign block 818 which, based on the direction signal from direction detector 592, multiplies the calculated FbVEL value from block 806 by the sign of the direction signal.

In some embodiments, FB Vel calculation 806 calculates the velocity based on the time between half-track crossings. In some embodiments, at higher velocities, two consecutive half-track periods can be averaged. The sampling rate of algorithm 557 is the half-track crossing rate, which can be quite low (e.g. 2 kHz at track capture) resulting in a low bandwidth closed loop seek servo. The low bandwidth leaves the seek servo vulnerable to shock and vibration disturbances during the critical track capture phase of the seek operation. It is desirable to achieve good velocity regulation particularly when approaching the track capture phase of the seek. This bandwidth can be improved, and thus the velocity regulation upon track capture can be improved, by calculating the derivative of the TES when the TES is within a reasonable linear range of it's sinusoidal curve while crossing tracks. The derivative measurement is averaged with the most recent half track crossing measurement to filter some of the inherent noise effects associated with differentiation. Additionally, the positive and negative slopes of the TES are not symmetric, therefore, a balance gain is applied to one of the TES slopes to eliminate the effect of this asymmetry on the derivative calculation. In these embodiments, then, the FbVEL parameter is given by FbVEL=[(K1/TzcPeriod)+K2*d(TES)/dt]/2, where K2=K2a for track enter slopes and K2=K2b for half track center slopes. Typically, K2a=−0.7K2b.

The velocity error from summer 807 is multiplied by a constant $K_3$ in step 809 and input to summer 813. Further, velocity error is summed with the sum of velocity errors measured during previous clock cycles in summer 810, multiplied by constant $K_4$ in step 812, and added to the output value from step 809 in summer 813. Summer 810 acts as an integrator, integrating the velocity error. The output value from summer 813 is input to multiplexer 814. The output signal from multiplexer 814 is input to loop gain 815, which generates a tracking control effort. The tracking control effort output by loop gain 815 is part of the seek tracking control effort profile which moves OPU 103 to the target track in a controlled fashion.

In some embodiments, the tracking control effort output from multiplexer 814 can be a clamped acceleration effort generated by acceleration clamp 808. Acceleration clamp 808 monitors the acceleration of OPU 103 from the velocity error determined in summer 807 and, if a maximum acceleration value is exceeded, limits the tracking control effort to be the maximum acceleration value.

In some embodiments, the TES' signal is also input to boundary detector 817. In general, multi-track seeks can cross boundaries between writeable 151 and pre-mastered 150 portions of optical media 102 (FIG. 1B). The operation of direction sensor 592 as well as many operating parameters, including the TES gain, TES offset, FES gain, FES offset, and cross-talk compensation parameters from cross-talk calibration 579 will be different depending on whether OPU 103 is over a writeable or pre-mastered portion of optical media 102. Boundary detector 817 includes a multi-point positive and negative TES peak averaging algorithm, which is executing during seek operations. Boundary detector 817 then monitors the TES peak-to-peak amplitude during seeks. Before initiating a seek operation, algorithm 557 knows the type of media (i.e. pre-mastered, grooves, or write able, bumps) that OPU 103 is over. Microprocessor 432 can inform algorithm 557, which is usually operating on DSP 416, whether or not the seek operation takes OPU 103 from one type of media to another. If a boundary crossing is detected, then boundary detector 817 can monitor to determine when the boundary has been crossed.

Boundary detector 817 detects the boundary crossing by identifying when the TES peak-to-peak amplitude (TESPP), for example calculated by the multi-point peak averaging, by more than a threshold value (for example 25% of TESPP).

TesPP Change=|TesPP(k)−TesPP(k−2)| where k represents the measurement number.

If the threshold value is set too high, the boundary crossing algorithm may miss boundary crossings. Alternatively, if the threshold value is set too low, the boundary crossing algorithm may erroneously detect boundary crossings. In some embodiments, a default threshold can be utilized for a first boundary crossing on a newly inserted disk. When the boundary is detected, the measured change in TES peak-to-peak value can be averaged with the default threshold to drive the threshold amplitude in the direction of the actual change in TES peak-to-peak for the specific one of media 102. The averaging process can continue for all subsequent boundary crossings while the specific one of media 102 is in drive 100. The threshold, then, can be set to the averaged threshold for all future boundary crossings in that specific media 102.

In some embodiments, consecutive TesPP measurements are not compared because one of these measurements may straddle a boundary between media when making the multipoint peak averaging measurement. At that point, boundary detector 817 determines that the boundary has been crossed and switches the media sensitive operating parameters to parameters appropriate for the new media.

FIGS. 9A and 9B shows a flow chart of an embodiment of seek algorithm 557. In seek initialization 901, seek command 902 is issued, for example by microprocessor 432. Further, an acceleration flag, a seek direction flag, a TZC period, and a seeklength (indicating target track) are set in initialization 903. In some embodiments, laser power may be reduced during a seek operation. Therefore, in seek initialization 901, laser power can be reduced as well. Upon completion of the seek operation, laser power can be reset to a read power level.

In step 904, a TZC period count variable is incremented. In step 905, the TZC period count variable is checked against the current TZC period variable and, if at least half or some other fraction of the most recently measured TZC period has not elapsed, algorithm 557 proceeds to skip TZC period and counter calculations 803 and 802. If the condition of step 905 is met, then algorithm 557 proceeds to crossing detection 906. Crossing detection 906 indicates a crossing TZC if the TES' value crosses 0. Crossing detection 906 includes amplitude hysteresis in addition to the temporal hysteresis provided in step 905, i.e., that the next TZC crossing can not be indicated again for at least half the old TZC period value, which prevents noise from falsely indicating a TZC crossing.

FIG. 9C illustrates the TZC detection algorithm performed by TZC detector 801. TZC detector 801 provides a change in state on each zero crossing. As shown, however, TZC detection 906 of TZC detector 801 provides a change of state on each detected zero crossing. TZC detection 906, from step 905, is enabled to change after about ½ the TZC period. Additionally, in step 906, the TZC crossing provides a low threshold value and a high threshold value so that, on an increasing TES' signal, the TZC zero is detected at the high threshold value and on a decreasing TES' signal detects the TZC zero at the low threshold. A amplitude hysteresis is then provided.

In step 907, algorithm 557 indicates whether the TZC value has changed, indicating a track crossing. If not, then calculation of TZC period and updating of track counting in steps 803 and 802 are skipped. If the TZC value has changed, then algorithm 557 proceeds to block 908. In block 908, if the acceleration flag is not set or if the current count for TZC period (the TZC period count variable) is less than some multiple (for example twice) of the most recently measured TZC period or if the TZCSkip flag is set, then algorithm 557 proceeds to step 909, else algorithm 557 proceeds to step 910 which sets the TZC skip flag. From step 910, algorithm 557 then proceeds to step 913, which resets the TZC period count to zero. If the conditions of step 908 are met, then algorithm 557 proceeds to step 909.

Step 909 checks whether the currently detected TZC pulse is the first pulse and, if so, proceeds to step 913 where the TZC period count variable is set to 0. Otherwise, algorithm 557 proceeds to step 911 which sets the TZC period to the current TZC period count. Algorithm 557 then clears the TZCskip flag in step 912 before resetting the TZC period count in step 913.

Steps 908 through 912, perform a TZC period integrity test. In some embodiments, the TZC period is checked against the previously measured TZC period (i.e., the TZC period of cycle k is compared with the TZC period of cycle k−1). An error is generated if the TZC period of cycle k varies substantially from the TZC period of cycle k−1. In some embodiments, since a new zero crossing is not detected until at least ½ the TZC period of cycle k−1 (see step 905), and step 908 checks to be sure that the TZC period in the kth cycle is less than twice the TZC period in the k−1th cycle, then the TZC period is restrained to be between ½ TZC period and 2 the TZC period of the k−1th cycle (i.e., TZCperiod(k−1)/2<TZCperiod(k)<2*TZCperiod (k−1). In some embodiments, the range can be extended. For example, in some embodiments TZCperiod (k−1)/4<TZCperiod (k)<4*TZCperiod(k−1).

In step 914, the direction is checked, for example by checking the direction signal from direction detector 592 (FIG. 5A), so that the TZC count variable can either be decremented in block 915 or incremented in block 916, depending on direction. Algorithm 557 then proceeds to step 917.

In step 917, algorithm 557 checks if the current calculated reference velocity, which is a constant times the TZC count parameter calculated in block 802 of FIG. 8A, is greater than a maximum value of the reference velocity. If the reference velocity is greater than half the value of the maximum, then the TZC period value is averaged with previous TZC period values in step 918, which can have the effect of smoothing the actual velocity measurement. Algorithm 557 then proceeds to step 919 of seek completion detection 816.

Step 919 checks the current value of the TZC count to see if the required number of tracks have been crossed. If not, then algorithm 557 proceeds to step 922 of algorithm 805.

If the number of track crossings is correct, then algorithm 557 checks in step 920 to see if the TES' has the correct slope. If not, the algorithm 557 proceeds to step 922. If the slope is correct, then algorithm 557 sets a seek completion flag in step 921 and exits. Tracking can then be reacquired in tracking close algorithm 555.

In step 922, a reference velocity is calculated. The reference velocity is greater than a minimum reference velocity by a value proportional to the track crossing count TZC count. The sign of the reference velocity is the sign of the TZC Count. For example, a 100 track seek toward the inner diameter (ID) would initialize the TZC count with +200 (since TZC counter counts half tracks) and the counter would decrement (assuming the direction sensor determines that OPU 103 is moving toward the ID) for each half track crossing until reaching the destination track with a count of 0. Thus, the reference velocity would be positive for seeks toward the ID. A 100 track seek toward the OD would cause the TZC counter to be initialized with a negative 200 value. The counter would increment (assuming the direction sensor determines that OPU 103 is moving toward the OD) until reaching 0 at the destination track. The reference velocity has a negative sign for seeks toward the OD.

In step 923, the reference velocity calculated in step 922 is compared with a maximum reference velocity and, if the maximum reference velocity is exceeded, then the reference velocity is reset to the maximum reference velocity in step 924. In step 806, the actual velocity of OPU 103 is calculated. The actual velocity (FbVEL) is proportional to the reciprocal of the TZC period variable, which is calculated in block 803 of FIG. 8A. Step 807, then, calculates the velocity error as the difference between the reference velocity and the actual velocity. Algorithm 557 then proceeds to step 934.

In step 934, algorithm 557 checks for the first change in sign of the velocity error signal. If the sign of the velocity error has not yet changed since the start of seek, then the seek acceleration phase continues. If the first change in the velocity error sign is detected, then the acceleration flag is cleared in step 935. During the initial phase of the seek (a.k.a. acceleration phase), the velocity of OPU 103 must be accelerated until it's velocity reaches the reference velocity. Until then, the velocity error can be large. It is desirable to not allow multi-track seek control compensator's integrator, which includes summer 813, from operating during the initial phase of seek because it will integrate this large velocity error resulting in a significant feedback velocity overshoot of the reference velocity. In addition, the control effort during this acceleration phase of a multi-track seek operation is clamped by clamp 808 to avoid accelerating too fast which could also cause significant overshoot of the reference velocity. Otherwise, algorithm 557 sets the seek control effort proportionally to the seek control variable in step 815. Algorithm 557 then proceeds to step 804 where tracking phase lead 550 can be updated to properly initialize it's states in order to reduce the time required to reacquire tracking in close tracking algorithm 555. From step 935, algorithm 557 proceeds to step 927.

In step 927, if OPU 103 is accelerating, then a seek control variable is set to the velocity error in step 928. In step 929, the seek control variable is compared with a maximum acceleration variable and, if the maximum acceleration variable is exceeded, then seek control is set to maximum acceleration in step 930. If not exceeded, then algorithm 930 proceeds to step 934.

If step 927 determines that there is no acceleration, then algorithm 557 proceeds to step 931. If the velocity error is greater than a maximum velocity error, and there has not been too many successive corrections, then algorithm 557 proceeds to step 933, which sets the seek control variable to be a constant times the velocity error plus a value proportional to an integral of the velocity error, as shown in FIG. 8A as steps 809, 813, 810, 811, and 812. If the maximum velocity error is not exceeded in step 931, then velocity error is set to 0 in step 932 and seek control is set to a value proportional to the velocity error integral in step 933. Algorithm 557 then proceeds to step 815.

In some embodiments, completing a seek operation in algorithm 557 also begins a time limited tracking loop high gain mode, which can be referred to as a "retro rocket." Seek completion detector 816 can enable retro-rocket gain 830 The tracking servo phase lead compensator 550 (FIG. 5A) states know about the tracking and velocity error at the instant of the seek to tracking transition as a result of properly initializing the phase lead compensator. Therefore, tracking servo 502 knows whether to accelerate or decelerate for capturing the destination track center. By significantly increasing the tracking loop gain (bandwidth) for a predetermined number of servo samples (for example 5), tracking servo 502 can more aggressively acquire the destination track. Time constraining the duration of the increased tracking loop gain can prevent the instabilities caused by mechanical resonances from growing unbounded and thus destabilizing the system. The net effect of applying the retro-rockets is a very aggressive closed loop track capture converged upon track center quickly followed by a nominal bandwidth very stable tracking control system closed on the destination track.

In some embodiments, algorithm 557 is executed as part of a control loop on DSP 416. In those embodiments, seek algorithms may be executed, for example, every 20 µs (i.e., 50 kHz). However, as more fully discussed below, detector signals A, B, C, D, E, and F are available every 10 µs, or at 100 kHz. In some embodiments, algorithm 557 may be solely operated on DSP 416 so that the full 100 kHz availability of data is available.

FIG. 10B shows a block diagram of a one-track jump algorithm 559. FIG. 10A illustrates the TES, tracking control effort, FES, and focus control effort during a one-track jump algorithm. The TES and FES signals shown are the output signals from summer 506. The TES and FES signals shown in FIG. 10B are measured scope traces from output pwm's 474, who's output signals are centered about reference voltages, e.g. from block 462 (FIG. 4). As shown in FIG. 10A, a one-track jump algorithm starts in a tracking mode 1001 and includes an acceleration period 1002, a coast period 1003, and a deceleration period 1004. Once deceleration period 1004 is complete, a settling period 1008 is followed by a focus on 1005 and a tracking integrator on 1006. At which time, a tracking and focus period 1007 is initiated.

In FIG. 10A, during tracking period 1001 both focus servo algorithm 501 and tracking servo algorithm 502 are on, therefore drive 100 is tracking and focusing on a starting track. During acceleration period 1002, one-track jump algorithm 559 applies an acceleration tracking control effort to tracking DAC 468 which accelerates OPU 103 in the desired tracking direction for a fixed time. During coast period 1003, one-track jump algorithm 559 holds the tracking control effort at the level applied before the one track jump algorithm begins. In some embodiments, coast period 1003 is held until the TES signal output from sample integrity test 548 changes sign, indicating a half-track crossing. Finally, during deceleration period 1004 one-track jump algorithm 557 applies a deceleration tracking control effort to tracking DAC 468. As shown, the acceleration tracking control effort of acceleration period 1002 and the coast period 1003, and the deceleration tracking control effort of deceleration period 1004 causes TES to pass though one period of the TES versus position curve, indicating a single track crossing. At some time 1006 after deceleration period 1004 ends, one-track jump algorithm 559 re-enables low frequency integrator 549, which was disabled but not reset when algorithm 559 began. Further, during acceleration period 1002, coast period 1003, deceleration period 1004 and until time 1005 after deceleration period 1004, sample and hold 530 holds the focus control effort at a constant level. When one-track jump algorithm 559 completes, servo control algorithm 500 re-enters a mode of tracking both focus and track position.

In some embodiments, the time scale on FIG. 10A is of the order of hundreds of microseconds so that, for example, the numbered divisions are on the order of 200 microseconds. In some cases, one-track jump algorithm 559 can be executed in DSP 416 since microprocessor 432 may be unable to respond fast enough.

FIG. 10B shows schematically a block diagram of one-track jump algorithm 559. Tracking compensation 1011 includes integrator 549, phase lead 550, and notch filters 551 through 553. Therefore, the output signal from tracking compensation 1011 is the tracking control effort generated through the closed tracking servo system 502 that is input to multiplexer 558. Multiplexer 558 in FIG. 10B is represented by a switch. Track jump state machine 1010, when one track algorithm 559 is initiated, controls multiplexer 558 so that the tracking control effort generated by algorithm 559 is ultimately applied to tracking actuator 201 instead of the tracking control effort signal generated by tracking compensation 1011. In FIG. 10B, the tracking control effort output from tracking DAC 468 is input to summer 1020 which is located in power driver 340. As was discussed above, the tracking control effort output from DAC 468 is summed with the bias control effort by summer 1020 in power driver 340. Plant 1021 includes tracking actuator 201 as well as OPU 103 and actuator arm 104.

The tracking control effort from tracking compensation 1011 is low pass filtered in filter 1012 and input to sample and hold 1017. During execution of one-track jump algorithm 559, the output signal from sample and hold 1017 is fixed at a constant value. The constant tracking control effort output from sample and hold 1017 is summed with the one-track jump tracking control profile generated in algorithm 559 at summer 1016.

The one-track jump tracking control profile includes an acceleration pulse generated by pulse amplifier 1013 and a deceleration pulse generated by pulse amplifier 1014. Track jump state machine 1010 controls the amplitude and duration of acceleration and deceleration pulses. Track jump state machine 1010 further controls the direction of the one-track jump by determining the sign of the amplitudes of the acceleration and deceleration pulses generated by pulse amplifiers 1013 and 1014.

In some embodiments, the amplitude and duration of acceleration and deceleration pulses are set during a calibration step in calibration algorithm 560. In some embodiments, the amplitude and duration of acceleration and deceleration pulses may change as a function of position of OPU 103 over optical media 102. Further, although in FIG. 10B, the jump control effort profile is shown as including a positive and negative square wave pulse, in some embodiments acceleration pulse and deceleration pulse may include sinusoidal wave pulses in order to avoid exciting mechanical resonances in actuator arm 104.

Track jump state machine 1010, then, first latches sample and hold 1017, shuts off low frequency integrator 549, and latches sample and hold 530, then applies the acceleration pulse from pulse amplifier 1013. State machine 101 then monitors the TES' signal for a sign change. When the sign change is detected, state machine 1010 applies the deceleration pulse generated by pulse amplifier 1014. If a sign change is not detected within a set period of time, then track jump state machine 1010 indicates a failed jump condition. In those circumstances, error recovery routines (See System Architecture disclosures) will recover from this condition.

Once the deceleration pulse has ended, state machine 1010 switches multiplexer 558 to receive tracking control efforts from tracking compensation 1011, and delays for a period of time to allow transient effects to decay. State machine 1010 then turns focus back on (by setting multiplexer 531 to accept the focus control effort rather than the output signal from sample and hold 530) and re-enables integrator 549.

In some embodiments, one-track jump algorithm 559 shown in FIG. 10B, for example, can further include notch filters 551 and 553 for receiving the one-track jump control effort profile output from summer 1016. Further, as is shown and discussed further below, algorithm 559 can be executed on DSP 416 in a timer interrupt mode. In some embodiments, one track algorithm 559 initiates phase lead 550 so that phase lead 550 is initiated to the proper state when tracking is closed following the one-track jump operation. Initializing phase lead 550 improves dynamic response during the close tracking operation. Further, during a one-track jump algorithm, the focus control signal can be set to the output of sample and hold 530, which holds the output signal from low-pass filter 529 during the one-track jump operation.

FIG. 11 shows a block diagram of a DSP firmware architecture 1100 according to the present invention. As discussed above, microprocessor 432 and DSP 416 can communicate through mailboxes 434. Initialization block 1101, main loop block 1102, timer interrupt block 1103, and sensor interrupt block 1120 represent algorithms executing on DSP 416. In initialization 1101, all of the filter states in FIGS. 5A and 5B are set to zero and all initializations are accomplished. Main loop 1102 represents an infinite loop that actually does nothing, since in most embodiments DSP 416 is interrupt driven. Timer interrupt 1103 executes one-track jump algorithm 559.

Focus and tracking servo algorithms are executed as part of sensor interrupt 1120. Sensor interrupt 1120 is available when all of the detector sensor signals A, B, C, D, E and F are available at decimation filters 414-1 and 414-6 (FIG. 4). Therefore, in some embodiments (for example), there is a sensor interrupt at a frequency of 100 kHz frequency, which occurs every 10 μs. Therefore, every 10 μs DSP 416 receives a sensor interrupt which initiates sensor interrupt code 1120 shown in FIG. 11.

In step 1104, algorithm 1120 determines which algorithm to execute, focus or tracking. Focus servo algorithm 501 and tracking servo algorithm 502 alternate, therefore each is executed every 20 μs. Therefore, focus and tracking loops are sampled at 20 μs or 50 kHz rather than interrupting every 20 μs and executing both focus and tracking algorithms. In this fashion, there is a lower time delay between sampling detector signals A, B, C, D, E, and F. In some embodiments, a third loop in algorithm 1120 can execute a spin-motor servo algorithm (see the Spin Motor Servo System disclosures). However, DSP 416 operates very fast but has limited resources in terms of memory.

If algorithm 1120 executes focus servo algorithm 501, then an FES' signal is calculated in step 1111. The FES' signal is the output signal from sample integrity test 515, therefore step 1111 includes focus servo algorithm 501 through integrity test 515. In some embodiments, defect detection algorithm 591 can then be calculated, providing a defect signal to a write abort algorithm which may be operating on microprocessor 432.

When the FES' signal is calculated in step 1111, algorithm 1120 proceeds to step 1112. In step 1112, algorithm 1120 determines if focus is on. In some embodiments, algorithm 1120 determines that focus is on or off by checking a bit flag in a control word held in mailboxes 434. If focus is off, then algorithm 1120 is finished with the focus operation and proceeds to step 1114. If focus is on, the algorithm 1120 finishes the operations of focus servo algorithm 501 in step 1113. After step 1113, then algorithm 1120 proceeds to step 1114.

If tracking servo algorithm 502 is chosen in step 1104, then algorithm 1120 proceeds to step 1105. In step 1105, tracking servo algorithm 502 through TES sample integrity test 548 is executed to calculate a TES' value. Algorithm 1120 then proceeds to step 1106. In step 1106, algorithm 1120 determines if a seek operation is being undertaken, in some embodiments by checking a seek flag set in a control word held in mailboxes 434.

If a seek operation is being undertaken, then algorithm 1120 proceeds to seek algorithm 557 in step 1107. Step 1107 can perform many of the steps described with FIGS. 8A, 8B, 9A and 9B describing seek algorithm 557. Additionally, some of the steps shown in FIGS. 9A and 9B can be performed through tasks in multiplexer 1116, as described below. For example, seek initialization 901 can be performed as tasks in multiplexer 1116.

If there is no current seek operation, or when step 1107 is completed, algorithm 1120 proceeds to step 1108. In step 1108 algorithm 1120 determines whether tracking is on or not. If tracking is on, then algorithm 1120 proceeds to step 1109 where the remaining portion of track servo algorithm 502 is executed. If tracking is off, or when step 1109 is completed, algorithm 1120 proceeds to step 1110. Usually, algorithm 1120 either executes step 1107, step 1109, or neither. However, in some cases a seek operation may finish in step 1107 and then tracking should be turned on in step 1109, in which case both steps 1107 and 1109 are executed during the same interrupt.

In step 1110, minimum and maximum calculations on any variable can be calculated. The particular variable can be chosen by microprocessor through mailboxes 434. Step 1110 allows variables to be monitored and trace data to be kept for calibration routines or monitoring routines. From step 1110, algorithm 1120 proceeds to step 1114.

In step 1114, algorithm 1120 determines if the drive is in the coast mode of a one-track jump. If step 1114 indicates a coast mode of a one-track jump, which in some embodiments can be determined by checking the appropriate bit flag in a control register of mailboxes 434, then algorithm 1120 proceeds to step 1115. Step 1115 determines if the deceleration step of the one-track jump should be started and, if so, starts the deceleration step. Once step 1115 is complete, or if step 1114 determines that there is no one-track jump operation, then algorithm 1120 proceeds to multiplexer 1116.

One track jump algorithm 559, as discussed with FIGS. 10A and 10B, execute in a timer interrupt mode. However, algorithm 1120 operates every 10 microseconds, which allows steps 1114 and 1115 to execute every 10 microseconds, in embodiments operating at a frequency of 100 kHz. The timer interrupt from one track jump algorithm 559 has a lower interrupt priority than sensor interrupts that trigger algorithm 1120. Sensor interrupt allows step 1114 to start deceleration in step 1115.

Multiplexer 1116 includes tasks that can be done after either the tracking loop or the focus loop processing is completed if any of the execution time is available before the next sensor interrupt. Typically, the tasks included in multiplexer 1116 can be tasks that do not need to be serviced as frequently as do focus and tracking algorithms. For example, one task that can fall into multiplexer 1116 is TES OK 517. As discussed before, TES OK 517 checks the FES signal and, if the FES signal is too high, determines that the TES signal is unreliable. However, tracking servo algorithm 502 does not need to be immediately shut down, so the TES OK task can wait until its turn in multiplexer 1116. In some embodiments, multiplexer 1116 can include 16 tasks. Another example of a task that can be included in multiplexer 116 include reading new variables from mailboxes 434 and updating variables used in other areas of algorithm 1120. In that fashion, if microprocessor 432 adjusts a gain or offset value utilized in focus servo algorithm 501 or tracking servo algorithm 502, then a task in multiplexer 1116 can read that gain or offset and update the appropriate variables. Some tasks that may be executed in multiplexer 1116 include focus loop OK algorithm 536, turn focus off algorithm (when commanded to do so), clear focus bad flag, zero the states of low frequency integrator 549, move the TES and FES gain and offset variables from mailboxes to internal variables, zero the low pass filter states of skate detector 561 if skate detector 561 is disabled, close tracking algorithm 555, initialize one-track jump algorithm 559, reset the jump status, initialize the seek variables of multi-track seek algorithm 557 and begin the seek, reset the seek status, clear write-abort status of write abort algorithm 537, seek length spiral compensation in algorithm 557, calibrate notch filter coefficients of notch calibration algorithms 520 and 552, provide general purpose mailbox communications.

From multiplexer 1116, algorithm 1120 proceeds to update status mailbox 1117, which writes status bits to mailboxes 434 as required. For example, error interrupts to microprocessor 432 can be set at step 1117. Algorithm 1120 then proceeds to step 1118 where diagnostic data can be maintained.

In some instances, algorithm 1120 may take more time to complete one cycle than there is time between sensor interrupts. In that case, some sensor interrupts may be missed. However, if too many interrupts are missed or if there is not enough idle time between interrupts, there can be instabilities developed in some embodiments.

The above detailed description describes embodiments of the invention that are intended to be exemplary. One skilled in the art will recognize variations that are within the scope and spirit of this disclosure. As such, the invention is limited only by the following claims.

I claim:

1. A digital servo method for an optical disk drive, comprising:
controlling functions of the optical disk drive with a microprocessor;
receiving low-pass filtered and gain-adjusted versions of photodetector output signals resulting from an illumination of an optical disk;

digitizing versions of the photodetector signals to produce digital signals; and determining, through at least one servo algorithm executed by a digital signal processor, a focus control signal based on a focus error determined from the digital signals, wherein the digital signal processor is an integrated circuit structured and arranged for manipulation of digital signals in accordance with programmed commands, and in a manner that operates faster than the microprocessor.

2. A digital servo method for an optical disk drive, comprising:

controlling functions of the optical disk drive with a microprocessor;

receiving low-pass filtered and gain-adjusted versions of photodetector output signals resulting from an illumination of an optical disk;

digitizing versions of the photodetector signals to produce digital signals; and determining, through at least one servo algorithm executed by a digital signal processor, a tracking control signal based on a tracking error determined from the digital signals, wherein the digital signal processor is an integrated circuit structured and arranged for manipulation of digital signals in accordance with programmed commands, and in a manner that operates faster than the microprocessor.

3. A digital servo method for an optical disk drive, comprising:

controlling functions of the optical disk drive with a microprocessor;

low-pass filtering and gain-adjusting versions of photodetector output signals resulting from an illumination of an optical disk;

digitizing versions of the photodetector signals to produce digital signals; and determining, through at least one servo algorithm executed by a digital signal processor, a focus control signal based on a focus error determined from the digital signals, wherein the digital signal processor is an integrated circuit structured and arranged for manipulation of digital signals in accordance with programmed commands, and in a manner that operates faster than the microprocessor.

4. The digital servo method of claim 3, comprising:

adjusting one or more gain values for gain-adjusting one or more versions of the photodetector output signals based on a calculation performed by the digital signal processor.

5. The digital servo method of claim 3, comprising:

determining, by the digital signal processor, one or more gain values for gain-adjusting one or more versions of the photodetector output signals.

6. The digital servo method of claim 5, comprising:

gain-adjusting the one or more versions of the photodetector output signals based on the determined one or more gain values.

7. The digital servo method of claim 1, comprising:

driving a focus actuator based on the focus control signal.

8. A digital servo method for an optical disk drive, comprising:

controlling functions of the optical disk drive with a microprocessor;

low-pass filtering and gain-adjusting versions of photodetector output signals resulting from an illumination of an optical disk;

digitizing versions of the photodetector signals to produce digital signals; and determining, through at least one servo algorithm executed by a digital signal processor, a tracking control signal based on a tracking error determined from the digital signals, wherein the digital signal processor is an integrated circuit structured and arranged for manipulation of digital signals in accordance with programmed commands, and in a manner that operates faster than the microprocessor.

9. The digital servo method of claim 8, comprising:

adjusting one or more gain values for gain-adjusting one or more versions of the photodetector output signals based on a calculation performed by the digital signal processor.

10. The digital servo method of claim 8, comprising:

determining, by the digital signal processor, one or more gain values for gain-adjusting one or more versions of the photodetector output signals.

11. The digital servo method of claim 10, comprising:

gain-adjusting the one or more versions of the photodetector output signals based on the determined one or more gain values.

12. The digital servo method of claim 8, comprising:

driving a tracking actuator based on the tracking control signal.

13. An optical disk drive, comprising:

a microprocessor configured to perform control functions of the optical disk drive;

an analog-to-digital converter configured to convert low-pass filtered and gain-adjusted versions of photodetector output signals into at least one digital signal; and a digital signal processor configured to determine a focus error from the at least one digital signal and to determine, through at least one servo algorithm executed by the digital signal processor, a focus control signal from the focus error, wherein the digital signal processor is an integrated circuit structured and arranged for manipulation of digital signals in accordance with programmed commands, and in a manner that operates faster than the microprocessor.

14. An optical disk drive, comprising:

a microprocessor configured to perform control functions of the optical disk drive;

an analog-to-digital converter configured to convert low-pass filtered and gain-adjusted versions of photodetector output signals into at least one digital signal; and a digital signal processor configured to determine a tracking error from the at least one digital signal and to determine, through at least one servo algorithm executed by the digital signal processor, a tracking control signal from the tracking error, wherein the digital signal processor is an integrated circuit structured and arranged for manipulation of digital signals in accordance with programmed commands, and in a manner that operates faster than the microprocessor.

15. An optical disk drive, comprising:

a microprocessor configured to perform control functions of the optical disk drive;

at least one low pass filter;

at least one amplifier;

an analog-to-digital converter configured to convert, into at least one digital signal, versions of photodetector output signals low-pass filtered by the at least one low pass filter and gain-adjusted by the at least one amplifier; and a digital signal processor configured to determine a focus error from the at least one digital signal and to determine, through at least one servo algorithm executed by a digital signal processor, a focus control signal from the focus error, wherein the digital signal processor is an integrated circuit structured and arranged for manipulation of digital signals in accordance with programmed commands, and in a manner that operates faster than the microprocessor.

16. The optical disk drive of claim 15, wherein the digital signal processor is configured to determine one or more gain values for gain-adjusting one or more versions of the photodetector output signals.

17. The optical disk drive of claim 15, comprising:
a plurality of photodetectors configured to provide, to the digital signal processor, photodetector output signals resulting from an illumination of an optical disk.

18. The optical disk drive of claim 15, comprising:
a driver configured to receive, from the digital signal processor, the focus control signal and to drive a focus actuator based on the focus control signal.

19. An optical disk drive, comprising:
a microprocessor configured to perform control functions of the optical disk drive;
at least one low pass filter;
at least one amplifier;
an analog-to-digital converter configured to convert, into at least one digital signal, versions of photodetector output signals low-pass filtered by the at least one low pass filter and gain-adjusted by the at least one amplifier; and
a digital signal processor configured to determine a tracking error from the at least one digital signal and to determine, through at least one servo algorithm executed by a digital signal processor, a tracking control signal from the tracking error, wherein the digital signal processor is an integrated circuit structured and arranged for manipulation of digital signals in accordance with programmed commands, and in a manner that operates faster than the microprocessor.

20. The optical disk drive of claim 19, wherein the digital signal processor is configured to determine one or more gain values for gain-adjusting one or more versions of the photodetector output signals.

21. The optical disk drive of claim 19, comprising:
a plurality of photodetectors configured to provide, to the digital signal processor, photodetector output signals resulting from an illumination of an optical disk.

22. The optical disk drive of claim 19, comprising:
a driver configured to receive, from the digital signal processor, the tracking control signal and to drive a tracking actuator based on the tracking control signal.

23. A non-transitory computer readable medium storing a computer program, executable by a machine, for a digital servo method for an optical disk drive, the computer program comprising executable instructions for:
controlling functions of the optical disk drive with a microprocessor;
low-pass filtering and gain-adjusting versions of photodetector output signals resulting from an illumination of an optical disk;
digitizing versions of the photodetector signals to produce digital signals; and
determining, through at least one servo algorithm executed by a digital signal processor, a focus control signal based on a focus error determined from the digital signals, wherein the digital signal processor is an integrated circuit structured and arranged for manipulation of digital signals in accordance with programmed commands, and in a manner that operates faster than the microprocessor.

24. A non-transitory computer readable medium storing a computer program, executable by a machine, for a digital servo method for an optical disk drive, the computer program comprising executable instructions for:
controlling functions of the optical disk drive with a microprocessor;
low-pass filtering and gain-adjusting versions of photodetector output signals resulting from an illumination of an optical disk;
digitizing versions of the photodetector signals to produce digital signals; and
determining, through at least one servo algorithm executed by a digital signal processor, a tracking control signal based on a tracking error determined from the digital signals, wherein the digital signal processor is an integrated circuit structured and arranged for manipulation of digital signals in accordance with programmed commands, and in a manner that operates faster than the microprocessor.

25. A non-transitory computer readable medium storing a computer program, executable by a machine, for a digital servo method for an optical disk drive, the computer program comprising executable instructions for:
controlling functions of the optical disk drive with a microprocessor;
receiving low-pass filtered and gain-adjusted versions of photodetector output signals resulting from an illumination of an optical disk;
digitizing versions of the photodetector signals to produce digital signals; and
determining, through at least one servo algorithm executed by a digital signal processor, a focus control signal based on a focus error determined from the digital signals, wherein the digital signal processor is an integrated circuit structured and arranged for manipulation of digital signals in accordance with programmed commands, and in a manner that operates faster than the microprocessor.

26. The computer program of claim 25, comprising executable instructions for:
adjusting one or more gain values for gain-adjusting one or more versions of the photodetector output signals based on a calculation performed by the digital signal processor.

27. The computer program of claim 25, comprising executable instructions for:
determining, by the digital signal processor, one or more gain values for gain-adjusting one or more versions of the photodetector output signals.

28. The computer program of claim 27, comprising executable instructions for:
gain-adjusting the one or more versions of the photodetector output signals based on the determined one or more gain values.

29. The computer program of claim 25, comprising executable instructions for:
driving a focus actuator based on the focus control signal.

30. A non-transitory computer readable medium storing a computer program, executable by a machine, for a digital servo method for an optical disk drive, the computer program comprising executable instructions for:
controlling functions of the optical disk drive with a microprocessor;

receiving low-pass filtered and gain-adjusted versions of photodetector output signals resulting from an illumination of an optical disk;

digitizing versions of the photodetector signals to produce digital signals; and determining, through at least one servo algorithm executed by a digital signal processor, a tracking control signal based on a tracking error determined from the digital signals, wherein the digital signal processor is an integrated circuit structured and arranged for manipulation of digital signals in accordance with programmed commands, and in a manner that operates faster than the microprocessor.

31. The computer program of claim 30, comprising executable instructions for:

adjusting one or more gain values for gain-adjusting one or more versions of the photodetector output signals based on a calculation performed by the digital signal processor.

32. The computer program of claim 30, comprising executable instructions for:

determining, by the digital signal processor, one or more gain values for gain-adjusting one or more versions of the photodetector output signals.

33. The computer program of claim 32, comprising executable instructions for:

gain-adjusting the one or more versions of the photodetector output signals based on the determined one or more gain values.

34. The computer program of claim 30, comprising executable instructions for:

driving a tracking actuator based on the tracking control signal.

* * * * *